United States Patent [19]

Solberg et al.

[11] Patent Number: 5,761,328

[45] Date of Patent: Jun. 2, 1998

[54] COMPUTER AUTOMATED SYSTEM AND METHOD FOR CONVERTING SOURCE-DOCUMENTS BEARING ALPHANUMERIC TEXT RELATING TO SURVEY MEASUREMENTS

[75] Inventors: Stephen J. Solberg, La Crosse, Wis.; Larry L. LaPierre, North Mankato, Minn.

[73] Assignee: Solberg Creations, Inc., La Crescent, Minn.

[21] Appl. No.: 445,687

[22] Filed: May 22, 1995

[51] Int. Cl.⁶ ............................................. G06K 9/00
[52] U.S. Cl. ...................... 382/113; 382/198; 395/763
[58] Field of Search ................................. 382/197, 198, 382/200, 113, 100, 286; 395/763, 140, 142, 143

[56] References Cited

U.S. PATENT DOCUMENTS

| | | | |
|---|---|---|---|
| 4,193,087 | 3/1980 | Altman | 358/93 |
| 4,489,389 | 12/1984 | Beckwith et al. | 364/522 |
| 4,661,811 | 4/1987 | Gray et al. | 340/744 |
| 4,737,916 | 4/1988 | Ogawa et al. | 364/443 |
| 4,829,295 | 5/1989 | Hiroyuki | 340/728 |
| 4,843,569 | 6/1989 | Sawada | 364/518 |
| 4,845,643 | 7/1989 | Clapp | 364/518 |
| 4,852,020 | 7/1989 | Morita | 364/521 |
| 4,881,067 | 11/1989 | Watanabe | 340/750 |
| 4,939,670 | 7/1990 | Frieman et al. | 364/519 |
| 4,949,388 | 8/1990 | Bhaskaran | 382/10 |
| 4,953,106 | 8/1990 | Gansner et al. | 364/521 |
| 4,964,066 | 10/1990 | Yamane et al. | 364/518 |
| 5,001,677 | 3/1991 | Masters | 367/68 |
| 5,050,222 | 9/1991 | Lee | 382/21 |
| 5,073,819 | 12/1991 | Gates | 358/107 |
| 5,111,514 | 5/1992 | Ohta | 382/9 |
| 5,123,087 | 6/1992 | Newell et al. | 395/348 |
| 5,179,645 | 1/1993 | Tanimori | 395/146 |
| 5,197,120 | 3/1993 | Saxton | 395/139 |
| 5,204,944 | 4/1993 | Wolberg et al. | 364/518 |
| 5,233,357 | 8/1993 | Ingensand et al. | 364/443 |
| 5,258,855 | 11/1993 | Lech et al. | 358/467 |
| 5,268,998 | 12/1993 | Simpson | 395/127 |
| 5,276,784 | 1/1994 | Ohki | 395/127 |
| 5,353,393 | 10/1994 | Bennett et al. | 395/135 |
| 5,357,602 | 10/1994 | Ohta | 395/142 |
| 5,369,508 | 11/1994 | Lech | 358/462 |
| 5,386,508 | 1/1995 | Itonori | 395/161 |
| 5,517,578 | 5/1996 | Altman | 382/181 |
| 5,568,566 | 10/1996 | Hori | 382/197 |

OTHER PUBLICATIONS

Information + Graphic Systems Inc., Tracer™+ Recog™ for Auto CAD™ Drawing Conversion & Recognition Software, 1993 (AY).

Dixon, James, Deed Plotter +™ , Series III, Your Program is So Easy to Use, 1993.

Stevenson, Paula J., M.S., *Scanning for Automated Data Conversion of Cartographic Documents*, (Apr. 1994), pp. 1–95.

Dixon, James, Deed Plotter +™ , Series III, "*Your Program is so easy to use.*", 8 pages.

With The AUDRE™ Conversion System, AUDRE, Inc., San Diego, California, 1 page.

Information + Graphics Systems Inc., *Tracer™+ Recognizer™ for AutoCad® Drawing Conversion & Recongnition Software*, (1993), 3 pages.

Silk Scientific, *Un–Scan–It*™ (Postcard).

Autodesk, Inc., *AUTOCAD*, (1993), pp. 47–50.

Omura, G., *Mastering AutoCAD® 13 for DOS®*, Sybex, California, (1995), pp. 452–480.

*Primary Examiner*—Leo Boudreau
*Assistant Examiner*—Phuoc Tran
*Attorney, Agent, or Firm*—Margaret M. Liss; Stroud, Stroud, Willink, Thompson & Howard

[57] ABSTRACT

The computer automated system and method of converting an image file of a scanned source document, bearing alphanumeric text relating to the lengths and directions of the bounding lines of an area surveyed, into a mathematically accurate vector computer drawing file based on that alphanumeric text. The digitized image file is imported into an existing CAD system having a COGO subroutine and using an OCR operating within the CAD system. The alphanumeric text relating to the lengths and directions of the bounding lines of an area surveyed is recognized by the OCR and then converted by the COGO subroutine into mathematically accurate vectors which can be used for producing accurate drawings. The recognition and conversion steps are such that anyone familiar with software of CAD, OCR, and COGO systems can provide a suitable subroutine to enable a user to employ the method. Hard copy survey maps and legal descriptions may be converted into accurate computer based drawings. The method provides a quality control check of source documents by disclosing the closure of the bounding lines and superposing the vector drawing over any originally scanned drawing image.

43 Claims, 38 Drawing Sheets

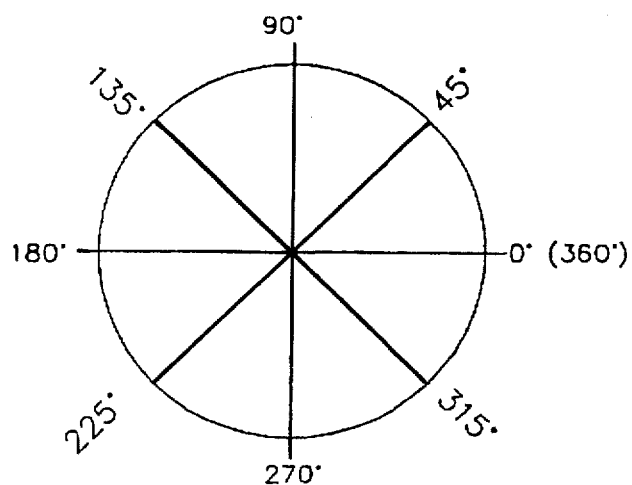
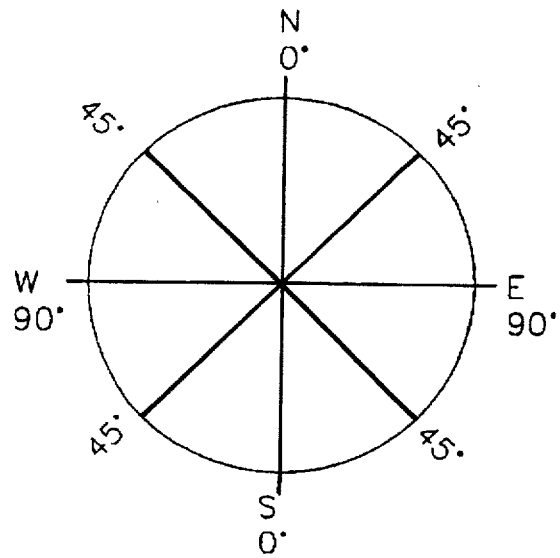
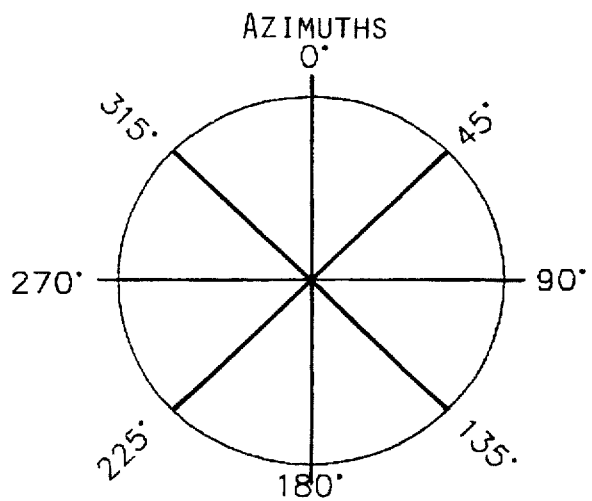
FIG. 5

ELEMENTS OF A CURVE

PARCEL "A"

PART OF THE NE 1/4 OF THE NE 1/4 OF SECTION 17, T15N-R7W, CITY OF LA CROSSE, LA CROSSE COUNTY, WISCONSIN DESCRIBED AS FOLLOWS:

COMMENCING AT THE NE CORNER OF SAID SECTION; THENCE S14°13'22"W 452.66' TO THE POINT OF BEGINNING;

THENCE S37°10'00"E    123.49';

THENCE S33°31'00"E    204.85';

THENCE N44°24'04"E    248.09';

THENCE N45°37'20"W    360.00';

THENCE S33°03'00"W    190.69'   TO THE POINT OF BEGINNING.

FIG. 29

PARCEL "A"

PART OF THE NE 1/4 OF THE NE 1/4 OF SECTION 17, T15N-R7W, CITY OF LA CROSSE, LA CROSSE COUNTY, WISCONSIN DESCRIBED AS FOLLOWS:

COMMENCING AT THE NE CORNER OF SAID SECTION; THENCE S44°13'22"W 452.66' TO THE POINT OF BEGINNING;

THENCE   S37°10'00"E 123.49';

THENCE   S33°31'00"E 204.85';

THENCE   N44°24'04"E 246.09';

THENCE   N45°37'20"W 360.00';

THENCE   S33°03'00"W 190.69' TO THE POINT OF BEGINNING.

FIG. 30

PARCEL "A"

PART OF THE NE 1/4 OF THE NE 1/4 OF SECTION 17, T15N-R7W, CITY OF LA CROSSE, LA CROSSE COUNTY, WISCONSIN DESCRIBED AS FOLLOWS:

COMMENCING AT THE NE CORNER OF SAID SECTION; THENCE S44 13'22"W 452.66' TO THE POINT OF BEGINNING;

THENCE   S37 10'00"E 123.49';

THENCE   S33 31'00"E 204.85';

THENCE   N44 24'04"E 246.09';

THENCE   N45 37'20"W 360.00';

THENCE   S33 03'00"W 190.69' TO THE POINT OF BEGINNING.

FIG. 31

PARCEL "A"

PART OF THE NE 1/4 OF THE NE 1/4 OF SECTION 17, T15N-R7W, CITY OF LA CROSSE, LA CROSSE COUNTY, WISCONSIN DESCRIBED AS FOLLOWS:

COMMENCING AT THE NE CORNER OF SAID SECTION; THENCE
S14°19'22"W 452.64' TO THE POINT OF BEGINNING.

THENCE S37°01'00"E 123.49';

THENCE S33°13'00"E 204.85';

THENCE N44°24'04"E 248.09';

THENCE N45°07'20"W 350.00';

THENCE S33°03'00"W 190.65' TO THE POINT OF BEGINNING

FIG. 32

COMPUTER AUTOMATED SYSTEM AND METHOD FOR CONVERTING SOURCE-DOCUMENTS BEARING ALPHANUMERIC TEXT RELATING TO SURVEY MEASUREMENTS

TECHNICAL FIELD

This invention relates generally to a computer automated system and method for converting a hard copy source document bearing alphanumeric text relating to survey measurements to a vector drawing file and in particular, to a computer automated system and method of converting a raster file of a scanned source document bearing alphanumeric text relating to the lengths and directions of the bounding lines of an area surveyed into a mathematically accurate vector computer drawing file based on that alphanumeric text. The invention is particularly well-suited for utilizing a raster file produced by scanning a survey map document having alphanumeric text relating to lengths and directions of the bounding lines of the area surveyed and constructing an accurate computer based survey map. It is also well-suited for scanning a hard copy document bearing a land parcel legal description and constructing an accurate drawing of the parcel.

BACKGROUND OF THE INVENTION

With the development of the Geographic Information System(GIS) technologies one of the major tasks facing our society is the organizing and storing of land survey information for further utilization. Currently, the information is stored in the form of hard copy source documents of various formats and scales. These documents typically contain a scaled hand drawing of the area surveyed, i.e., lines and curves which represent actual measured lines and curves on the earth's surface of the area surveyed, as well as, written text (alphanumeric text) of the lengths, directions and locations of these bounding lines. For source documents such as, but not limited to, a cartographic document, a survey map or a legal description, the basic survey information alphanumeric text is recorded in a conventional manner, known in the art. The vast majority of survey drawings were produced in this way. The media used for the hard copy document is paper, plastic transparencies or vellum, or the like. Errors may be made in the actual survey or in recording the survey measurements or in scaling the hand drawing and miscopying the alphanumeric text on the hand drawing.

More recently users have computer generated the hard copy source documents by manually typing in or electronically inputting (e.g., utilizing a data collector, such as, SMI™ Surveyor's Module, Inc., Church Hill, Tenn.) mathematical information, i.e., the directions and locations of the bounding lines, based on data either gathered from field survey measurements or from other documents, or maps into a user interactive Computer Aided Drafting (CAD) software package employing a coordinate geometry (COGO) program to produce computerized drawings, maps and legal descriptions [See, e.g., GEOCAD™ for architects by Rudy Horowitz Associates Architects, Pound Ridge, N.Y.; SOFT-DESK™ for engineers by Softdesk, Inc., Henniker, N.H.; DEED PLOTTER™ by Greenbrier Graphics, Inc. of Meadow Bridge, W.V., used for legal descriptions to produce a map of the land parcel and to check for "closure" of the map]. The manual method is intrinsically accurate, provided there is accurate data input and data manipulation. However typing errors create an incorrect drawing as well as incorrect labeling of the COGO produced vector lines. By the term CAD, is also meant computer-aided design and drafting (CADD) software. CAD software advantageously allows the user to manipulate drawings without the use of a programming language. [See, e.g., Clapp, U.S. Pat. No. 4,845,643 (simplified computer graphics perspectives), and Saxton, U.S. Pat. No. 5,197,120 (modular parametric design)]. Scaled drawings produced in CAD can be plotted or printed onto paper. It is important to note that while many surveyors are currently using computers to produce their drawings, the finished product which is signed, certified and recorded is a paper drawing and not a computer file.

Using either the hand drafting method or the manual entry CAD method outlined above, surveyors have produced, literally, millions of maps and drawings over the years. A number of other ways are known in the art of conversion for inputting hard copy document survey data into a computer file, manipulating the data using known coordinate geometry (COGO) software and Computer Aided Drafting (CAD) software packages to produce vectorized computer drawings. Conversion is the process of taking a analog hard copy source document and changing it into a digital format suitable for use in a digital computer environment. The most popular methods fall into two categories: the "manual digitizing method," and the "scanning method used with a vectorization of the graphics." [See, P. J. Stevenson, Scanning for Automated Data Conversion of Cartographic Documents, 1994, titled "Report No. 426 Department of Geodetic Science and Surveying, The Ohio State University, Columbus, Ohio/Report No. CFM-R-94-101, The Ohio State University Center for Mapping Columbus, Ohio", pp. 1–95, the disclosure of which is incorporated herein by reference; G. Omura, Mastering AUTOCAD™ B for DOS, SYBEX, Alameda, Calif. 1995, pp. 452–480].

In the manual digitizing method, the user inputs graphical information from the drawing on the hard copy document by tracing the lines on the graphical drawing using a computer pointing device attached to a digitizing pad. The computer program creates vectors. The user types in the textual labeling information for each vector. If the traced drawing is inaccurate, the digitized drawing will necessarily be inaccurate and useless in any subsequent mathematical application requiring accuracy. Scaling errors will also occur because of the hand drawing and because of limitations of the digitizing pad itself. Also, errors may be made in keying text as previously described for the manual method. However, in this instance, the textual error results in mislabeling of the lines on the drawing.

In the scanning method, the user feeds a hard copy source document into a scanner which is connected to a computer. The scanning step converts the image, i.e., text and graphics (any drawing), on the face of a hard copy source document, i.e. typically a map, survey drawing, or other cartographic document, into digital form, a raster file. The user can edit this raster image file to remove artifact. Then the scanned the raster image of the graphical drawing is transported into the computer environment and the raster file is opened inside several different vectorization conversion software systems. These systems to reduce the raster lines which may be multiple pixels in width into simple vectors which, by definition have no width. Raster files have three major disadvantages: (1) they are computer memory intensive; (2) they are difficult to manipulate; (3) most importantly, they are intrinsically not capable of producing mathematically accurate vectors and (4) they are only as accurate as the scanned document subject to the distortions, such as stretching, caused by the scanner itself. There are three ways of vectorizing the raster drawing files: heads-up digitizing, line following, or automated raster vectorization.

In heads-up digitizing or optical vectorization the user simply traces over the raster image of the drawing screen using a suitable computer pointing device to select endpoints of each line[for example, the CADOVERlay™ conversion system by SOFTDESK, Henniker, N.H.]. The computer creates a vector given the selected endpoints. An Optical Character Recognition (OCR) software subroutine may be used to recognize raster text and convert the text to ASCII text, eliminating the need to key-in line label information. Instead of heads-up vectorizing by the user, line following or automated raster vectorization permit the computer to trace over the graphic lines in the raster drawing to create vectors. In line following [See, TRACER™, commercially available from HITACHI SOFTWARE ENGINEERING AMERICA, LTD. (hereinafter HISAL) of Boulder, Colo.; U.S. Pat. No. 4,193,087 by Altman], the computer automatically traces along a designated raster drawing file graphics line. The computer automatically follows from one line segment to the next until it comes to an intersection. At this point, the user designates the direction in which the tracing is to continue. In the other strategy, Automated Raster Vectorization [See, TRACER TRIO™, TRACER™ for AutoCAD™ and RECOGNIZER™ for AutoCAD™ sold as "TRACER TRIO™" by HISAL, or CADCORE™ also by HISAL], the computer recognizes endpoints and intersections of raster drawing file graphics lines and constructs an appropriate vector there between. This can be performed without user intervention. The raster image which appears on the computer screen is limited in its accuracy to the precision of scaled drawing on the source document and to the resolution quality of the optical scanner. In converting the raster drawing lines of the graphical drawing on the source document to vector lines, further error is introduced because the decision must be made as to the exact endpoint of a raster line. The exact intersection is subject to the guess work of the user or computer software program and cannot be determined accurately.

Even after the computer vectorized drawing has been produced as accurately as possible given the limitations herein described, there is no way of knowing whether the graphic data, i.e., the vectors produced, relate accurately to the mathematical data expressed in the alphanumeric text which describes the directions and distances of each of the bounding lines of the original area surveyed. Thus, in any drawing converted by the current automated scanning and vectorization art, the vector lines produced and the text associated with them will be at variance. There could be a mistake in the text, either in the original document or in the optical character recognition process. Plus, there is no mathematical relationship between the vector entities and the textual entities in a drawing converted through scanned source documents in current art.

Also optical character recognition has been most effective when recognizing text that is perfectly horizontal and of a standard font type. Recently, non-standard fonts and hand written text are recognized by the OCR. In a typical drawing or map to be converted, the alphanumeric text of concern is often written along the same angle as the line to which it refers.

Techniques for recognizing hand drawn graphic symbols on scanned engineering drawings to produce vectorized graphic data, are known in the art. [See, Bhaskaran (U.S. Pat. No. 4,949,388).] Likewise, methods of processing information from scanned hard copy documents containing text or text and graphics and use of OCR recognized text is known. (Lech et al., U.S. Pat. No. 5,258,855).

Despite recognition and study of various aspects of hard copy cartographic source document conversion to digital format, the prior art has produced very little in the way of providing an accurate computer automated system and method of converting a raster file of a scanned hard copy source document bearing alphanumeric text relating to the lengths and directions of the bounding lines of an area surveyed into a mathematically accurate vector computer drawing file based on that alphanumeric text.

SUMMARY OF THE INVENTION

The present invention responds specifically to the long-felt need heretofore unmet by prior art and especially with a view to overcoming the intrinsic inaccuracies of converting a raster file of a scanned hard copy source document bearing alphanumeric text relating to the lengths and directions of the bounding lines of an area surveyed into a mathematically accurate vector computer file based on the alphanumeric text.

The foregoing and other advantages of the present invention are realized in one aspect thereof in a computer method of converting an alphanumeric text relating to a length and a direction of a bounding line of an area surveyed from a hard copy source document into a mathematically accurate vector. The method includes: (a) receiving digitized output from an automated digitizing unit into a CAD applications program in a computer, where the output comprises alphanumeric text relating to a length and a direction of a bounding line of an area surveyed, and in a format usable by the CAD applications program where the CAD applications program includes a coordinate geometry subroutine, the alphanumeric text having been scanned from the hard copy source document; (b) recognizing the alphanumerical text in an optical character recognition subroutine operating in the CAD applications program; (c) transporting the alphanumeric text from step (b) in a format usable by the coordinate geometry subroutine into the coordinate geometry subroutine; and (d) converting the alphanumeric text from step (c) into a mathematically accurate vector, the vector having an orientation and a distance corresponding to the length and the direction of the bounding line of the area surveyed, the vector also having a beginning point coordinate and an endpoint coordinate.

The method further includes in step (b) setting an optical character recognition parameter in the optical character recognition subroutine to recognize numerals from the group consisting of 0, 1, 2, 3, 4, 5, 6, 7, 8 and 9, and alphabet characters from the group consisting on N, S, E and W, and symbols from the group consisting of °, ', and "; and recognizing these numerals, alphabet characters and symbols.

In another aspect, the present invention discloses an automated conversion system for converting alphanumeric text relating to lengths and directions of bounding lines of an area surveyed from a hard copy source document into mathematically accurate vectors. The system comprises in combination an automatic digitizing unit for document scanning and a computer having a CAD applications program. The computer includes receiving means. The program includes recognition means, conversion means, transport means and vectorization means. The automatic digitizing unit scans a hard copy document having alphanumeric text relating to lengths and directions of bounding lines of an area surveyed, and creates a digitized raster file corresponding to the alphanumeric text, and then outputs the digitized raster file. The receiving means is operatively associated with the automated digitizing unit for receiving the digitized raster file into the CAD applications program. The recognition means is for recognizing the file and creating an ASCII text file and comprises an optical character recognition subroutine operating in the CAD applications program. The conversion means, operatively associated with the recognition means, is for converting the ASCII text file into a converted file useable in the coordinate geometry subroutine. The transport means, responsive to the converted file, is for transporting the converted file into the coordinate geometry subroutine. The vectorization means, operatively associated with the transport means is for converting the converted file into mathematically accurate vectors representing the lengths and the directions of the surveyed area and comprises a coordinate geometry subroutine.

In yet another embodiment, the present invention provides a computer method of converting alphanumeric text relating to lengths and directions of bounding lines of a land parcel from a legal description hard copy source document into mathematically accurate vectors comprises the steps of: (a) receiving digitized output from an automated digitizing unit into a CAD applications program, the output representing alphanumeric text relating to lengths and directions of bounding lines of an area surveyed, the CAD applications program having a coordinate geometry subroutine, the alphanumeric text having been scanned from a legal description hard copy source document; (b) recognizing the alphanumerical text using a textual optical character recognition subroutine operating in the CAD applications program; (c) transporting the alphanumeric text into the coordinate geometry subroutine; and (d) converting the alphanumeric text in the coordinate geometry subroutine into mathematically accurate vectors representing the lengths and the directions of the bounding lines of the land parcel. The method further comprises the step (e) of arranging sequentially the vectors according to a sequence of the bounding lines to form a graphical representation of the land parcel. The method can further include abstracting the alphanumeric text in step (c). The method may include formatting the alphanumeric text into a format useable in the coordinate geometry subroutine in step (c).

In still yet another aspect of the present invention, a computer quality control method for a legal description comprises the steps of (a) scanning a legal description hard copy source document using an automated digitizing unit, the document having alphanumeric text relating to lengths and directions of bounding lines of a land parcel, (b) receiving digitized output, the output representing the alphanumeric text, from the automated digitizing unit into a CAD applications program, the CAD applications program having a coordinate geometry subroutine (c) recognizing the alphanumerical text using a textual optical character recognition subroutine operating in the CAD applications program; (d) transporting the alphanumeric text into the coordinate geometry subroutine; (e) converting the alphanumeric text in the coordinate geometry subroutine into mathematically accurate vectors representing the lengths and the directions of the bounding lines of the land parcel; and (f) arranging sequentially the vectors according to a sequence of the bounding lines to form a representation of the land parcel. The quality control method for a legal description can further comprise the step of (g) computing a closure distance between a pair of adjacent the vectors, the closure distance expressed as a distance Delta X and a distance Delta Y, where the distance Delta X is the difference between an X coordinate of the endpoint of one of the adjacent vectors and the X coordinate of the beginning point of the next adjacent vector and the distance Delta Y is the difference between a Y coordinate of the same the endpoint of the one adjacent the vector and the Y coordinate of the same the beginning point of the next adjacent vector. The quality control method for a legal description can further comprise the step of displaying the representation of the land parcel and the closure distance.

In yet a further embodiment, the present invention provides a computer method of converting alphanumeric text relating to lengths and directions of bounding lines of an area surveyed from a cartographic hard copy source document into mathematically accurate vectors comprises the steps of: (a) receiving digitized output from an automated digitizing unit into a CAD applications program, the output representing alphanumeric text relating to lengths and directions of bounding lines of an area surveyed, the CAD applications program having a coordinate geometry subroutine, the alphanumeric text having been scanned from a cartographic hard copy source document; (b) recognizing the alphanumerical text using a textual optical character recognition subroutine operating in the CAD applications program; (c) transporting the alphanumeric text into the coordinate geometry subroutine; and (d) converting the alphanumeric text in the coordinate geometry subroutine into mathematically accurate vectors representing the lengths and the directions of the bounding lines of the area surveyed. The method further comprises the step of arranging sequentially the vectors according to a sequence of the bounding lines to form a representation of the area surveyed. The method can further comprise the steps of displaying the digitized output; overlaying the vectors on the digitized output; and displaying same. Where the cartographic hard copy source document, has a drawing thereon and wherein the CAD applications program includes a graphics recognition subroutine with a graphics drawing vectorizer subroutine, step (b) of the method may further comprise recognizing the drawing using the graphics recognition and creating a graphics vectorized drawing. The method may further comprise the steps of displaying the digitizing output; overlying the graphics vectorized drawing thereupon; and displaying same.

In still yet a further aspect, the present invention provides a computer quality control method for a cartographic document. The method comprises the steps of: (a) scanning a cartographic hard copy source document using an automated digitizing unit, the document having a drawing thereon and alphanumeric text relating to lengths and directions of bounding lines of an area surveyed recorded thereon; (b) receiving digitized output, the output including the alphanumeric text relating to lengths and directions of bounding lines of an area surveyed and a digitized drawing from an automated digitizing unit into a CAD applications program, the CAD applications program having a coordinate geometry subroutine, the alphanumeric text and the drawing having been scanned from the cartographic hard copy source document; (c) displaying the digitized drawing; (d) recognizing the alphanumerical text using a conversion system operating in the CAD applications program and having a graphics and textual optical character recognition subroutine and having a graphics drawing vectorizer subroutine, and recognizing the alphanumeric text using the textual optical character recognition subroutine; (e) transporting the alphanumeric text into the coordinate geometry subroutine; (f) converting the alphanumeric text in the coordinate geometry subroutine into mathematically accurate vectors representing the lengths and the directions of the bounding lines of that area surveyed; and (g) arranging sequentially the vectors according to a sequence of the bounding lines to form a representation of the area surveyed and overlaying the vectors on the digitized drawing. The method may further comprise the steps of computing a closure distance between a pair of adjacent vectors, where the closure distance is expressed as a distance Delta X and a distance Delta Y, where the distance Delta X is the difference between an X coordinate of the endpoint of one of the adjacent vectors and the X coordinate of the beginning point of the next adjacent vector and the distance Delta Y is the difference between a Y coordinate of the same endpoint of one adjacent vector and the Y coordinate of the same beginning point of the next adjacent vector; and (ii) displaying the representation of the vectors overlaid on the digitized drawing file and displaying the closure distance.

In still a further aspect of the invention, is a computer quality control method for a textual optical character vectorizer subroutine program. The method comprise the steps of: (a) scanning a hard copy source document using an automated digitizing unit, the document has a drawing thereon with the alphanumeric text relating to lengths and directions of bounding lines of an area surveyed recorded with the alphanumeric text having been accurately recorded and with the drawing having been accurately scaled to the alphanumeric text; (b) receiving digitized output, the output including the alphanumeric text relating to lengths and directions of bounding lines of an area surveyed and a digitized drawing from an automated digitizing unit into a CAD applications program, the CAD applications program having a coordinate geometry subroutine, the alphanumeric text and the drawing have been scanned from the hard copy source document; (c) recognizing the alphanumerical text using a textual optical character recognition operating in the CAD applications program; (d) transporting the alphanumeric text into the coordinate geometry subroutine; (e) converting the alphanumeric text in the coordinate geometry subroutine into mathematically accurate vectors representing the lengths and the directions of the bounding lines of the area surveyed; and (f) arranging sequentially the vectors according to a sequence of the bounding lines to form a representation of the area surveyed and displaying the representation. The method further comprises displaying the digitized drawing between steps (b) and (c), and displaying the representation as overlaid on the digitized drawing. The method further comprises the steps of computing and displaying a closure distance between a pair of adjacent vectors. The closure distance is expressed as a distance Delta X and a distance Delta Y. The distance Delta X is the difference between an X coordinate of the endpoint of one of the adjacent vectors and the X coordinate of the beginning point of the next adjacent vector. The distance Delta Y is the difference between a Y coordinate of the same endpoint of the one adjacent vector and the Y coordinate of the same the beginning point of the next adjacent vector.

Other advantages and a fuller appreciation of the specific attributes of this invention will be gained upon an examination of the following drawings, detailed description of preferred embodiments, and appended claims. It is expressly understood that the drawings are for the purpose of illustration and description only, and are not intended as a definition of the limits of the invention.

BRIEF DESCRIPTION OF THE DRAWINGS

The preferred exemplary embodiment of the present invention will hereinafter be described in conjunction with the appended drawing wherein like designations refer to like elements throughout and in which:

FIG. 5 is a diagram comparing the angular format for AutoCAD's™ angles, bearings and azimuths.

FIG. 29 is an example of a hard copy source document, a legal description.

FIG. 30 is a cropped screen dump of the raster file image of FIG. 29.

FIG. 31 is a cropped screen dump of the OCR recognized text of FIG. 30.

FIG. 32 is a cropped screen dump of the FIG. 31 illustrating the change in text format with the FORMAT TEXT command and the selection of a starting point of drawing construction.

DETAILED DESCRIPTION

Figure 1:
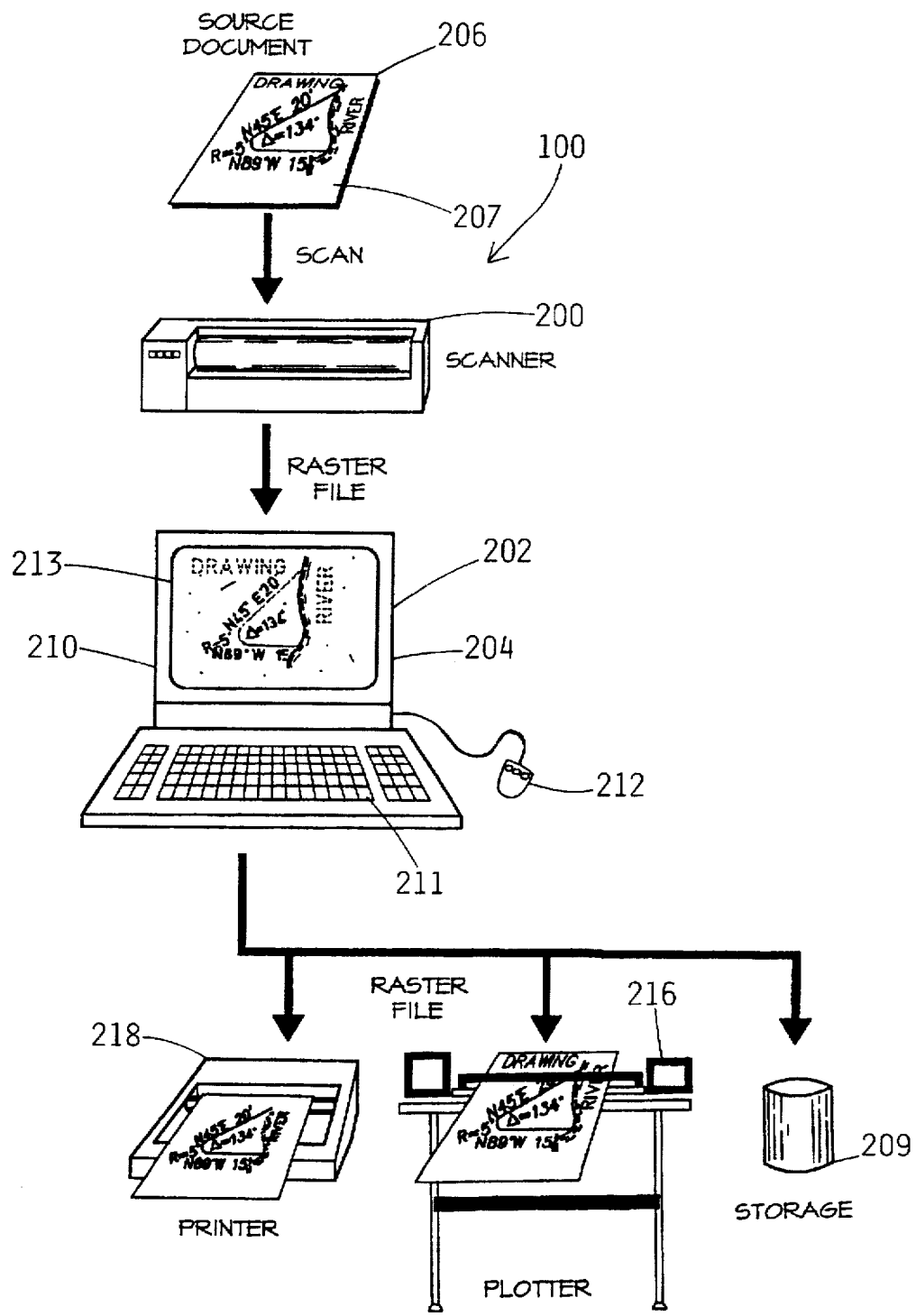
FIG. 1 is a diagram illustrating the automated conversion system of the present invention.

This invention relates generally to a computer automated system and method for converting a hard copy source document bearing alphanumeric text relating to survey measurements to a vector drawing file and in particular, to a computer automated system and method of converting a raster file of a scanned source document bearing alphanumeric text relating to the lengths and directions of the bounding lines of an area surveyed into a mathematically accurate vector computer drawing file based on that alphanumeric text. The invention is particularly well-suited for utilizing a raster file produced by scanning a survey map document having alphanumeric text relating to lengths and directions of the bounding lines of the area surveyed and constructing an accurate computer based survey map. It is also well-suited for scanning a hard copy document bearing a land parcel legal description and constructing an accurate representation of the parcel.

The hard copy source document may be of paper, vellum, polyester film, plastic transparencies, microfilm, or microfiche. The present invention also can use images scanned by video recording devices and computer cameras.

The invention includes hardware and software necessary to extract, retrieve and convert the alphanumeric text, relating to the lengths and directions of the bounding lines of an area surveyed, from a hard copy source document into mathematically accurate vectors. As used herein, the term "vector" or "vectors", means straight lines having length and direction as well as curved lines having length and direction. A vector "straight line" can be described by two points (the start point and the endpoint). A vector "curved line" can be described by three points the start point, the endpoint and the center point. As is known in the art, the direction of the curve is implicit in the relationship among these points.

As used herein, the term "file" is meant to encompass, i.e., that group of information which is in the form of a certain data type. For example, but not limited to, the "raster text file" is that group of alphanumeric data expressed as raster text; "mathematically based ASCII file" is that group of ASCII text which pertains to the mathematical properties of lines and arcs. For convenience, these filed are typically separated into layers within the CAD drawing itself which can be deleted, frozen, turned on or off and otherwise manipulated as is commonly known in the CAD art. The word "file" does not necessarily refer to a discrete bundle of information located at a specific address in the memory of the computer and may include information which is separated within the drawing itself.

The bounding lines of the area surveyed may be straight lines or curved lines. The format as used herein for recording the alphanumeric text for the bounding lines is conventional in the survey art. Where the recorded alphanumeric text describes a straight line, typically the line has two properties, a distance and a direction. The distance may be expressed in units of measurements such as feet, represented by the symbol (') or meters, represented by the symbol (m). The direction can be expressed as bearing or azimuth. The bearing may be represented symbolically as (N or S) DD°MM'SS" (E or W). The bearing of a line is the angular deviation measured in degrees, minutes and seconds from a true north (N) and south (S). Where there is an easterly (E) or westerly (W) direction, this is also recorded in the text giving the bearing. The distance is the length of the line. Each segment of a straight line contains a bearing and distance which completes a description for that particular line. Thus, bearings would have the following alphanumeric text strings: NDD°MM'SS", NDD°MM'SS"E, NDD°MM'SS"W, SDD°MM'SS", SDD°MM'SS"E, SDD°MM'SS"W DD°MM'SS"E, or DD°MM'SS"W, wherein DD° represents degrees, MM' represents minutes and SS" represents seconds of the bearing and DD is a numeric character ranging from 00 to 90, MM is a numeric character ranging from 00 to 59 and SS is a numeric character ranging from 00 to 59 and such that a character string portion DD°MM'SS" ranges from 00°00'00" to 90°00'00".

Sometimes instead of bearing and distance, azimuth and distance are given. The azimuth of a line is the angular deviation(direction) measured in degrees, minutes and seconds, where the angular deviation is being measured from the NORTH point through 360 degrees. North is expressed as 0 degrees, East is 90 degrees, South is 180 degrees and West is 270 degrees. An azimuth would have the following alphanumeric text string: DDD°MM'SS" wherein DDD° represents degrees, MM' represents minutes and SS" represents seconds and wherein, DDD is numeric character ranging from 000 to 359; MM is a numeric character ranging from 00 to 59; and SS is a numeric character ranging from 00 to 59 such that the character string DDD°MM'SS" ranges between 000°00'00" and 359°59'59".

Where the bounding line is a curved line, typically the distance is expressed as a radius in feet or meters and the direction as a delta angle.

The present invention is suitably be practiced by employing a known hard copy document scanning system and software and a known CAD (computer aided drafting or computer aided drafting and design) system that has a coordinate geometry (COGO) subroutine, and a conversion system which includes an optical character recognition (OCR) subroutine which can recognize alphanumeric text, and in combination with incorporating a routine into the CAD software for identifying alphanumeric text relating to the lengths and directions of bounding lines of an area surveyed. The COGO subroutine must be capable of drawing straight lines and arcs from input data, as well as creating labels as an attribute of the line or arc created.

Where the source document also comprises a graphical drawing in addition to the alphanumeric text relating to the lengths and directions of the bounding lines of the area surveyed, then the known CAD system in accordance with the present invention has an automated raster vectorization or graphics recognition program for vectorizing and recognizing graphic drawings. Also other graphical elements, such as, but not limited to, houses, garages, tree lines, shorelines, may be present on the document and are suitably vectorized using the graphics recognition program for vectorizing and recognizing graphic drawings.

Accordingly, the present invention will now be described in detail with respect to such endeavors; however, those skilled in the art will appreciate that such a description of the invention is meant to be exemplary only and should not be viewed as limitative on the full scope thereof.

The automated conversion system 100 of the present invention is generally shown in the diagram in FIG. 1 illustrating the hardware and software needed to practice the method of the present invention. The hardware for practicing the present invention includes the following: a scanner 200 and a computer 202 in a computer work station 204. The scanner 200 is an automated digitizing unit and is suitably any type of a scanner 200, for example an Optical Reader, which extracts information off a hard copy source document 206 having a face 207. The scanned information which is the digitized output 208 from the face 207 of the hard copy document 206 can be saved on a storage device 209 such as a floppy disk or compact disk (CD) or hard disk and converted, according to the method of the present invention at a later time.

The computer work station 204 suitably includes computer 202, a high resolution color display monitor (either a VGA or SVGA) 210 with screen 213 and a high resolution color display card, a keyboard 211, a mouse 212, a hard disk (not shown), and a plotter 216. The computer preferably has at least 16 MB (megabytes) of RAM, at least one disk drive capable of reading a 3.5 inch 1.44 MB disk, and a hard disk with at least 100 MB or more of free memory space. The computer 202 should have at least one serial port or a switch box (not shown) installed. An optional printer 218 may be used instead of or in addition to the plotter 216.

The software in accordance with the present invention is commercially available and includes document scanning software, a conversion program with an OCR subroutine, a CAD program having a COGO subroutine and if necessary, a subroutine for converting a scanned image file into a format that can be used in the specific CAD environment and an automated graphics recognition vectorizing software, if graphic drawings are on the document being scanned.

Figure 2:
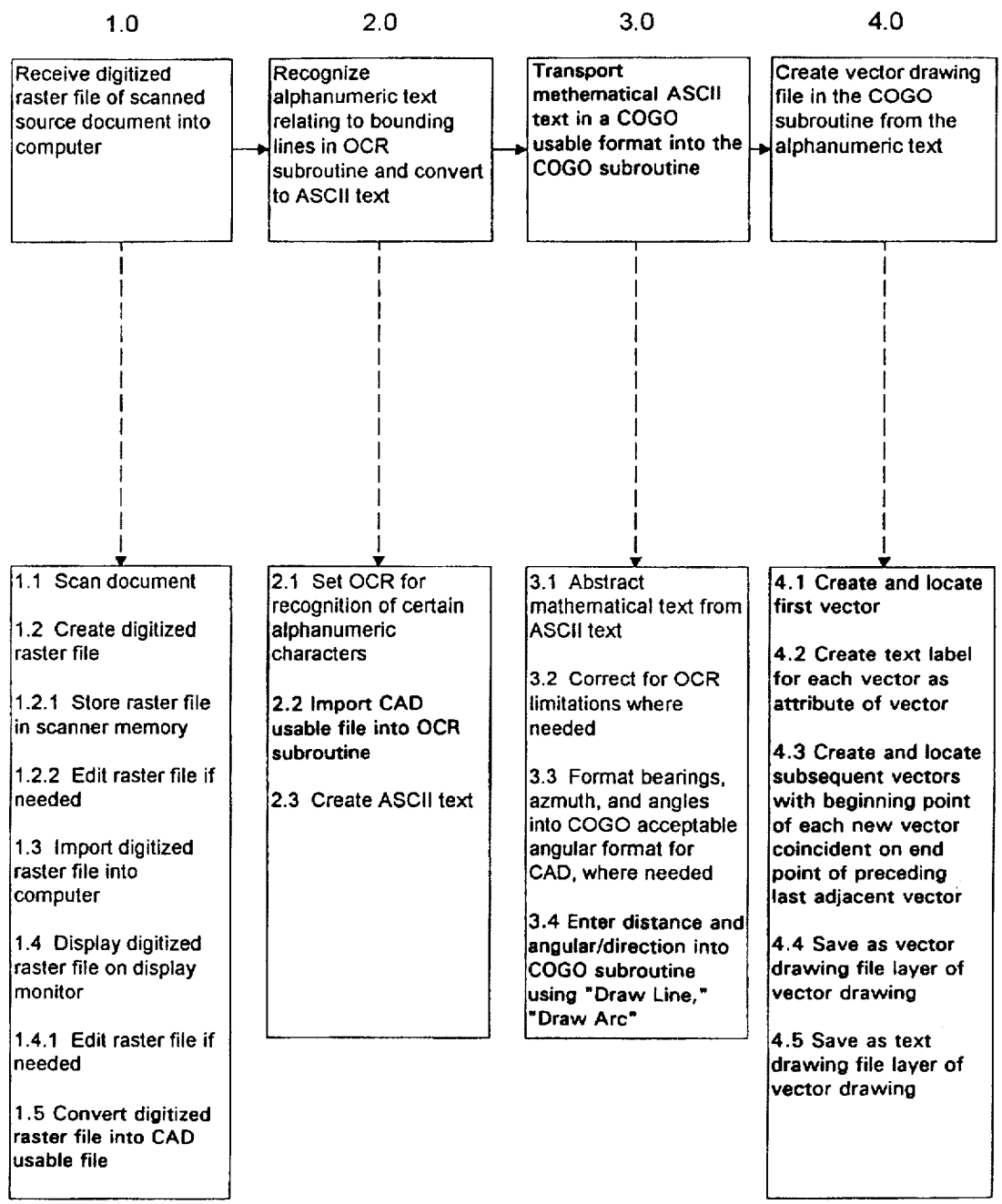
FIG. 2 is a diagram illustrating the automated conversion method of the present invention.
Figure 3A:
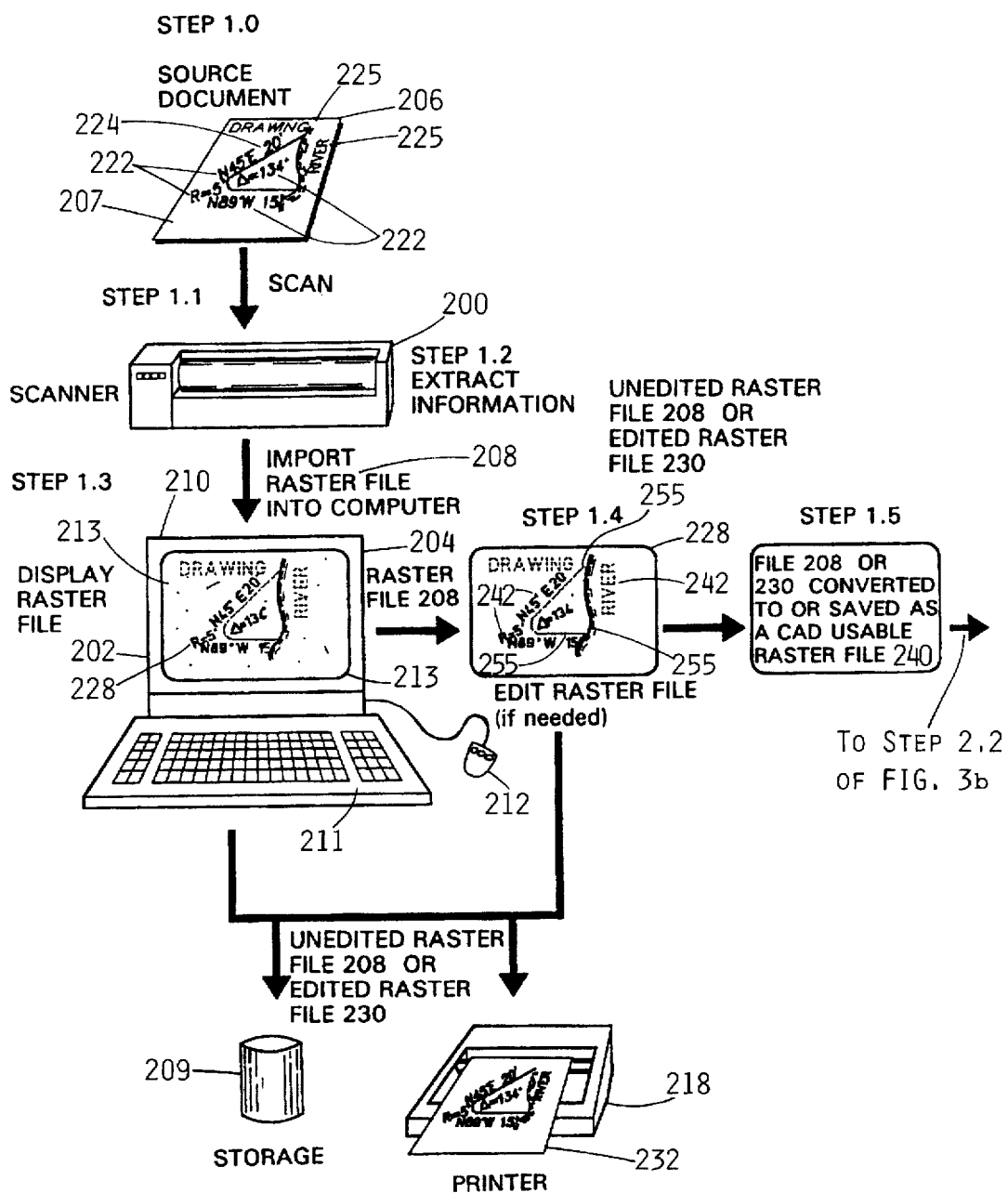
FIG. 3 is a diagram further illustrating the automated conversion method of the present invention.
Figure 3B:
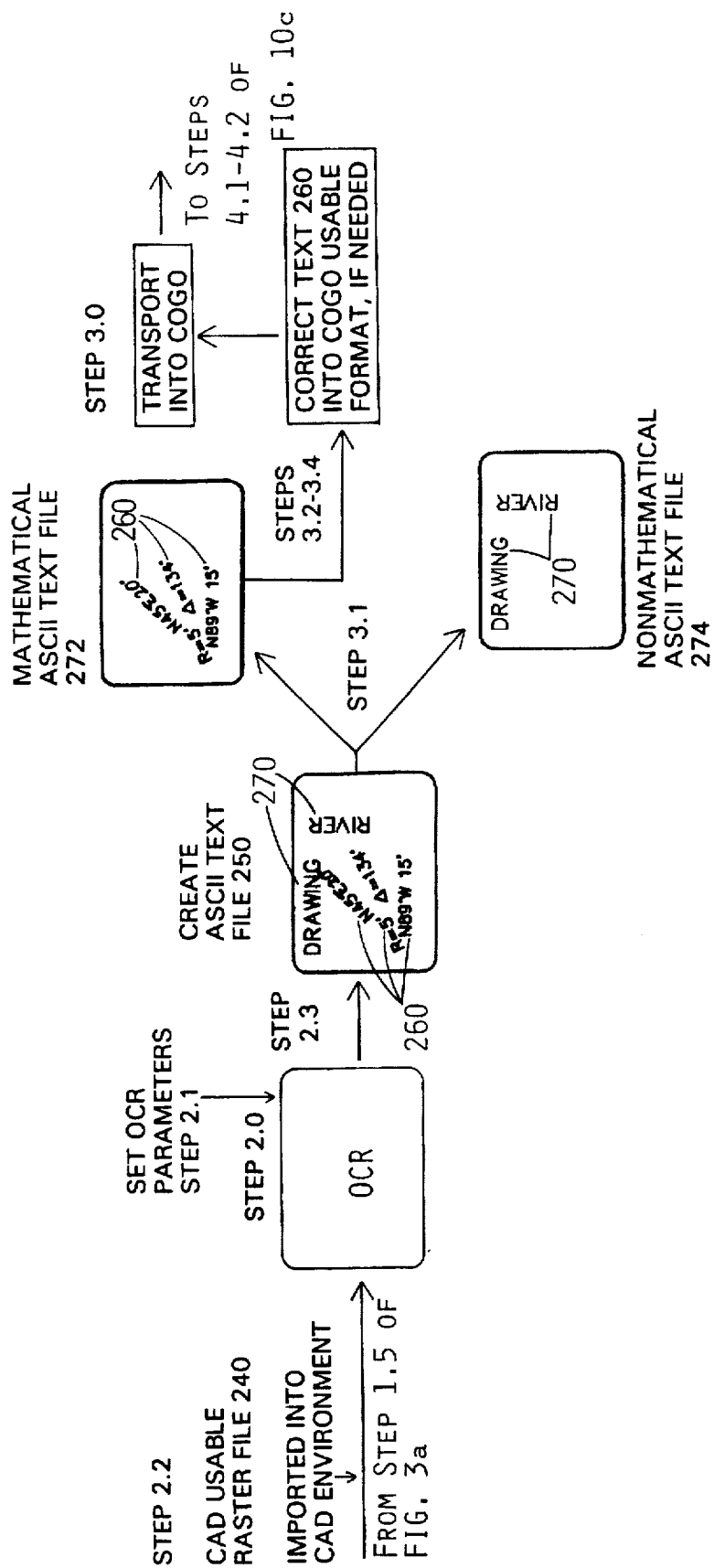
Figure 3C:
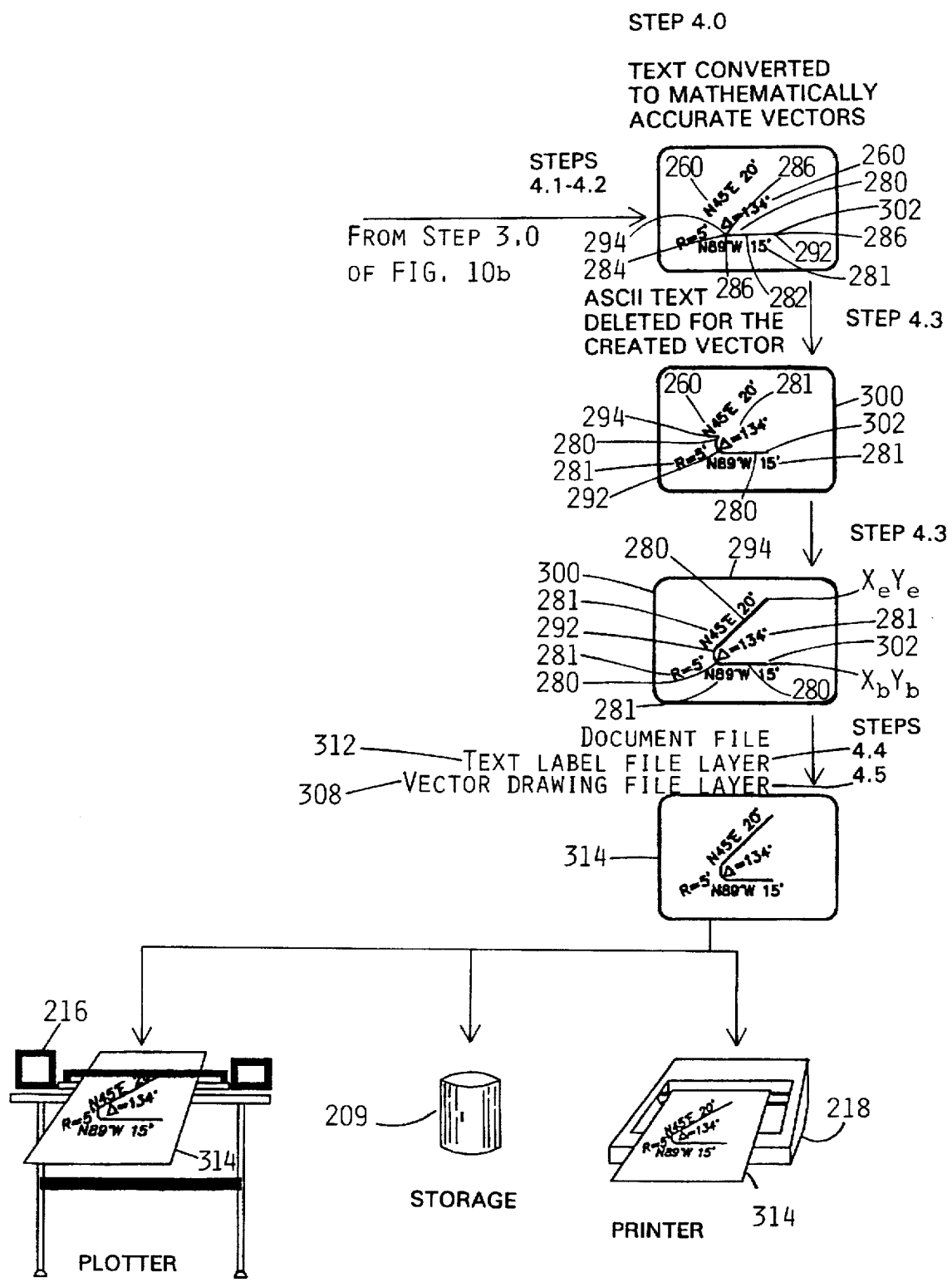

The present method of conversion for hard copy documents, such as, but not limited to, cartographic documents, survey maps, legal descriptions, is practiced by following steps 1–4 as illustrated in FIGS. 2 and 3. In step 1, output is received from an automated digitizing unit into a CAD program in a digital computer. The output, a digitized raster file, is obtained in the conventional manner by scanning a hard copy source document as was described hereinbefore in the "Background of the Invention". No heads updigitizing or manual digitizing is used. The scanning and receiving the output into the CAD program is depicted in steps 1.1 to 1.5 as best seen in FIGS. 2 and 3.

In step 1.1, in the conventional manner, a hard copy source document 206 is scanned using a standard scanner 200. The resolution of the scanner 200 is set to at least 150 dots per inch (150 DPI). The hard copy source document 206 has alphanumeric text 222 on the face 207 of the document 206 which relates to the lengths and directions of the bounding lines 223 of the area surveyed. In certain instances, the document 206 may also have a graphical drawing 224 thereon, and other alphanumeric text 225 which does not relate to the lengths and directions of the bounding lines of the area surveyed.

In step 1.2, all the information is extracted from the face 207 of hard copy document 206 and stored in the scanner memory in step 1.2.1 as an unedited digitized raster file 208. In step 1.2.2, file 208 may be edited if needed. In step 1.3, this raster file 208 is imported into the computer 202. Alternatively, the raster file 208 may be directly imported into the computer 202 without being stored in the scanner memory. In step 1.4, the digitized raster file 208 also called the image file, is displayed on the display monitor 210 as raster image 228. Raster image 228 displays the scanned content on the face 207 of the source document 206, showing the graphical drawing 224, if present, in the source document 206 as well as text 222 and text 225. In step 1.4.1, the raster file 208 when displayed may be edited, if needed, by the user to correct to minor errors in the scanning process using software typically provided with the scanning hardware, and/or with other editing computer software as is known in the art. For example, the image 228 may be reoriented, artifact removed, etc. If the raster file 208 is edited, an edited raster file 230 is created. The raster file, either the edited raster file 230 or the unedited raster file 208, is suitably stored as a raster file in computer memory, on hard drive, or on a floppy disk, or compact disk (CD), or output as a raster drawing 232 using a standard printer 218 or a standard plotter 216.

Alternatively, more than one hard copy source document may be scanned sequentially, and a separate raster file is created, for each document scanned.

In the present invention, in step 1.5, the raster file 208 or 230 is imported into a standard automated conversion program to convert the digitized raster file 208 or 230 into a converted raster file 240 form useable in the CAD environment. If editing is not needed, then the unedited raster file 208 is converted to a converted raster file 240 in step 1.5. The converted raster file 240 is a digitized file which is referred to sometimes as a "vector file" because the alphanumeric text appears "vectorized", e.g., the individual alphanumeric characters are made up of vector lines.

In step 2, in the CAD environment, those elements of the converted raster file 240 pertaining to the alphanumeric text 222, 225 are converted into an ASCII text file 250 via the optical character recognition (OCR) software. In step 2.1, the OCR software parameters are set to provide optimal recognition levels for the alphabet characters "N", "S", "E" and "W"; for the numerals 0, 1, 2, 3, 4, 5, 6, 7, 8, 9 and for the symbols ", ', °. In step 2.2, the converted raster file 240 is imported into the OCR subroutine using conventional commands.

In step 2.3, the OCR creates an ASCII text file 250 from the converted raster file 240. The ASCII text file 250 is analyzed and ASCII text relating to the mathematics of the drawing, i.e., the alphanumeric text relating to the directions and distances of the bounding lines of the area surveyed, hereinafter "mathematical text" 260, is abstracted, either manually or automatically and separated from the "non-mathematical text." As used herein, the term "abstract" or "abstracted", are meant to refer to "mathematical text" 260 being identified, selected and separated from other text (herein after called "nonmathematical text" 270), and placed into a mathematical text file 272. The "nonmathematical text" 270 is placed in a nonmathematical ASCII text file 274. In accordance with the present invention, the "mathematical text" 260, i.e., alphanumeric text relating to the distance, is suitably selected in one keystroke and the alphanumeric text relating to the direction is selected in a second keystroke. The selection and separation is performed on a bounding line by bounding line basis.

In step 3.0, the mathematical text file 272 is transported in a format usable by the COGO subroutine into the coordinate geometry subroutine. In a preferred embodiment, the OCR software accurately recognizes the symbols ", ' and ° used in alphanumeric text designating direction, and the COGO subroutine accepts the symbols °, . or D to symbolize degrees. Also preferably, the COGO subroutine accepts the angular format in which the original text was recorded. In these circumstances, the mathematical text file is in a format directly useable by the COGO subroutine.

Presently, not all OCRs recognize the symbols " and °. Some OCRs correct the symbol for seconds (") as two minute (') symbols. This failure of present OCRs requires the additional reformatting of the text to place the text in a COGO useable format. In addition, some COGO subroutines only accept the alphanumeric text "D" or "." to indicate degree of an angle, but fail to accept text using the ° symbol. Also, some COGO subroutines accept only certain angular expressions for calculating the vectors and will not accept standard bearing or azimuth format. The present invention in step 3.1, advantageously corrects for OCR limitations where needed and in step 3.2 prepares the alphanumeric text 260 from file 272 into a format usable in the COGO environment by the use of a "FORMAT TEXT" subroutine and a "PLACE" subroutine.

FORMAT TEXT SUBROUTINE

Figure 4:
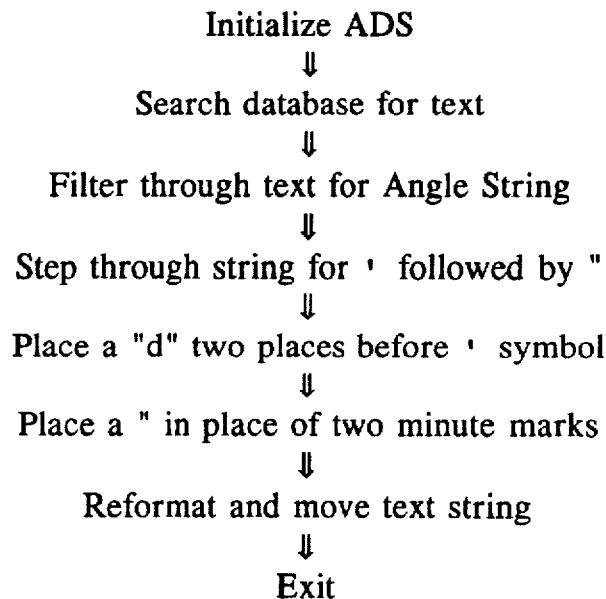
FIG. 4 is a flow chart of the FORMAT TEXT subroutine.

A suitable subroutine "FORMAT TEXT" is shown in the flow chart FIG. 4. This subroutine corrects an OCR's failure to recognize the symbols " and °. It may also be used when the COGO subroutine is unable to accept formatted text which has a ° symbol therein.

The subroutine of FIG. 4 first initializes the ADS. The ADS is an acronym for the AutoCAD™ Development System and is a program environment subroutine. Then the database is searched for the texts selected. Next the text is filtered for the angle string, i.e., the bearing or azimuth string. The computer program searches for a text string for a ' symbol and followed by two minute mark symbols " (or a seconds symbol "). When these symbols are found, the computer places an alphabet character "D" two places before the ' symbol. A seconds symbol (") replaces the two minute symbols. The reformatted text string is now in a COGO useable format. The reformatted text string is then moved into the file for use by the COGO subroutine.

Alternatively where the COGO parameters are set for use of a decimal point in the text string, the FORMAT TEXT subroutine may be modified so that the computer inserts a decimal point into the character string instead of the "D". This invention places the decimal point (.) two places to the left of the minute (') mark.

In certain CAD programs such as AutoCAD™ (Autodesk, Sausalita, Calif.) which has a COGO subroutine, the bearing and azimuth must be further converted to the conventional AutoCAD™ format of expressing angles. AutoCAD's™ COGO expresses directions as angles from 0° to 360° in a counterclockwise format beginning with due east as 0°. Due north is 90°, due west is 180° and due south is 270°. The AutoCAD™ angular format as well as the standard angular formats for bearing and distance are shown on FIG. 5. Bearings may be converted to the AutoCAD™ angular format by using the following formula:

AutoCAD™ Angle ∠=90°−NE bearing in degrees.
AutoCAD™ Angle ∠=270°+SE bearing in degrees.
AutoCAD™ Angle ∠=270°−SW bearing in degrees.
AutoCAD™ Angle ∠=90°+NW bearing in degrees.

Azimuths may be converted to the AutoCAD™ angular format by using the following formula:

AutoCAD™ Angle ∠=450°−azimuth in degrees, for azimuth angles from 90°00'01" to 359°59'59".
AutoCAD™ Angle ∠=90°−azimuth in degrees, for azimuth angles from 0°00'00" to 90°00'00". An azimuth angle of 360° is identical to an azimuth angle of 0°.

For example, before a "picked" bearing such as N14°21'33"E can be used, it must first be converted to an AutoCAD™ angle 75°38'27".

A suitable subroutine "PLACE" was created to convert the source text to the AutoCAD's™ COGO useable angular DDD.MMSS format, where DDD is degrees, MM is minutes and SS is seconds. Accordingly, the angle would be expressed as 75.3827 or 75D3827. In a standard CAD COGO environment, data can be entered by typing out the @ symbol, then the distance, then the "∠" symbol followed by the angle. In accordance with the present invention, in step 3.4, the distance "selected" is used in place of the typed input for the first portion of the formula. The angle information from the bearing or azimuth is corrected to the CAD's COGO acceptable angular format and is automatically entered into the second half of the formula via the "PLACE" subroutine. The distance and bearing are then in a COGO useable format in the CAD program. The PLACE subroutine is automatically invoked when choosing the present invention's Line or Curve option discussed in step 4.

In step 4, within the COGO program, the "mathematical text" 260 in a format useable by the COGO subroutine, is treated as conventionally typed COGO text entry and entered into the COGO subroutine.

The typical COGO mathematical operations occur which create a vector. For lines, standard COGO functions reduce the angle and distance to "X" (easting) and "Y" (northing) components. The "X" component of the vector line to be drawn is added to the "X" component of the coordinate at the start point of the line and the "Y" component of the vector line to be drawn is added to the "Y" component of the coordinate at the start point of the line. The result is a new "X,Y" coordinate which is the endpoint of the line. The line is simply drawn between these two points. Each line has two sets of (X,Y) coordinates; $X_b, Y_b$ at the beginning of the point line and $X_e, Y_e$ at the end point of the line. Thus the alphanumeric text 260 for a bounding line is converted to a vector 280 for that line.

As each COGO produced vector 280 is created, it is automatically labeled with the text 281 attributed to the newly created vector 280. The automatic label generation is known in the CAD art. The vector 280 is displayed as a visible vector line 282 with accompanying text 281 on the display monitor. The terminus 284 of the vector line is a point or node 286 at the beginning or start point 292 and endpoint 294 of the vector 280. Each point or node 286 has an identifying number which is generated in the sequence in which the nodes are created. Each point 292 or 294 is expressed as "X" (easting), "Y" (northing) coordinates. These X,Y coordinates for points 292, 294 for each vector created, along with their identifying numbers are compiled into separate files labeled "Coordinates/Nodes" for subsequent utilization, as is known in the art.

In step 4.1, a first vector 208 is created and located. A beginning location/point 302 of the drawing 300 is determined and a first vector 208 is arranged with its beginning point 306 coincident on a beginning location 302. In step 4.2, as has been previously discussed, as each vector 208 is created it is given a text label 281. In step 4.3, each subsequently created vector 280 is arranged with its beginning points coincident on the endpoints of the previous adjacent vector, using the DRAW LINE OR DRAW ARC commands hereinafter to be described. The vectors 280 are created sequentially according to the sequence of the bounding lines. A drawing 300 is constructed by joining one vector 280 to another.

In step 4.4, the vectors 280 are placed in a vector drawing file layer 308 and saved for the vector drawing file 310. In step 4.5, the alphanumeric text 281 labeling the vectors 280 is placed in a text label file layer 312 in the drawing file 310. The vector drawing file 310 may be stored in a suitable storage medium or may be output as a finished drawing 314 by plotting or printing. The COGO produced vector drawing 314 may be checked for closure by measuring a distance between adjacent vectors 280. Typically, the coordinates $X_e, Y_e$ of the endpoint 294 of the last vector created and the coordinates $X_b, Y_b$ of the beginning point 292 of the first vector created are compared. A closure distance represents the difference $(X_e-X_b)$ between "X" coordinates and the difference $(Y_e-Y_b)$ between "Y" coordinates.

Alternatively, the method of the present invention is suitably practiced by utilizing an existing raster file of a scanned source document and converting it into the mathematically based vectorized computer drawing according to steps 1–4. Also, existing data files of a scanned hard copy source document, including legal descriptions, survey maps, cartographic documents which have been prepared such that they have had the OCR text recognition performed may be processed according to steps 2–4.

DRAWING OF VECTORS

Figure 6:
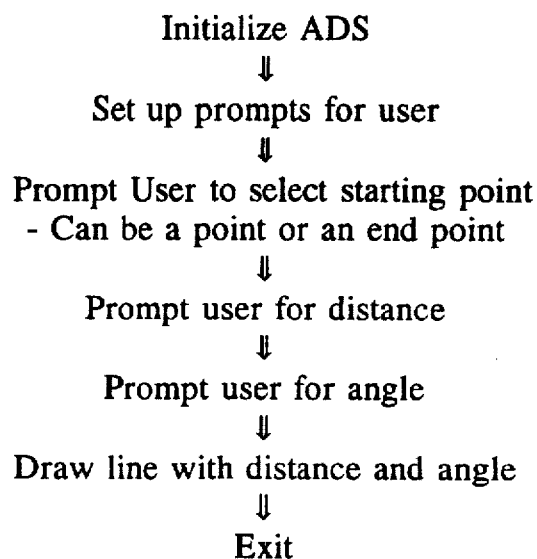
FIG. 6 is a flow chart of an automatic routine PLACE for preparing the identified alphanumeric text into a COGO useable format.

As shown in flow chart of FIG. 6, an automatic subroutine called "PLACE" is used for drawing of each vector line 282, where the line is a straight line. This is an automatic routine that will draw a vector line from a point or an endpoint at the selected textual distance and degree. First, the ADS is initialized, then prompts as will be discussed subsequently, are given to the user. Then, a user is prompted to select a point for the start of line. This point can be a arbitrary starting point or an endpoint of a prior vector. The user is then prompted to select the distance of the new vector line to be created. Then, the user is prompted for the angle of the vector line. The angle is the bearing or azimuth. The vector line is drawn with the correct distance and angle.

Lines are constructed by this invention by using a modification of the standard AutoCAD™ line command, previously discussed.

Figure 7:
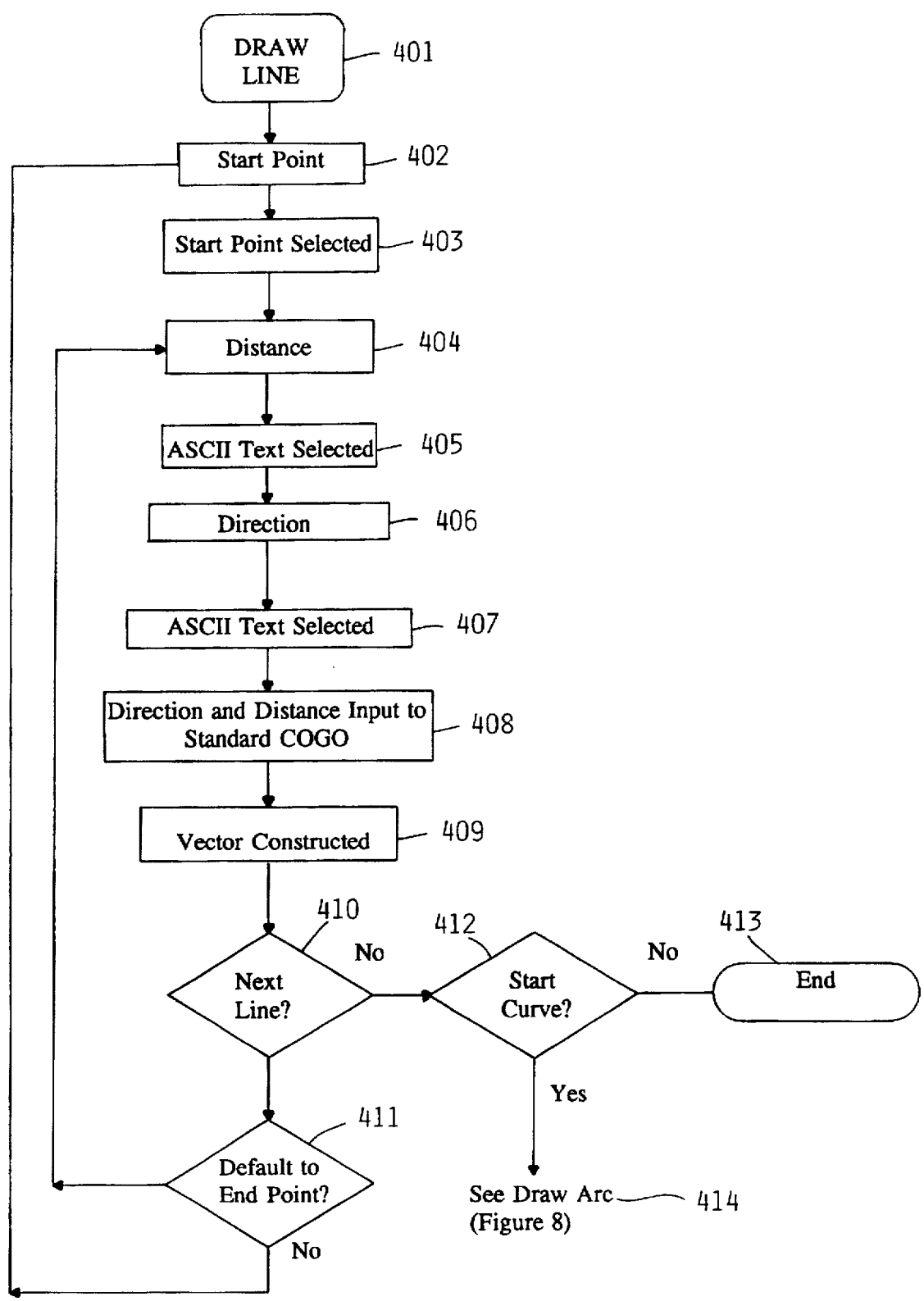
FIG. 7 is a flow chart showing the method by which the present invention generates a vector for a straight line in the conversion process.
Figure 8:
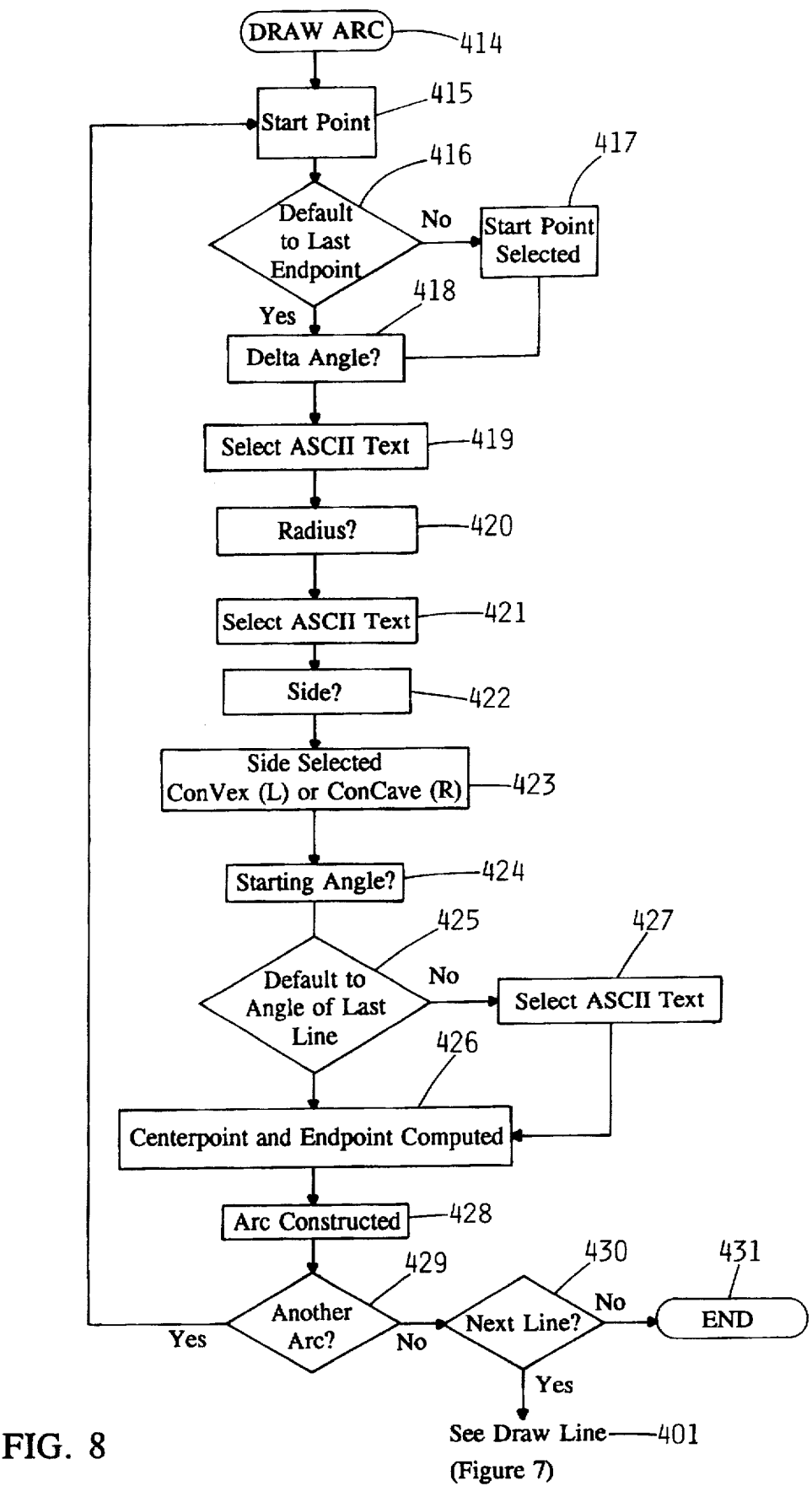
FIG. 8 is a flow chart showing the method by which the present invention generates an arc for curved lines in the conversion process.

The flow charts FIG. 7 and FIG. 8 illustrates the processes for drawing a straight line and a curved line. The user is first prompted as to whether a "LINE" straight line or "ARC" curved line is to be drawn.

TREATMENT OF STRAIGHT LINES

In step 401, of the flow chart of FIG. 7, the program displays "DRAW LINE". In step 402, the program prompts "START POINT" for the user to select and enter the starting endpoint of the vector. In step 403, the user selects and enters the starting point by keying in the text of the starting point or by selecting a point on the underlying raster drawing by clicking on the screen. Typically, this point is an endpoint of a raster line. In step 404, the program prompts "Distance" for the user to select and enter the distance. In step 405, the user selects the ASCII text representing the distance by merely dragging the cursor over the recognized and formatted ASCII text and enters it by clicking on it. In step 406, the program prompts "Direction" for the user to select and enter the direction of the vector. In step 407, the user selects the ASCII text for direction by merely dragging the cursor over to the recognized and formatted ASCII text and entering it by clicking on it. At this point, the angular formatting corrections are made to place the text in the accepted angular format for the COGO subroutine, if needed. In step 408, the selected entered direction and distance in COGO useable text format are input automatically to a standard COGO subroutine. In step 409, the vector is constructed in the COGO subroutine. In step 410, the program prompts "NEXT LINE?". The user answers yes or no to this prompt. If the answer is yes, then in step 411, the program prompts "DEFAULT TO ENDPOINT?". The user defaults to a yes answer or answers no. If the user presses the enter key, the line command defaults to the endpoint of the last vector drawn and steps 404 to 410 are repeated for the next line. If the answer to prompt 411 is no, then the program prompts "Start Point", and the steps 402 to 410 are repeated for the next line. If the answer to the prompt "NEXT LINE" is no, then in step 412 the program prompts "START CURVE". The user answers yes or no. If the answer to the "START CURVE" prompt is no, the "DRAW LINE" subroutine goes to "END" as is indicated by step 413. If the answer to the "START CURVE" prompt is yes, then the user enters into the "DRAW ARC" routine, step 414, as will be subsequently described in FIG. 8.

Suitably this flow chart may be modified for the "common boundary line situation" and an automatic subroutine created for this invention, named INVPLACE (meaning inverse PLACE) may be used. The common boundary line occurs where two parcels may share one or more bounding lines and where there may be only one bearing recorded on the hard copy source document. This bearing is appropriate and correctly expressed for one of the parcels but not the other. The flow chart of FIG. 7 may be suitably modified so that in step 406 the computer reverses the expressed direction of the bearing line by 180°. For example, if the bearing read N40°W, and the bounding line headed S40°W, then the present invention would correct the bearing to S40°W and construct the vector as previously described in the flow chart of FIG. 7.

TREATMENT OF CURVED LINES

This invention constructs arcs by modifying existing typical CAD COGO commands. AutoCAD™ COGO provides several methods of constructing arcs using: three points on arc; start point (S), center (C), end point (E); start point (S), center (C), included delta angle (A); start point (S), center (C), length of chord (L); start point (S), endpoint (E), radius (R); start point (S), endpoint (E), included delta angle (A); start point (S), endpoint (E), starting direction (D) S,E,D; or continuation of previous line or arc CONT. This invention chooses among these methods according to the curve data provided in the recorded alphanumeric text on the document.

In the embodiments of this invention in Examples 1–4 the S,E,D and CONT. methods were modified and used exclusively. In order to use these formats it was necessary to locate an endpoint using the subroutines described below which constructed temporary lines (radii) whose endpoints represented the center and the endpoint of the arc. Once the endpoint of the arc was determined, this was combined with the directional information of the vector leading into (tangent to) the arc and the AutoCAD™ COGO subroutine constructed the arc according to its typical methods.

Figure 9:
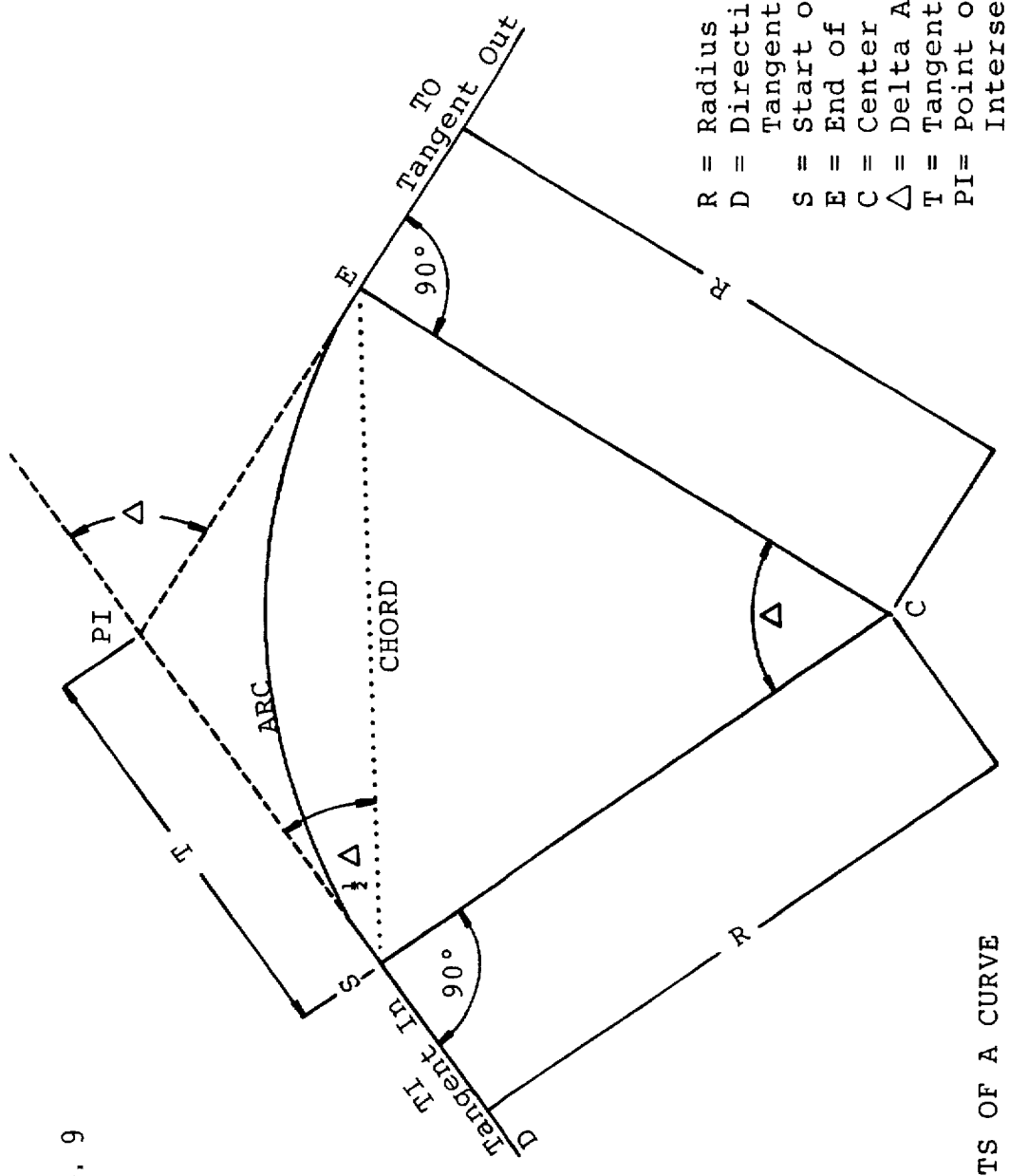
FIG. 9 illustrates the components of a typical arc, including the delta angle.

For curved lines (arcs), preferably the delta angle (Δ) and the radius (R) are used for constructing arcs from the alphanumeric text. The radius (R) is the distance from the center point of the arc to any point on its circumference. As shown in FIG. 9, the central angle or delta angle is the angle formed by two lines radii (R) from the start point S, to the center point C, to the endpoint E. Thus, the delta angle may be expressed as Δ=∠ S,C,E. The chord distance is the distance from S to E. The delta angle is not only important to the accuracy of the curve data, but it is critical to the angular accuracy of the rest of the drawing because of the geometric relationship between the delta angle of the arc and the bearings of the lines leading into (tangent in/TI) and out of (tangent out/TO) the curve. The difference between the tangent in and the tangent out is equal to the delta angle. Thus, the delta angle implies a definite tangent bearing. The chord bearing may be calculated from the tangent in bearing, as is known in the art. The difference between the tangent bearing and the chord bearing is equal to ½ the delta angle.

If the delta angle is not given, then the delta angle is computed by finding the difference between the tangent bearing in and the tangent bearing out according to known standard formulae. Otherwise, other curve data is used as is known in the CAD art.

In the present invention, as shown in flow chart of FIG. 8, in step 414, the program displays "DRAW ARC". In step 415, the program prompts "START POINT". The user either defaults to the endpoint of the last preceding vector or enters No. In step 416, the program defaults to the X, Y coordinates of the endpoint of the last preceding vector line created and internally enters these coordinates as the beginning point for the arc being created. Thus, the endpoint of the preceding line (whether is a straight line or a curved line) is automatically the beginning point for the curve.

If on the other hand, the user keys in or enters "No", then in step 417, a start point is selected by the user keying-in the X,Y coordinates of the starting point or by selecting a point such as the endpoint of a line with a cursor and clicking on the point selected. The mouse is used to move the cursor and to "click". This enters the X,Y coordinates selected as the beginning point for the arc being created.

The program proceeds from step 416 or from 417 to step 418. In step 418, the program prompts "Delta Angle?" for the user to select and enter the delta angle of the arc. In step 419, the user selects and enters the ASCII text of the Delta angle by dragging the cursor over the raster image and clicking on the delta angle text. In step 420, the program prompts for the "RADIUS?" for the user to select and enter the radius of the arc. In step 421, the ASCII text corresponding to the radius is selected by the user by dragging the cursor over the raster image and clicking on the radius text. Once the radius is selected, in step 422, the program prompts the user as to "Side?". The user selects "C" or "V". This is simply a way of determining whether the arc is curving to the left or to the right and is to be constructed "conCave" (to the right) or conVex(to the left). In step 423, the user can respond either by keying in "C" for right or "V" for left, or by using the cursor to select the appropriate side of the last preceding vector line.

In step 424, the computer prompts "STARTING ANGLE?". The user can either default to the angle of the last line or select the ASCII text for the starting angle of the last line. The "Angle of the Last Line" refers to the bearing of the tangent line (TI) coming into the curve (TI in FIG. 9). In the S,E,D, AutoCAD® curve routine referred to earlier, this prompt is asking for the "D" or starting direction component. In step 425, the program defaults to the angle of last line by the user pressing the enter key. Alternatively, the user in step 427 can simply select and enter the appropriate bearing by dragging the cursor over the recognized and formatted ASCII text of the bearing and clicking on the text.

Where the preceding vector was an arc rather than a straight line, the user presses the enter key, whereupon the program defaults to the tangent out of the preceding curve and proceeds to use AutoCAD's™ CONT. curve routine. The CONT. routine is similar to S,E,D except in that the "D" component, (starting direction) is automatically abstracted by the computer program from the preceding curve.

In the next step, 426, the program uses the selected data (radius, delta angle and starting direction) to determine the endpoint of the arc. Since the radius of an arc is, by definition, perpendicular to the tangent, the program automatically constitutes a line beginning at the endpoint of the preceding vector. The line's direction is determined by either adding 90° to the AutoCAD™ angle of the "tangent in" if the arc is deflecting to the right (conCave) or subtracting 90° from the "tangent in" angle if the arc is deflecting to the left (conVex). The length of the line is, of course equal to the radius length. The endpoint of the radius line is, by definition, the center of the arc.

Once the computer has constructed this line, the computer constructs another line from the center point. The direction of this second line is determined by either adding or subtracting the delta angle, again depending on the user's previous response to the "SIDE?" prompt. The length of this line is equal to the radius. The endpoint of this line is, by definition, also the endpoint of the arc. In step 428, the program, having assembled all the mathematical components of the S.E.D formula, automatically invokes the typical AutoCAD™ arc construction command and constructs the arc. The reference lines (radii) constructed to determine the endpoints are superfluous and are automatically deleted/erased.

In step 429, the program prompts "ANOTHER ARC?". The user can select either a yes or no answer to the "Another Arc" prompt. If the answer is yes, then steps 415–428 are repeated. If the answer to the prompt in step 429 is no, then in step 430, the program prompts "NEXT LINE". The user can select a yes or no answer to the "Next Line" prompt. If the answer to the prompt "NEXT LINE" is yes (the default answer), the user presses enter. This causes the program to default to the line drawing subroutine and prompts "START POINT" of step 402 of the line drawing routine in the Draw Line Subroutine. If the answer to prompt 430 is No, then the "DRAW ARC" subroutine is ended in step 431.

Alternatively, the present invention may utilize the CONT. method, which is a modification of the S.E.D method. In CONT. the tangent bearing of the previous line or arc is automatically selected as the direction; and the endpoint of the line or arc is automatically selected as the starting point. The key distinction between the CONT. method and S.E.D method of arc construction is that an arc can be constructed off the tangent of the incoming arc as opposed to an incoming line. AutoCAD™ computes the tangent out of an arc by either subtracting the delta angle from the tangent in of the arc (conCave) or adding it to the tangent (conVex) depending on the direction of the arc.

Alternatively, the present invention may utilize the same basic S.E.D and CONT. strategy where, for example, the chord distance and the chord bearing are given. A temporary line could be constructed using the endpoint of the incoming tangent line as the start point of the chord line. The distance and the bearing is selected in the same manner as is used in the line routine. The endpoint of this line is also the endpoint of the arc to be constructed. The X,Y coordinates of this line are entered into the S.E.D formula. The direction information is taken as a default value from AutoCAD™ angle of the incoming tangent line. If radius and chord length are the given data elements, then the center point of the arc is determined as was previously described. The endpoint is then determined by using a typical distance-distance intersect routine to find point which is the chord length distance from the start point and the radius distance from the center point.

If radius and chord bearing are the given data elements, then a similar strategy would be employed to determine the endpoint coordinates in the S.E.D formula, except that in this case a typical bearing-distance intersect routine would be used to determine the point at which a line at a given bearing from the start point would be exactly the radius distance from the center point.

CHECK OF MAP CLOSURE

The method of the present invention easily lends it self to a method of quality control for checking map closure of the graphical drawing 314 created by the present method. This is especially useful for a legal description, the cartographic document or survey map. In a typical land parcel or survey drawing, there is a selected point of beginning followed by a series of vectors lines and/or arcs joined sequentially to form the perimeter of the area surveyed. The perimeter is defined by the contiguous adjacent bounding lines. The endpoint of the last line or arc should theoretically be identical to the point of beginning of the first line or arc in the sequence. The points should be coincident. The amount of departure from this ideal is known as "closure". Where $XC_c$, $Y_e$ is the endpoint of the vector of last bounding line and $X_b$, $Y_b$ are the coordinates of the beginning point of the vector of the first bounding. The difference between the X-coordinate of the endpoint of the last vector and the X-coordinate of the beginning point of the first vector is computed as Delta $X(\Delta X)$ where $\Delta X=(X_c-X_b)$. The difference between the Y-coordinate of the endpoint of the last vector and the Y-coordinate of the beginning point of the first vector was computed as Delta $Y(\Delta Y)$ where $\Delta Y=(Y_e-Y_b)$. A gap distance may be computed using standard techniques such as balancing routines (available from Softdesk, Henniker, N.H.). A certain amount of inaccuracy occurs because "Bearings and Distances" or "Arcs and radii" or "Azimuth and Distances" are rounded off. Therefore, a closure within a few hundredths distance units is no great cause for concern. As is known in the art, the user can determine acceptable limits for closure for particular mapping applications.

For example, but not limited to this illustration, if the user were mapping a boundary line, a closure of 0.1 foot may be acceptable. Whereas a two foot closure may be acceptable for mapping the boundaries of a garden. The $\Delta X$, $\Delta Y$ distances may be advantageously displayed on monitor 210 or the finished drawing 314. Also the user may employ typical CAD or COGO "windowing" commands to expand the viewing area where the two respective vectors join. The user can visually observe whether a gap exists between the endpoint of the vector of the last bounding line and the beginning point of the vector of the first bounding line. The units of closure may be expressed in English units such as, feet (') and inches ("), or in metric units such as meters or centimeters.

Figure 10A:
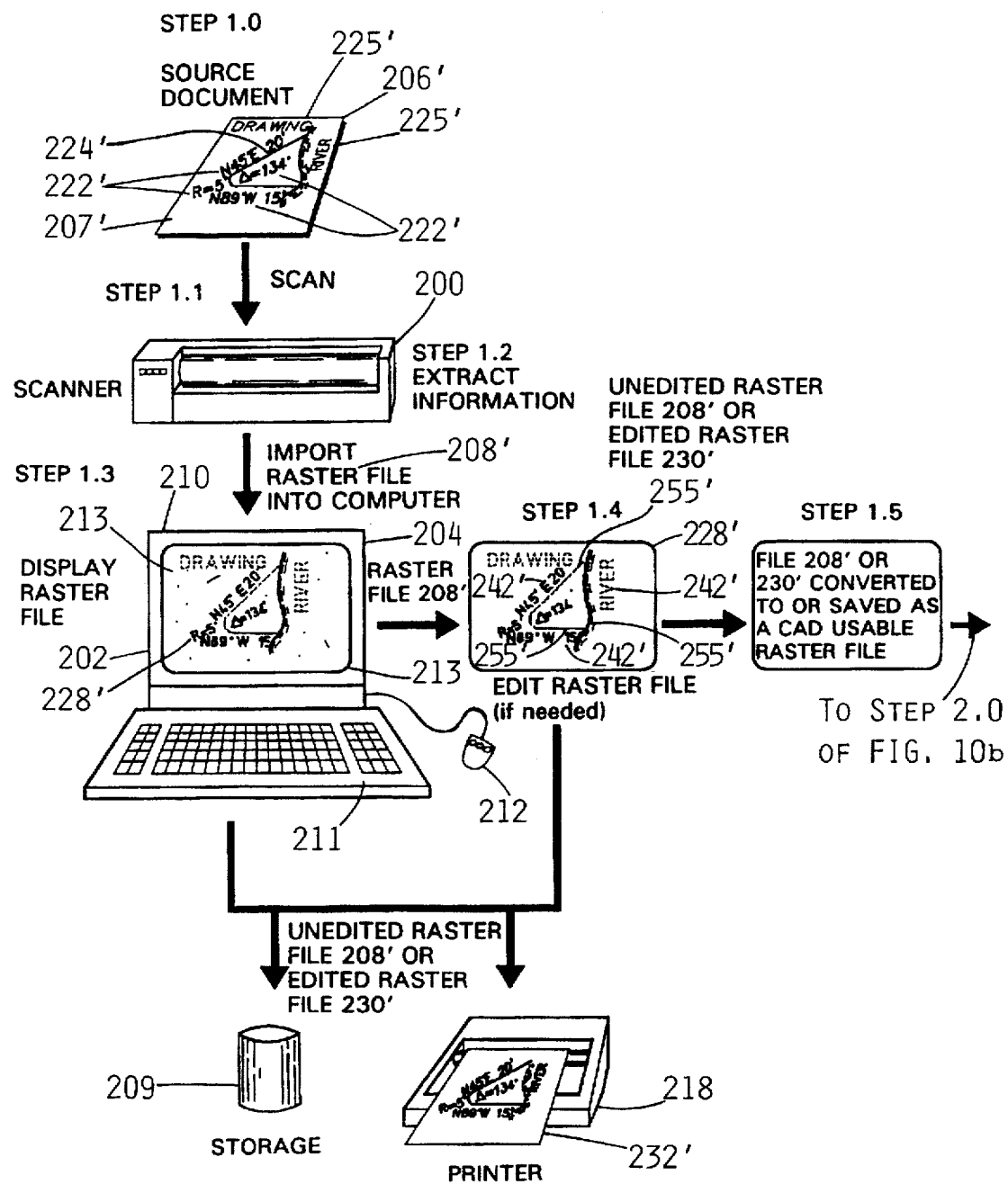
FIG. 10 illustrates the automated conversion system and method of the present invention for converting a typical hard copy source document of parcel drawing in its original form with correct bearings and distances recorded thereon which correspond to the physical survey of the land parcel.
Figure 10B:
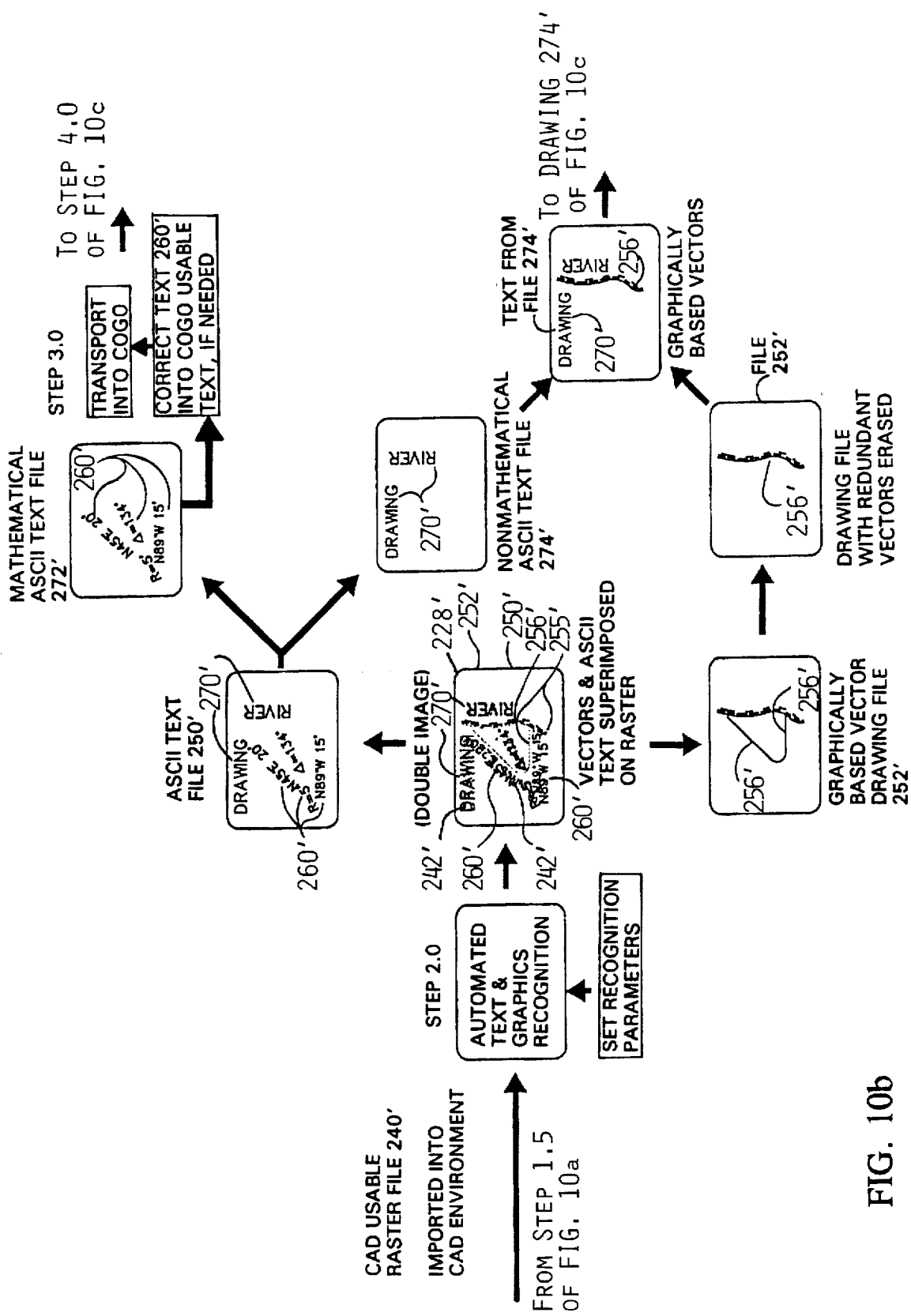
Figure 10C:
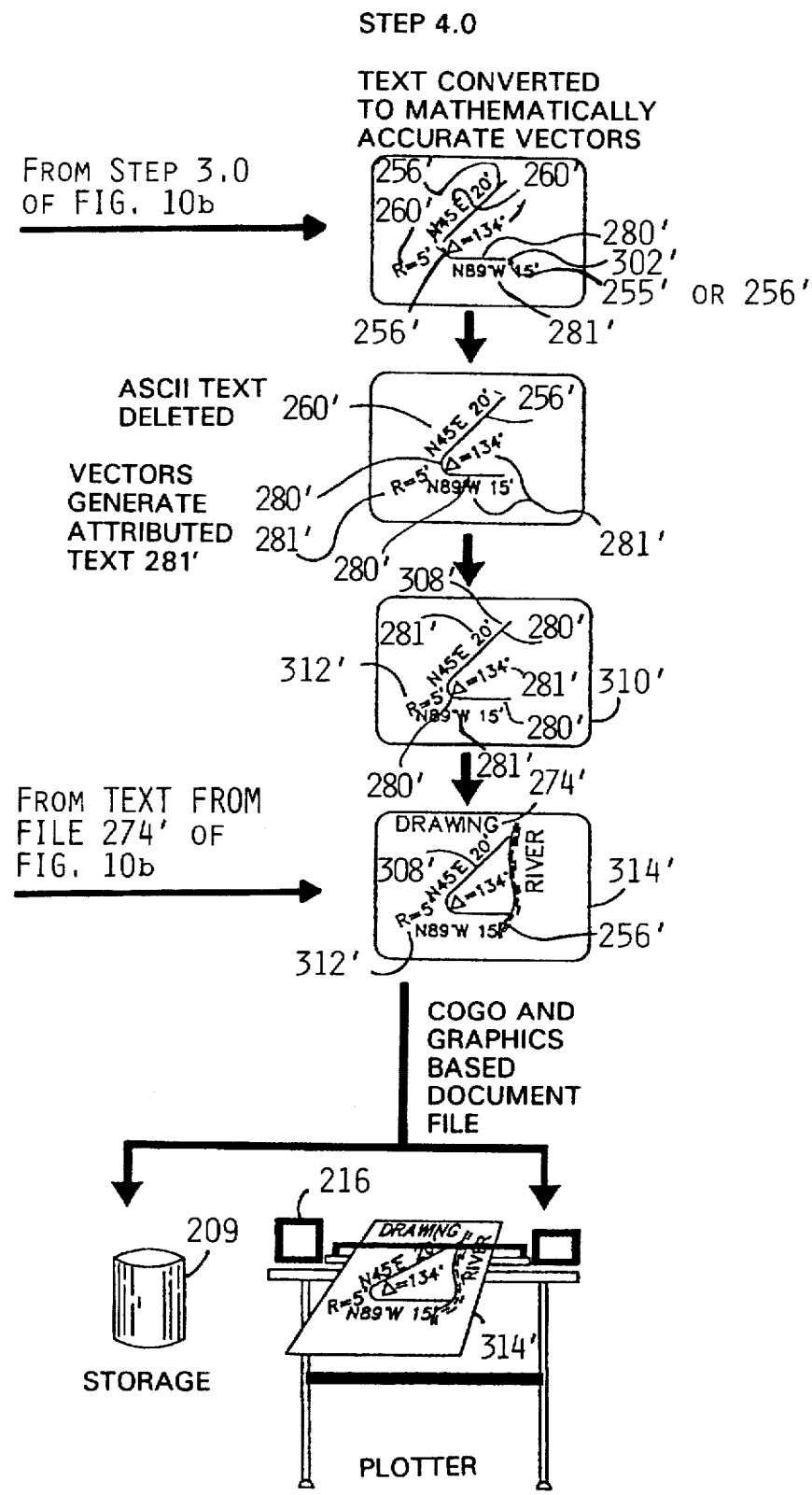

Another embodiment of the present invention, where like numbers are used to reflect similar parts and files, is shown diagrammatically in FIG. 10, utilizes the method steps 1–4 of the present invention as described in FIGS. 2 & 3. This embodiment may be utilized where the hard copy source document 206' has a graphical drawing 224' on the face 207' of the document, as well as the alphanumeric text 222' relating to the bounding lines of the area surveyed and alphanumeric text 225' not relating to the bounding lines. This embodiment suitably uses the computer, the COGO software, the textual OCR software and also automated graphics recognition and vectorization software previously described. The document 206' is scanned according to step 1 as previously described. A digitized raster file 208' is created which may be edited (creating an edited raster file 230') either after collection using the scanner software or edited when it is imported into the CAD program, and may be displayed as a digitized raster image 228' of the face of the document and subsequently converted to a converted raster file 240' useable in CAD. The raster file 240' may be stored as a raster file layer in the CAD drawing program.

Step 2 of the present method is modified for this embodiment to utilize an automated graphics recognition and vectorizing software for the drawing graphics, as well as, utilizing the textual OCR conversion software. The converted raster text file 240' is converted into an ASCII text file 250' and into a vectorized drawing file 252'. The automated graphics recognition and vectorizing software creates the vectorized drawing file 252'. The vectorized drawing file 252' originates in the conversion of the raster graphics which originates as the graphical drawing 224' on the face 207' of the source document 206'. The automatic graphics recognition and vectorizer suitably arranges graphics vectors 256' in the vectorized drawing file 252' to overlay the graphic lines 255' in the digitized raster display 228'. The OCR subroutine creates the ASCII text file 250' from raster text 242'. Likewise, mathematical text 260' and nonmathematical text 270' generated by ASCII text file 250' are abstracted and placed into mathematical text file 272' and nonmathematical text file 274' respectively as previously discussed in the first embodiment of the present invention. Text 260' and text 270' overlays the raster 242' text in the raster display 228'.

In step 3 of the method, the recognized mathematical ASCII text 260' is transported in a COGO useable format into the COGO subroutine, in the manner as has been previously discussed for the first embodiment of the method of the present invention.

In step 4, mathematically accurate vectors 280' are created according to the method previously described for the first embodiment. The method is modified for this embodiment. The beginning point 302' for the drawing 300' may be selected by placement of the first COGO generated vector 280' on an endpoint of a displayed raster graphics line 255' or an automated graphics recognition vector 256'. As each subsequent COGO vector 280' is created, the prior graphics recognition vector 256' is erased and the COGO generated vector 280' is positioned to overlay raster graphics line 255'. The COGO vectors 280' are created vector by vector as previously described. Also as each COGO vector 280' is created, the ASCII text 260' designating bearing and distance, i.e. "mathematical text" is erased and each COGO produced vector 280' is relabeled with text 281' attributed to the newly created vector 280'. Thus each vector 280' displayed is labeled with a bearing and a distance or azimuth and distance or radius and delta angle.

The mathematically accurate vectors 280' along with attributed text label 281' is combined with non-mathematical text file 274' and any non-erased graphic based vectors 256' in file 252' to produce a finished drawing file 314'. The COGO produced vectors 280' are placed on a vector file layer 308' for the vector drawing file 310'; likewise the alphanumeric text labels 281' labeling the COGO generated vectors 280' are placed on a second file label layer 312' in the drawing file 310'.

The vector drawing file 310', finished drawing file 314', vector file layer 308', or vector label layer 312' may be plotted, printed, stored or overlaid on the raster graphics image 228' or edited raster image for quality control comparison. The overlaid drawings may be viewed for gross alignment. Also the drawings 310', 314' may be checked for closure as previously described by computing Delta X and Delta Y for the endpoint of the last vector and the beginning point of the first vector in the sequence, and/or by viewing the enlarged "windowed" junction of the last and first vectors to visually view if the points are coincident.

Steps 1-2 are generally known in the art as graphics conversion by scanning with automated raster vectorization, where the scanned document has a drawing on it. Also an existing file of a scanned hard copy source document which has been prepared such that it has had the automated text and graphics recognition performed may be converted according to steps 3-4. Likewise, raster files of scanned source documents 206' that have a graphical drawing 224' on the face 207' of the document 206' as well as alphanumeric text 222' thereon, may be converted by applying steps 1-4 of the present embodiment.

One of the primary applications of the present invention is in the GIS industry. Since the basic concept of GIS is the spatial relationship of geographic elements, it is important that the base map to which all the other layers and attributes are related be as accurate as possible. The base map of the system is often called the cadastral layer. The data which comprises this layer is collected by real measurements of land masses made by private surveyors and government surveyors. In the present invention, the vector drawing file 308 or 308', as well as the text label file layer 312 or 312' may be placed on this cadastral layer.

The present invention is further explained by the following examples which should not be construed by way of limiting the scope of the present invention.

EXAMPLE 1

CONVERSION OF A CARTOGRAPHIC SOURCE DOCUMENT WITH A GRAPHICAL DRAWING ON THE FACE THEREOF

In the preferred embodiment the following hardware and software were used: an Optical scanner, TrueScan 500 by Vidar Corp of Herndon, Va.; a personal computer, model SM-551500 by Cyberstar Computer Systems of Eden Prairie, Minn. with a Pentium chip 90; 16 megabytes of RAM, and 500 megabytes of hard disc space; a Cyberstar display monitor; a Hewlet Packard 5000 series ink jet plotter; a keyboard by Cyberstar; a three button mouse commercially available from Micro Universal; a hard disk by Cyberstar; a CAD software system (AutoCAD™ Release 12 by Autodesk, Sausalita, Calif.) with a COGO subroutine (AdCADD™ Civil Survey; Softdesk, Inc. Coordinate Geometry, Serial #12CG3B29718, Softdesk, Inc., Henniker, N.H.) Existing recognition and vector conversion software programs were also used in an AutoCAD™ 12 environment, preferably the TRACER TRIO™ (IIS f/k/a I.G.S, a division of Hitachi Inc., of Boulder, Colo.). The TRACER TRIO™ consisted of a combination of "TRACER™ for AutoCAD™" (Version 1.1 or higher) and "RECOGNIZER™ for AutoCAD™" (enhanced version). TRACER™ for AutoCAD™ is a user interactive semiautomatic raster to vector conversion tool that runs on AutoCAD™ Release 12, and requires MS-DOS 5.0 or higher, and a minimum of 8 MB available RAM. It is the core software to which both RECOGNIZER™ and the preferred embodiment of the present invention were written. RECOGNIZER™ was the OCR used. It provided a user interactive series of commands permitting the user to control automatic recognition of graphics, text, or both, as functions in AutoCAD™. RECOGNIZER™ also contained utility functions that allowed the user to set parameters for specific types of drawings, specific graphics within the drawing, and text recognition. AutoCAD™ included a Reject Editor "FRED" to alert the user to text recognition errors noted by the RECOGNIZER™. RECOGNIZER™ digitized all or parts of a scanned drawing or map into vector files as instructed by the user and converted both text and graphics into vector files, when instructed to do so. The "vectorized text" created by the RECOGNIZER™ means that each text letter is shown in vector format. This is to be distinguished from the present invention where the alphanumeric text relating to the length and direction of a bounding line of an area surveyed is converted to a vector line corresponding to a bounding line.

The RECOGNIZER™'s Graphic Defaults assisted in the vectorizing of the graphic drawing. For example, by selecting the "PARCEL map" option, the program set parameters to recognize line intersections and placed vectors at each node. The RECOGNIZER™ text recognition module identified and converted typed or handwritten alphanumeric characters and created CAD useable ASCII text strings. The graphics and text was given different colors and CAD layers. Dimension text was stored on a separate layer.

Figure 11:
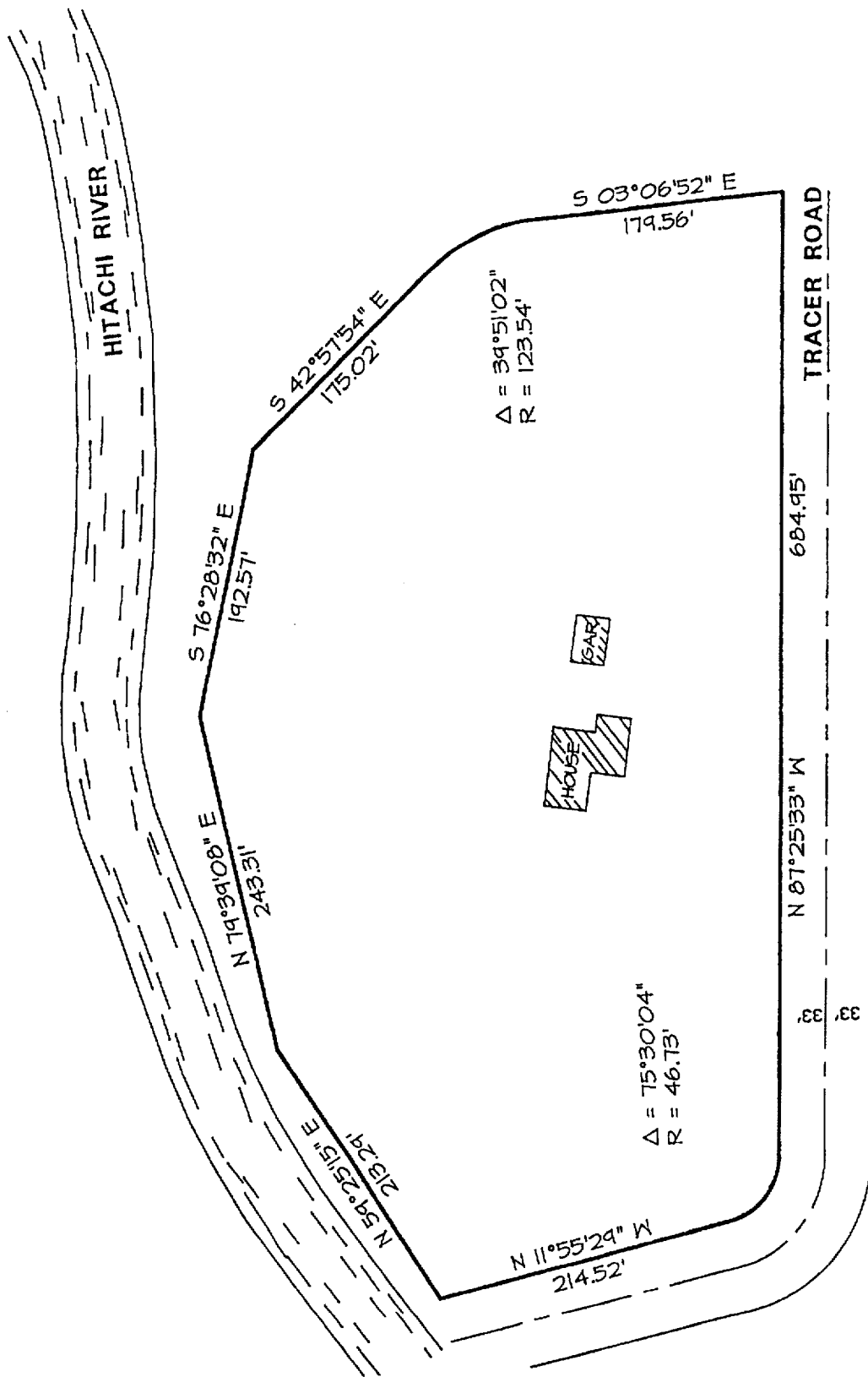
FIG. 11 shows a typical hard copy source document of parcel drawing in its original form with correct bearings and distances recorded thereon which correspond to the physical survey of the land parcel.
Figure 18:
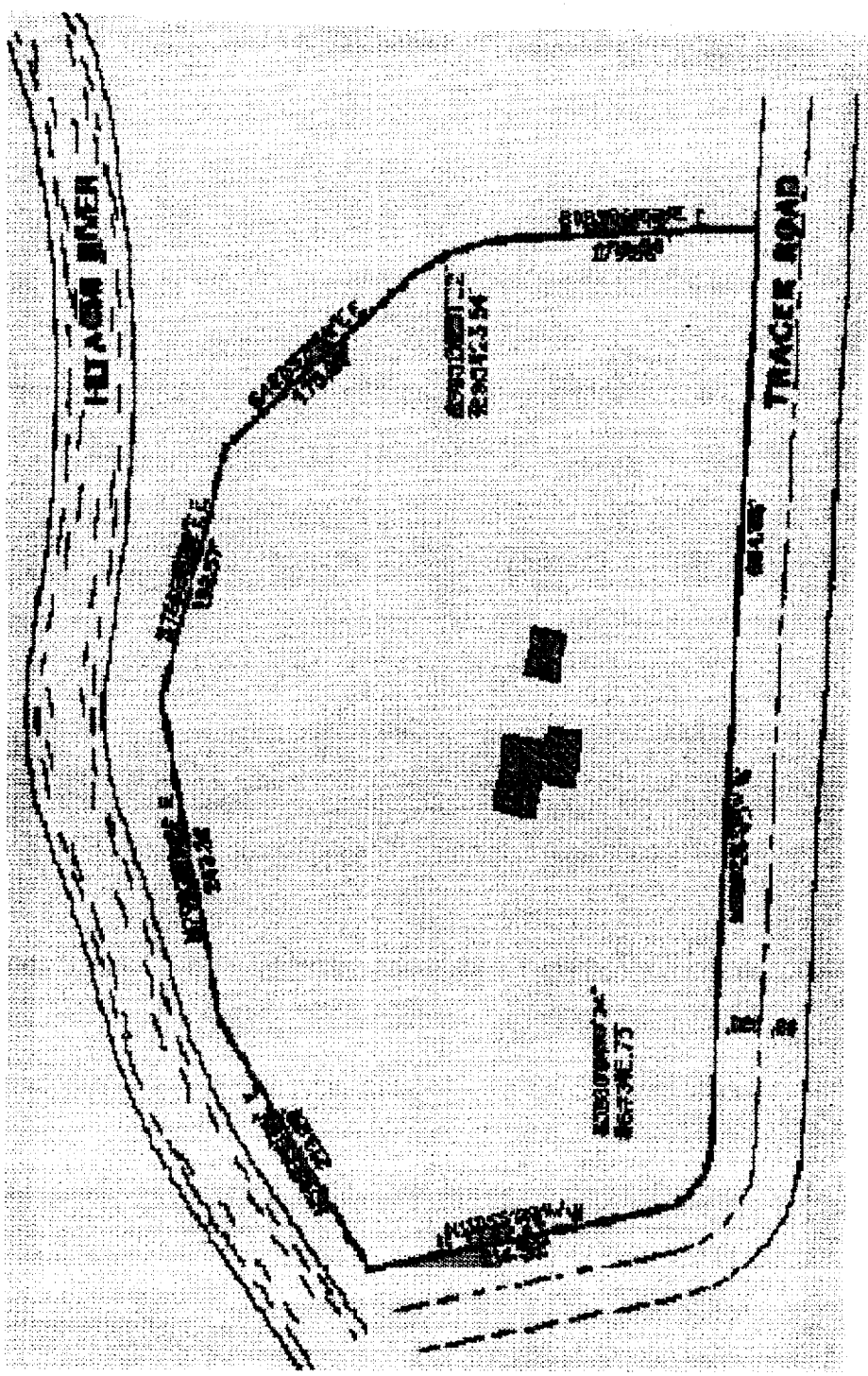
FIG. 18 is a cropped printed screen display of the converted graphically vectorized drawing and converted text of FIG. 13 overlaying the edited raster file of FIG. 12; a cursor crosshairs is positioned at a selected starting point.

FIG. 11 illustrates one type of source document, a typical land parcel survey map. A hard copy of this cartographic source document was converted to an accurate computer based survey map according to the method of the present invention. As seen in FIG. 11, the alphanumerical text relating to the lengths and directions of the bounding lines of the area surveyed are expressed as bearings and distances for lines, as well as delta angle and radius for curved lines. The enclosed area is a map showing the boundaries of the property. It is bounded on two sides by TRACER ROAD. A nearby river is oriented above the property boundaries. In FIG. 18, the alphanumeric text relating to the land area surveyed are the directions and distances: N59°25'15"E, 213.29'; N79°39'08"E, 243.31'; S76°28'32"E, 192.57'; S42°57'54"E, 175.02'; Δ=39°51'02", R=123.54'; S03°06'52"E, 179.56'; N87°25'33"W, 684.95; Δ=75°30'04", R=46.73' and N11°55'29"W, 214.52'.

To best illustrate the method of the present invention, FIGS. 12–22 and 24–28, which are "screen dumps", were used to illustrate the content of the display screens showing the file images as they were created according to the system and method of the present invention. As used herein, the term "screen dump" "or screen dumps" is meant to refer to the image on the display monitor screen which is printed off the screen. The screen dumps were cropped to just show the present invention. A background was used on the screen dumps so that the "window" lines and cross hair lines were discernable as white lines on the screen dump.

The computer and the scanner were turned on. The VIDAR 500 software scanning programs was opened in the computer, in the conventional manner. The scanning resolution was set to a resolution of 300 dpi. The source document as shown in FIG. 11 was inserted into the scanner. The user typed instructions via the computer keyboard to instruct the scanner to start scanning. The document was scanned and converted to a digitized raster file. The digitized raster file was imported into the computer and displayed on the display monitor screen as an image. The image was edited at this time using the VIDAR software to reorient the image. The edited file was saved in the VIDAR as KEITH.HRF, a "Hitachi Raster File." The save command "SAVE AS" (file name) ".HRF" was used to convert the digitized raster file into a CAD useable file.

The user exited from the VIDAR scanning program and entered the AutoCAD™ TRACER™ software. The user introduced the raster file KEITH.HRF into the AutoCAD™ environment with the AutoCAD™ command ROPEN.

Figure 12:
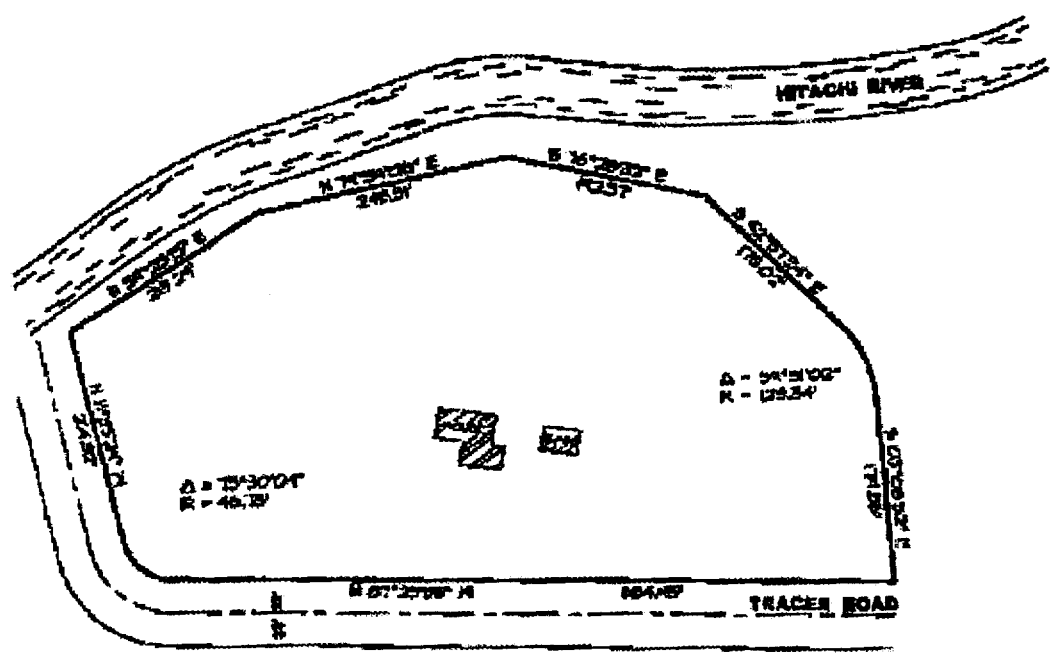
FIG. 12 is a cropped printed screen display illustrating the edited raster file image of FIG. 11.

The edited raster file was brought up and displayed on the display monitor. The edited raster image as shown in FIG. 12, shows a raster file graphical drawing and raster file text. The edited raster file was stored on a raster file layer.

The user set the recognition parameters for the text recognition and also for the graphics recognition. The optical character text recognition parameters of RECOGNIZER™ were set for best recognition of the text for alphabetic characters N,S,E,W and the numerals 0, 1, 2, 3, 4, 5, 6, 7, 8, 9 and the symbols, °, ' and ". Settings were selected by the user to instruct the OCR on time spent recognizing alphanumeric characters and layer control as is known in the art. Layer control enables the user to utilize multiple file layers having mathematical text on one layer, nonmathematical text on another layer, vectors on yet another layer, etc. Also, the size of the letters and spacing between the letters were selected for optimal character recognition as is known in the conversion art. The separation of the character strings was also selected for optimal recognition as is known in the art. Other recognition parameters were maintained at the manufacturer's default settings. The graphics default of "RECOGNIZER™" was set for "Parcel".

Figure 13:
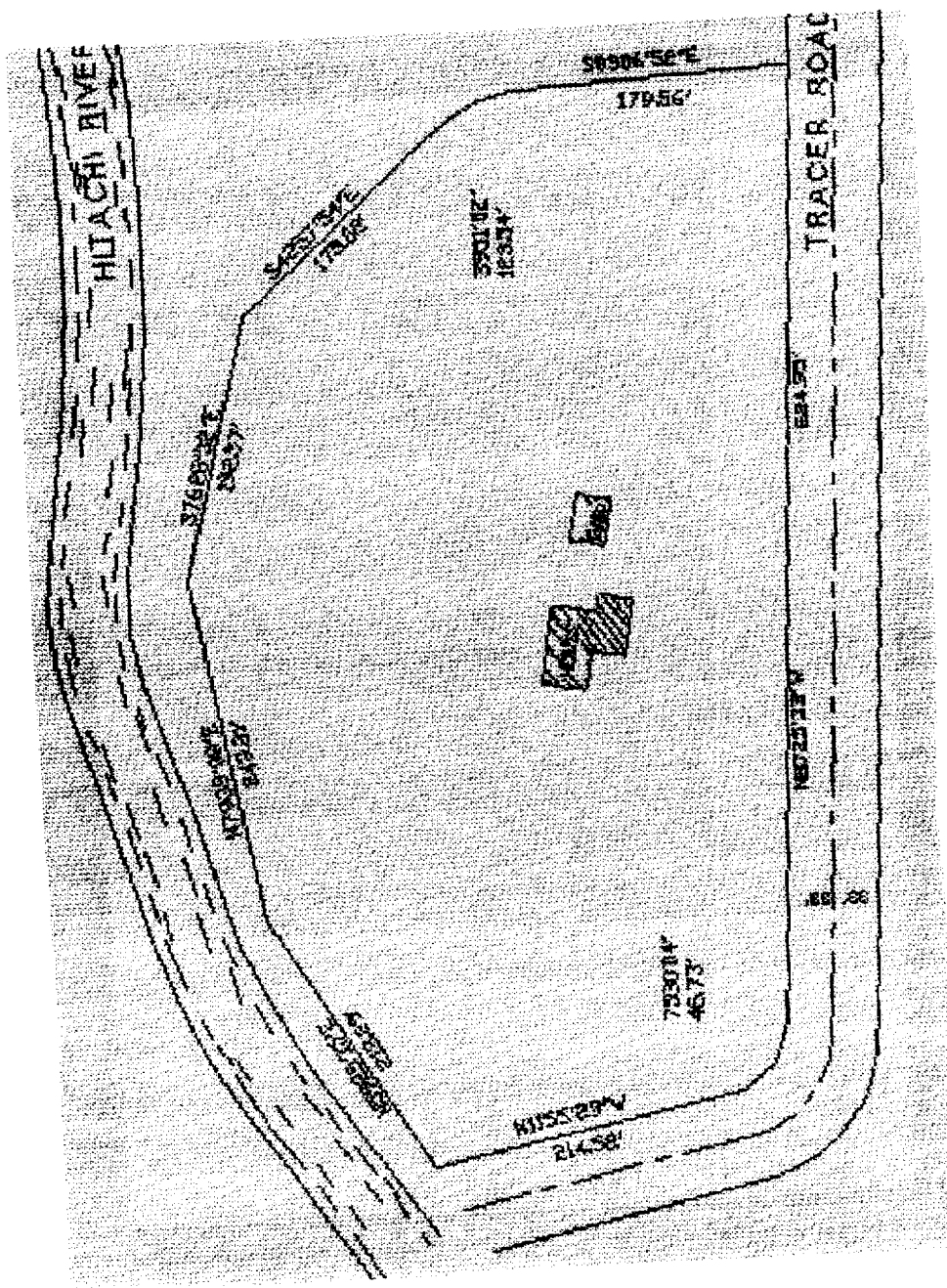
FIG. 13 is a cropped printed screen display illustrating the converted graphically vectorized drawing and the converted ASCII text derived from the raster file of FIG. 12.

The user then selected the "Recognizer Text and Graphics" command. The TRACER™ software automatically searched for endpoints and drew lines based on the graphical raster image and also converted the text in the raster file into the ASCII text to produce a converted drawing image and converted text. The converted graphically vectorized drawing and the converted ASCII text were placed in separate layers from the raster text file layer as shown in FIG. 13.

Figure 14:
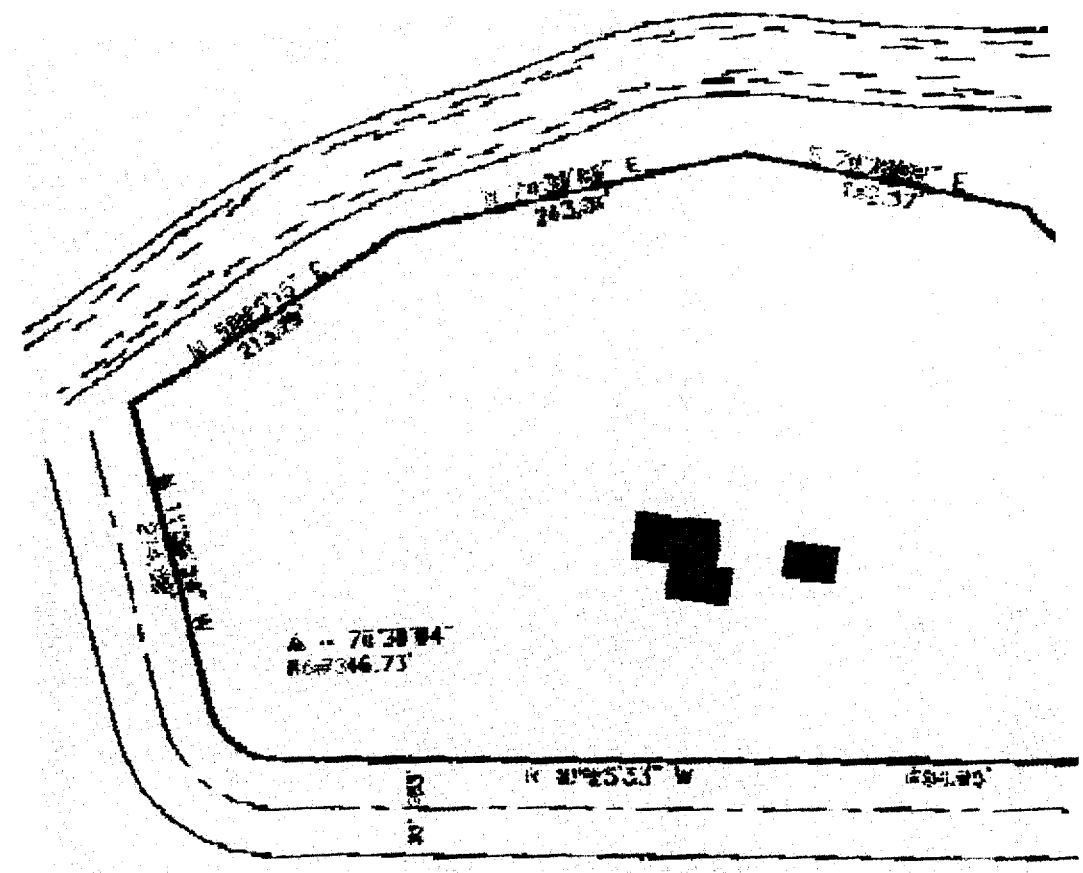
FIG. 14 is a cropped printed screen display illustrating the graphically vectorized drawing and recognized text of FIG. 13 overlaid on the edited raster file of FIG. 12.

Then, as best shown in FIG. 14, the converted image and converted text was automatically overlaid on the raster file image. Thus, a "double image" was presented. The double image showed the recognized graphics as vectors along with the recognized ASCII text displayed as one layer which was overlaid over the edited raster file. The converted processed image was capable of being edited to erase unwanted text or vector lines as is known in the art. As is known in CAD the layers may be turned "on" or "off" or "thawed" or "frozen" as the user may require.

Where any numerals of the alphanumeric text 0, 1, 2, 3, 4, 5, 6, 7, 8, 9 were not recognized, then an interactive user screen appeared and the program defaulted to the AutoCAD™ program prompting "END OF LINE". This message indicated that the data was incorrect, either because it was not recognized correctly by the OCR, or because it was incorrectly recorded on the original survey document. The user manually corrected errors using the TRACER's™ software's "Find Rejects and Edit" (FRED) program. The user compared the recognized text with the raster text. Where errors appeared the user corrected them by simply typing in the correct characters and overwriting the incorrect characters.

Figure 15:
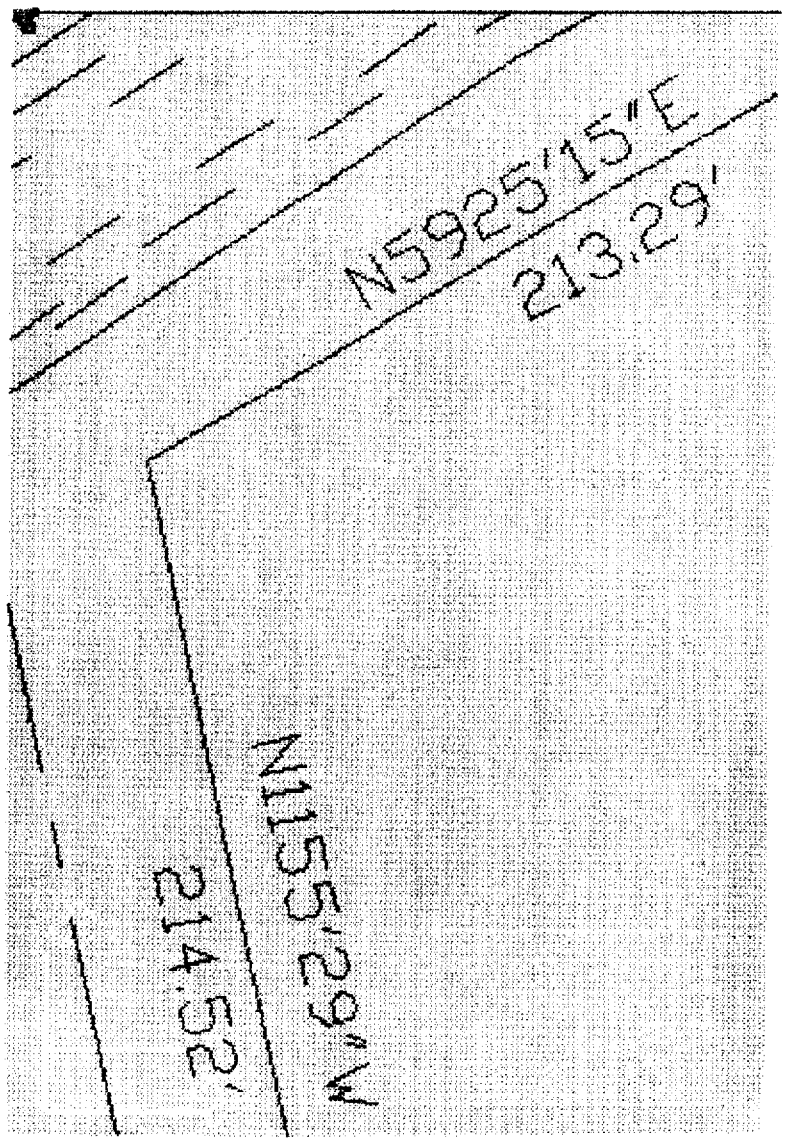
FIG. 15 is an windowed cropped printed screen display showing the present OCR's conversion of a bearing.
Figure 16:
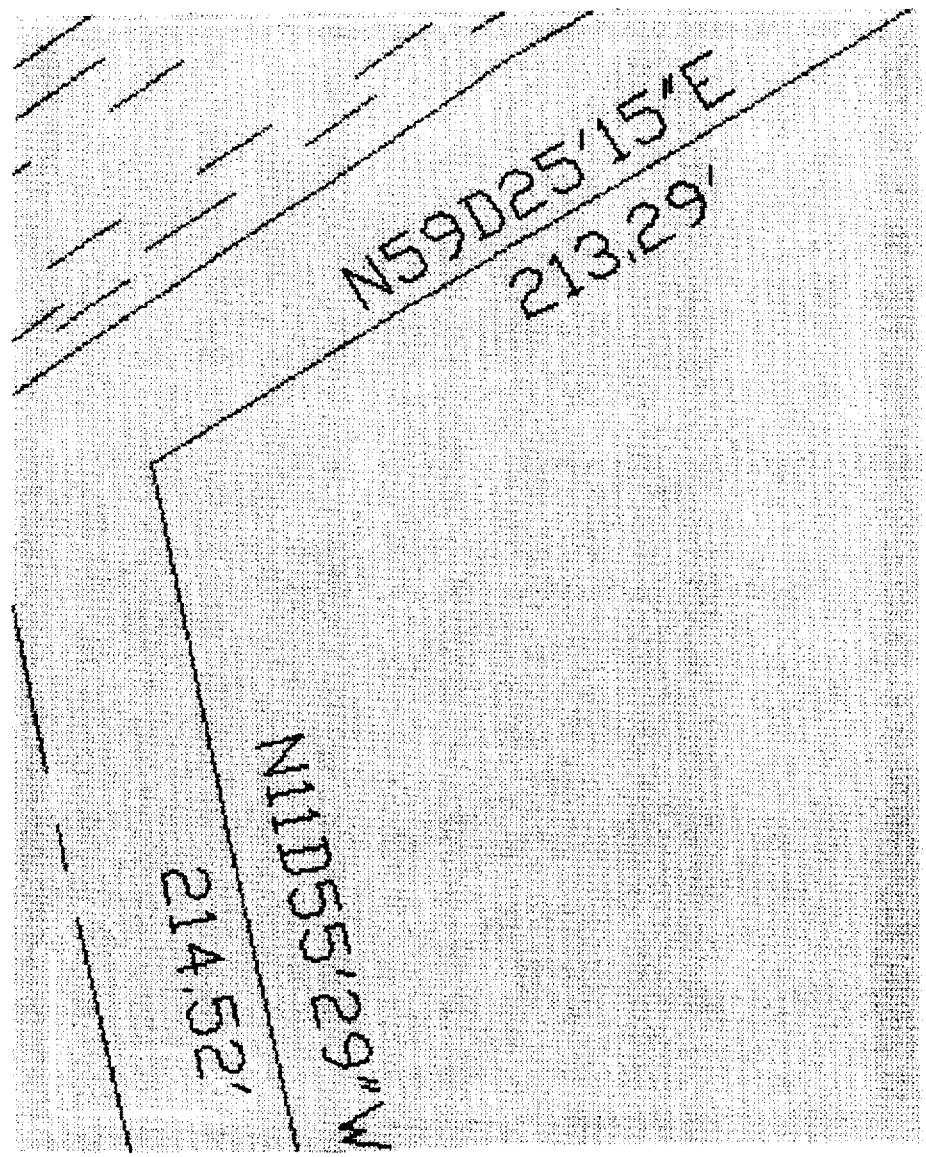
FIG. 16 is a cropped screen dump showing the bearing of FIG. 15 after the text is reformatted according to the present invention.
Figure 17:
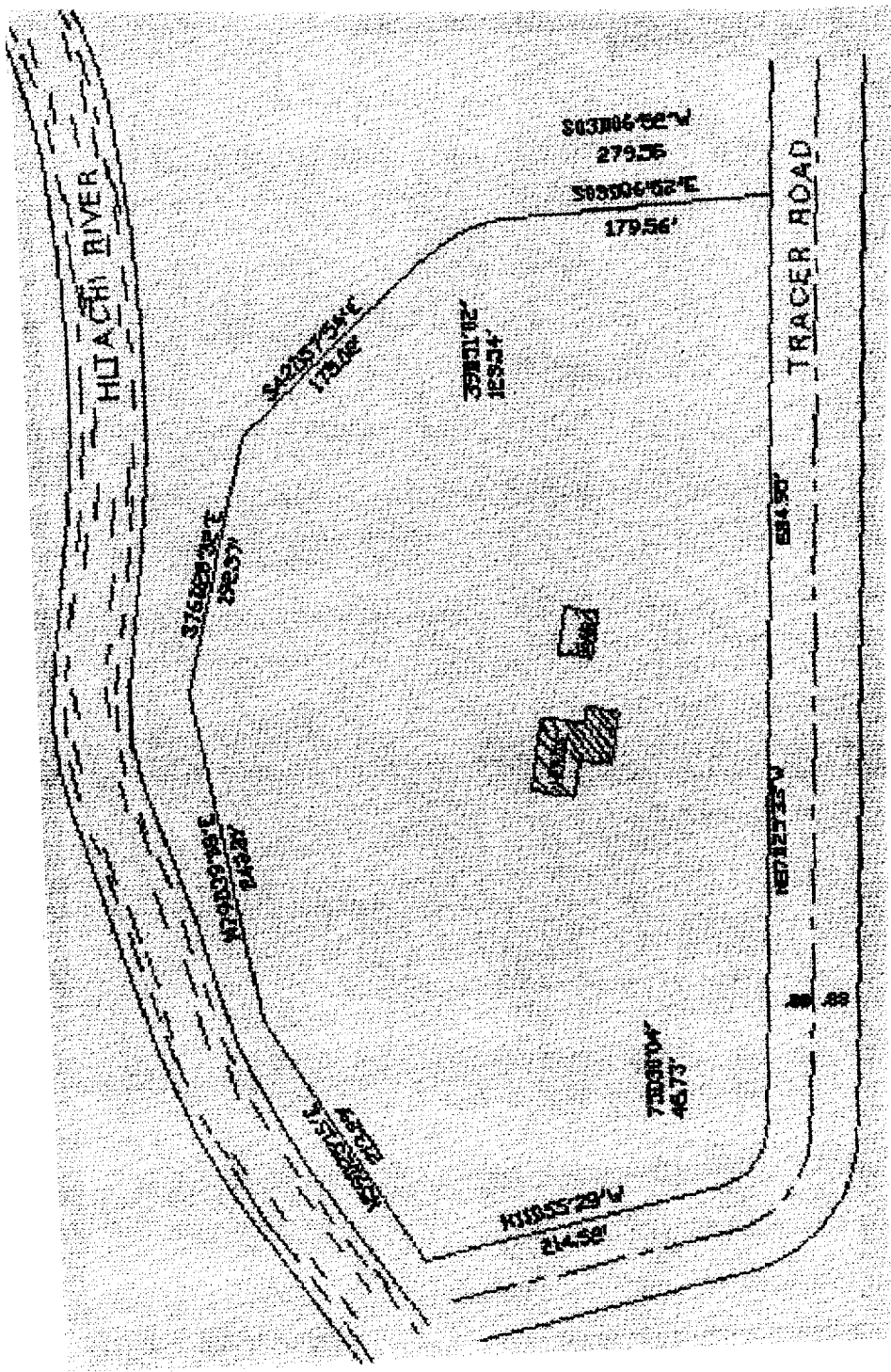
FIG. 17 is a cropped screen dump illustrating the results of the FORMAT TEXT subroutine on the converted graphically vectorized drawing and converted ASCII text of FIG. 13.

Also, the present OCR was able to recognize the second symbol ("), the minute symbol (') and foot symbol (') but it was incapable of recognizing the degree symbol (°). For example, as shown in FIG. 15, the bearing N59°25'15"E was recognized by the OCR and displayed converted as N5925'15"E. The user executed FORMAT TEXT command to render the converted text into a format which would be usable in a COGO calculation. In the above example, the formatted text was displayed as shown in FIG. 16 as N59D25'15"E. This was done for each of the bounding lines as shown in FIG. 17.

The user was prompted to select the character ADS submenu. Then either LINE or ARC was selected depending upon whether the bounding line was straight or curved, i.e., an arc.

The user entered the "Draw Line" subroutine. The user began the vector drawing by selecting a starting point. As shown on FIG. 18, the user selected a starting point by positioning a cross hairs at an endpoint on the raster file drawing and checked or clicked on this point. The cross hairs was positionable by moving the mouse. This set an internal origin within the CAD drawing program.

From this starting point, lines and arcs were constructed in the order that the user selected them. The user was prompted to "select distance" by on screen cursor box, i.e., a "pic" box which appeared on the screen display. The distance was picked from the converted ASCII text which was displayed for each bounding line. The user merely clicked on the displayed distance (using the mouse), thereby entering the distance.

As previously explained, this transported the distance measurement into the appropriate place in the mathematical equation in the COGO portion of the CAD program. The user entered the direction of the vector into the coordinate geometry mathematical equation in the same way. The selected bearing was then converted internally using the PLACE command to place the bearing or azimuth into the AutoCAD™ COGO acceptable angular format.

For example, internally within the program during the LINE subroutine; the bearing N59D25"15" was reformatted for use in the AutoCAD™ COGO subroutine as angle 30.3445. Then, the character string 30D3445 representing bearing and the distance was instantly entered into the appropriate place in the mathematical equation in the COGO software for creation of the vector. The dimension and bearing was converted by the COGO program into a vector line for that particular bounding line. This vector line then appeared on the computer screen as a new straight line. The prior optically vectorized graphics line was erased from the screen. The new COGO produced vector line overlaid the raster line. As each COGO vector was produced, the old converted ASCII text line label was erased and a new text label as an attribute of the vector were created.

Figure 19:
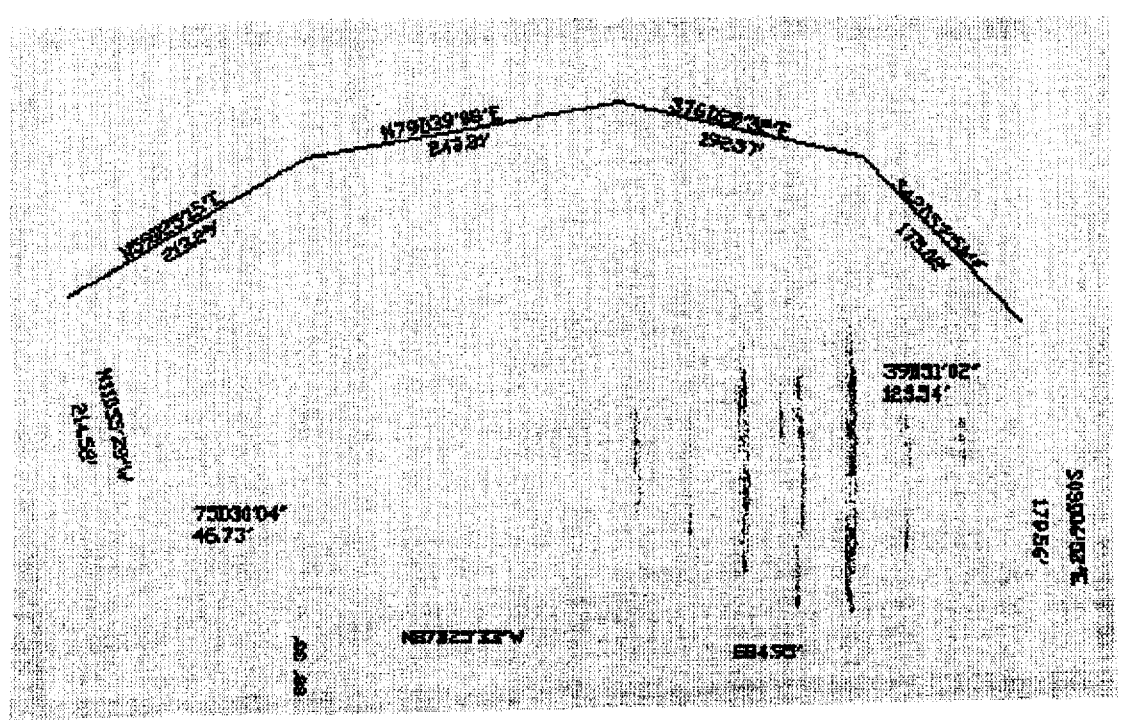
FIG. 19 is a cropped screen dump illustrating the partially completed conversion process where a number of vectors lines have created using the present method; and showing the sequential generation of COGO generated vectors according to the present invention. The alphanumeric text labels accompanying each of the vectors was generated as a result of the COGO vectorization. The alphanumeric text not accompanying a vector was part of the "mathematical text" which was yet to be converted by the present method. The background raster file layer was turned off.

The vector lines were constructed sequentially as previously described using the draw line subroutine. FIG. 19 shows a number of vectors created for converted lines. The vectors were arranged end to end. Also as is known in the CAD drawing art, nodes were created at the beginning and end of each line. The nodes were created after the character strings for "DISTANCE" and "DIRECTION" had been selected.

Where a curve line was present in the drawing, the user selected "Character ADS" menu and then selected "ARC". The user was prompted as previously described in the discussion of FIG. 8 and selected radius, delta angle and side by moving the "pic" box/cursor onto the alphanumeric text indicating the radius and delta angle and clicking on the text. This delta angle text was converted to a COGO useable angle format and transported into the COGO subroutine.

Figure 20:
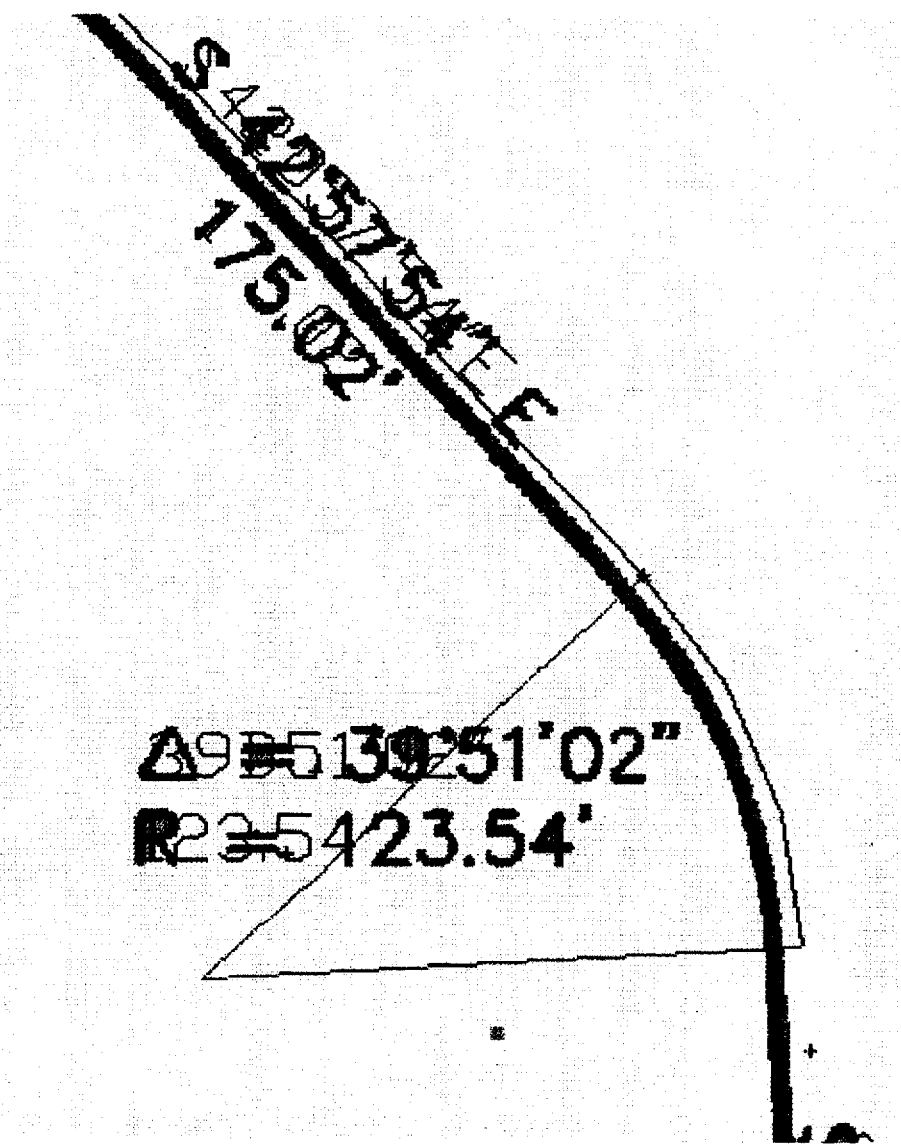
FIG. 20 is a cropped screen dump illustrating the constructing of an arc using the illustrates the use of the endpoint of a previous vector line and showing the creation of the radii arc construction lines; the raster image is in the background.

Once the radius was selected, the user was prompted "Side". The user responded either by keying in "C" for concave(right) or "V" for convex(left) or by using the mouse to pick the side. As best shown in FIG. 20, once the "Side" had been determined, a perpendicular line was constructed off the preceding line in the direction chosen. The beginning point of the arc was the endpoint of the preceding line. Once the vector curved line/arc was produced, the graphically vectorizer arc was erased and the OCR ASCII text was erased. The text of the arc was relabeled as an attribute of the arc. The relabeled delta angle text and relabeled radius text were placed next to the arc.

The value selected for "Radius" determined the length of the perpendicular line. A line was constructed at that delta angle from the radius line just constructed. The angle was automatically constructed to the correct side and it automatically defaulted to the radius value previously determined. The endpoint of that radius was the endpoint of the arc. An arc was automatically constructed between the endpoints using typical CAD drawing commands. FIG. 20 is a display screen dump showing the COGO vector drawing and labeled text with the arc construction radii not yet erased overlaid on the raster file image. The windowed area shows the junction of the endpoint last vector line and the beginning point of the first vector created according to the present method. After the arc was constructed, the radius lines were erased.

Figure 21:
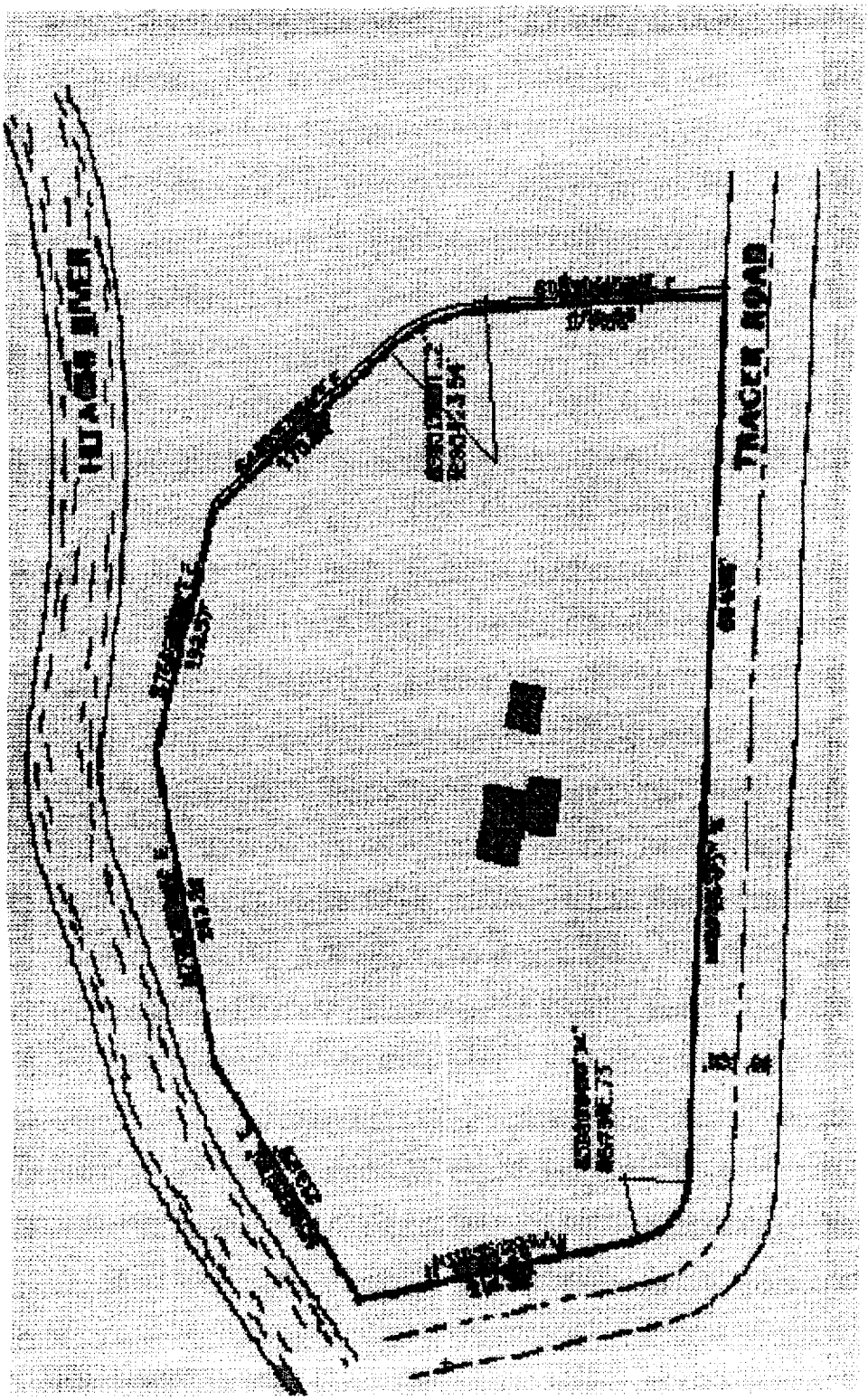
FIG. 21 illustrates the source document converted according to the present invention with the vector drawing and text labels still overlying the raster file; the arc construction radii have not yet been erased.

This "stepping around" the drawing was repeated for each subsequent bounding line in the map. FIG. 21 is a windowed cropped screen display showing the drawing of the present invention overlaid on the raster file image. The arc radii constructor lines were not yet erased. The resultant COGO vector converted and labeled drawing was saved in a drawing file. This COGO vector file had a vector graphics component (layer) and a text component (layer). The file was in a format suitable for subsequent manipulation in a CAD environment. The underlying raster file was in a separate layer which was able to be removed.

FIG. 21 also shows a "window" placed on the junction where the endpoint of the last vector created and the beginning point of the first vector created according to the present method meet, illustrating a visual coincidence of these points.

Figure 22:
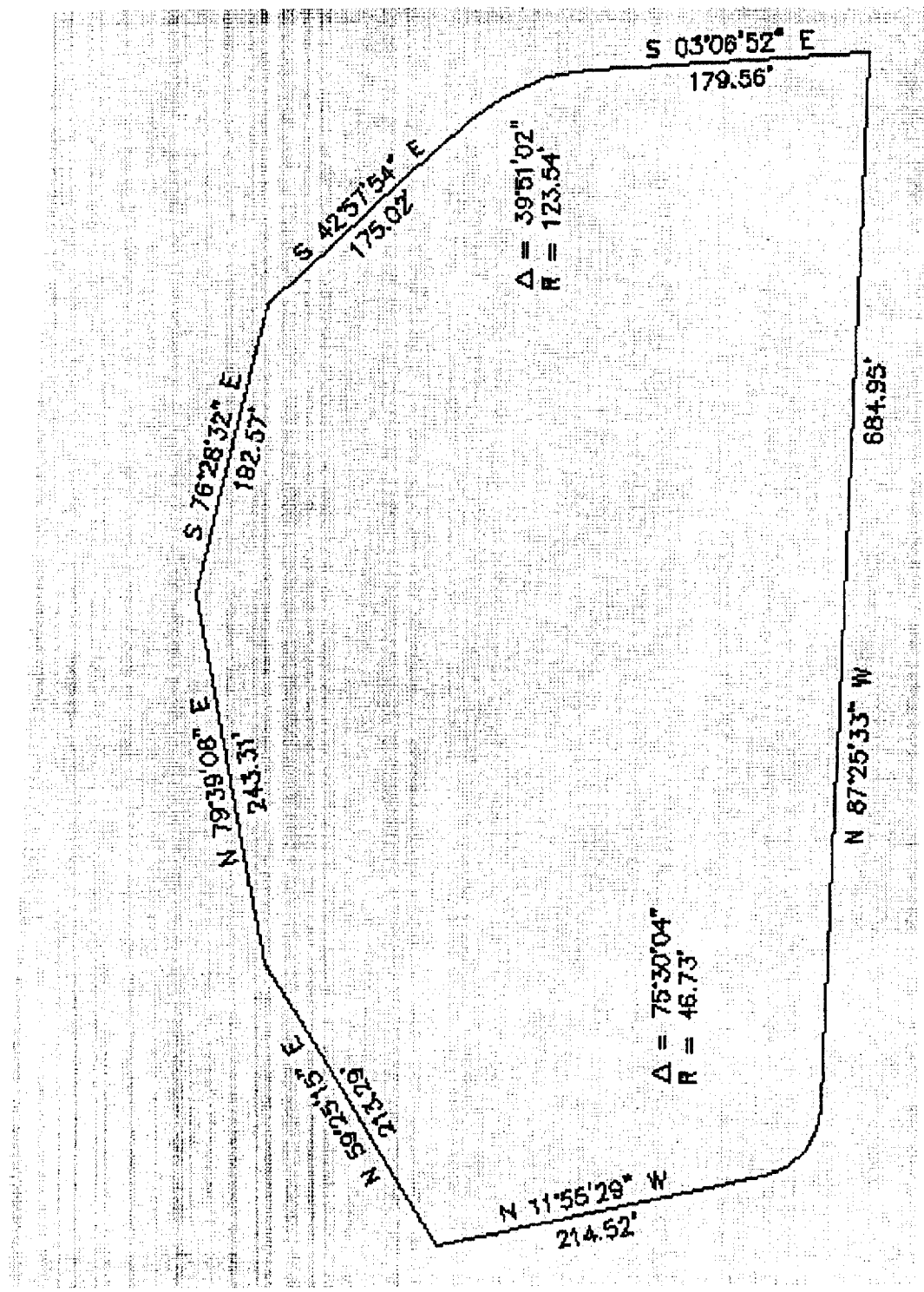
FIG. 22 is a cropped screen dump showing the graphical drawing of the hard copy source document of in FIG. 11 converted by the method of the present invention. The text associated with each bounding line was generated as an attribute of the vector associated with the line. The raster file layer has been removed.
Figure 23:
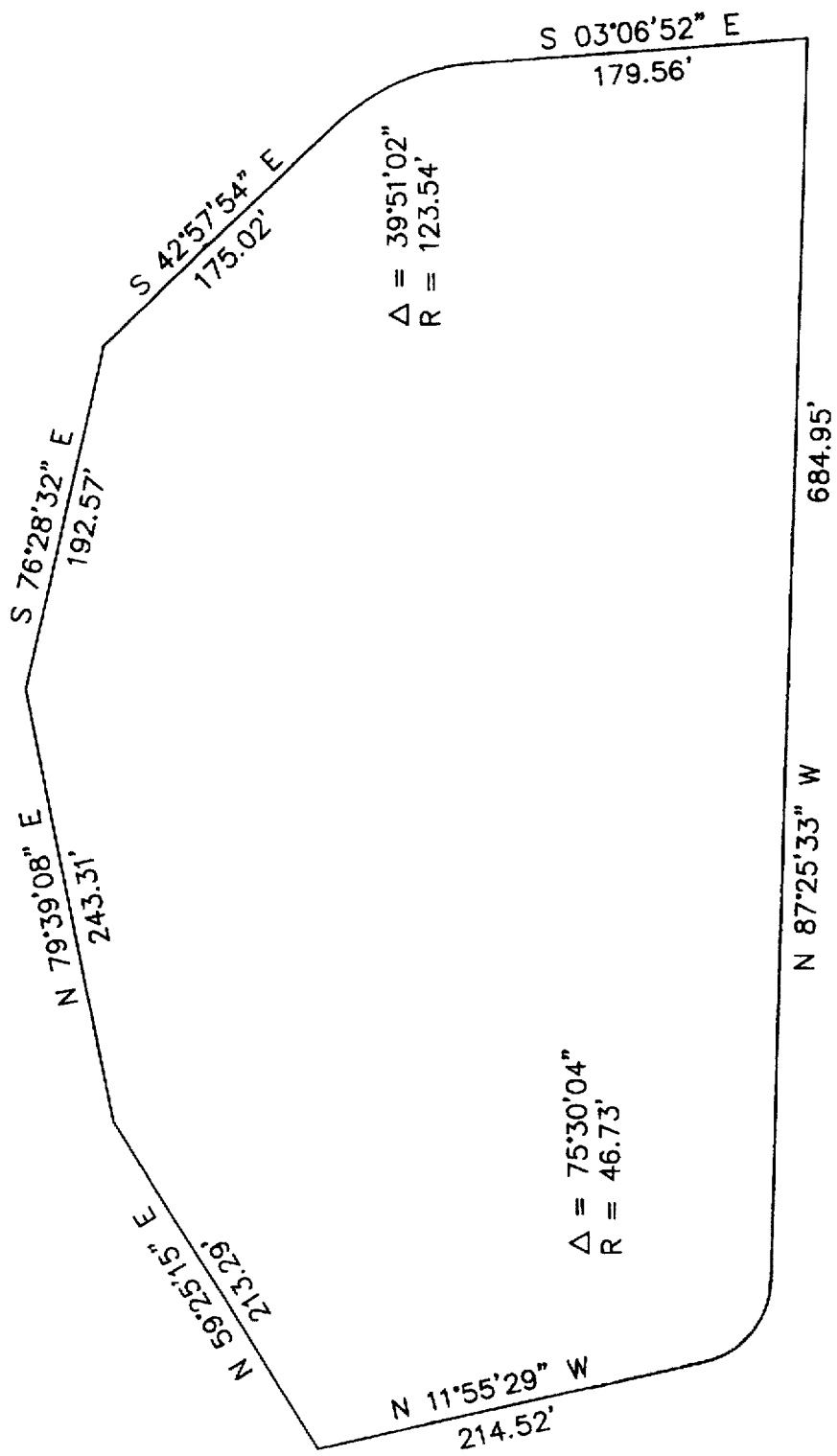
FIG. 23 is an accurate vector computer drawing of the hard copy source document of in FIG. 11 converted by the method of the present invention illustrating the plotted drawing associated with the screen dump of FIG. 22.

FIG. 22 is a screen dump of the resultant drawing of FIG. 11 converted according to the present method. The raster layer is removed. FIG. 23 is the accurate vector computer drawing of the hard copy document of FIG. 11 converted by the method of the present invention. FIG. 23 is the drawing associated with the screen dump of FIG. 22.

The user also had the option to change the units of the dimensions, i.e., meters to feet, or the directions, i.e., azimuths to bearings and visa versa by changing the units default in the CAD drawing utilities. The user may manipulate the drawing using standard CAD drawing techniques for geometric construction, such as, but not limited to bisecting lines, etc. and arithmetic operations, such as, but not limited to calculating perimeters of closed areas and calculating areas of parcels. Also node placement may be made and labeling of subsections of lines may be performed as is known in the CAD drawing art.

EXAMPLE 2

THE QUALITY CONTROL MAP CHECKER

The map checker quality control method of the present invention utilized mathematical information from the alphanumeric text accompanying the survey drawings and constructed an accurate computer map as described in Example 1 utilizing the software and hardware and steps of the method of Example 1. It also served as a map checker. It superimposed the COGO vectorized map drawing of FIG. 22 constructed in Example 1 over the raster map drawing of FIG. 12. The overlaid images were shown in FIG. 21. Second, mathematical closure between the point of beginning of the first line or arc with the endpoint of the last line or arc was computed and displayed. Third, the map as shown in FIG. 22 may be displayed and visually checked for closure by the user.

The hard copy document conversion of the survey map of the preferred embodiment of Example 1 was suitably continued to provide a map checking quality control feature. When all of the mathematically accurate based vectors had been drawn according to the alphanumeric text recognized, the user viewed the drawing of the present invention to optically verify that the resulting drawing was "closed". If all the alphanumeric text for the bounding lines was correctly recorded on the hard copy and the survey was correct, a closed polygon was formed. FIG. 22 shows a map according to the present invention where a closed polygon appeared to be formed.

In addition, the present invention provides a quantitative determination of the degree of closure. Because of the scaling problems, even if a map "looks" closed; as shown on FIG. 22, there may be a gap. Viewing by the user is a qualitative quality control check.

Figure 24:
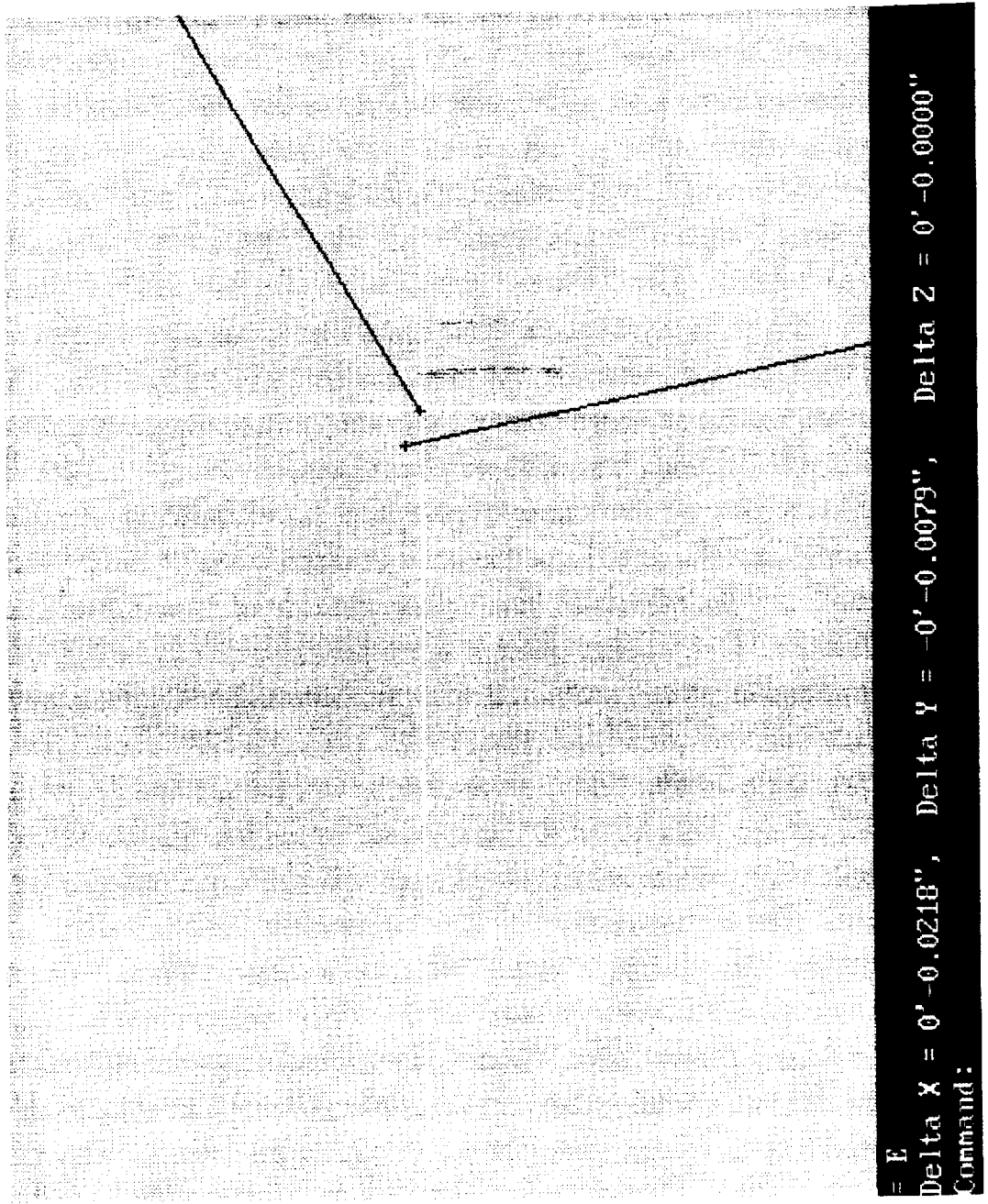
FIG. 24 is a cropped screen dump showing a greatly magnified view of the gap between the endpoint of the last vector created and the beginning point of the first vector of FIG. 22; also shown are the closure gap distances Delta X and Delta Y.

FIG. 24 is a cropped display screen dump which illustrated "windowing in" on the junction of the endpoint of the last vector created and the beginning point of the first vector created. This is a closeup showing the gap between the respective vector points visibly demonstrating lack of closure. A quanititive measure of the lack of closure was also shown on FIG. 24 where the Delta X (ΔX) and Delta Y (ΔY) values were recorded on the display screen. ΔX in this case was 0 feet and 0.0218 inches; ΔY was 0 feet and 0.0079 inches.

Also the user can view the coincidence or overlaps of the bounding lines in the raster image with the COGO vectorized drawing file as shown in FIG. 21. Viewing by the user is a qualitative quality control check.

Figure 25:
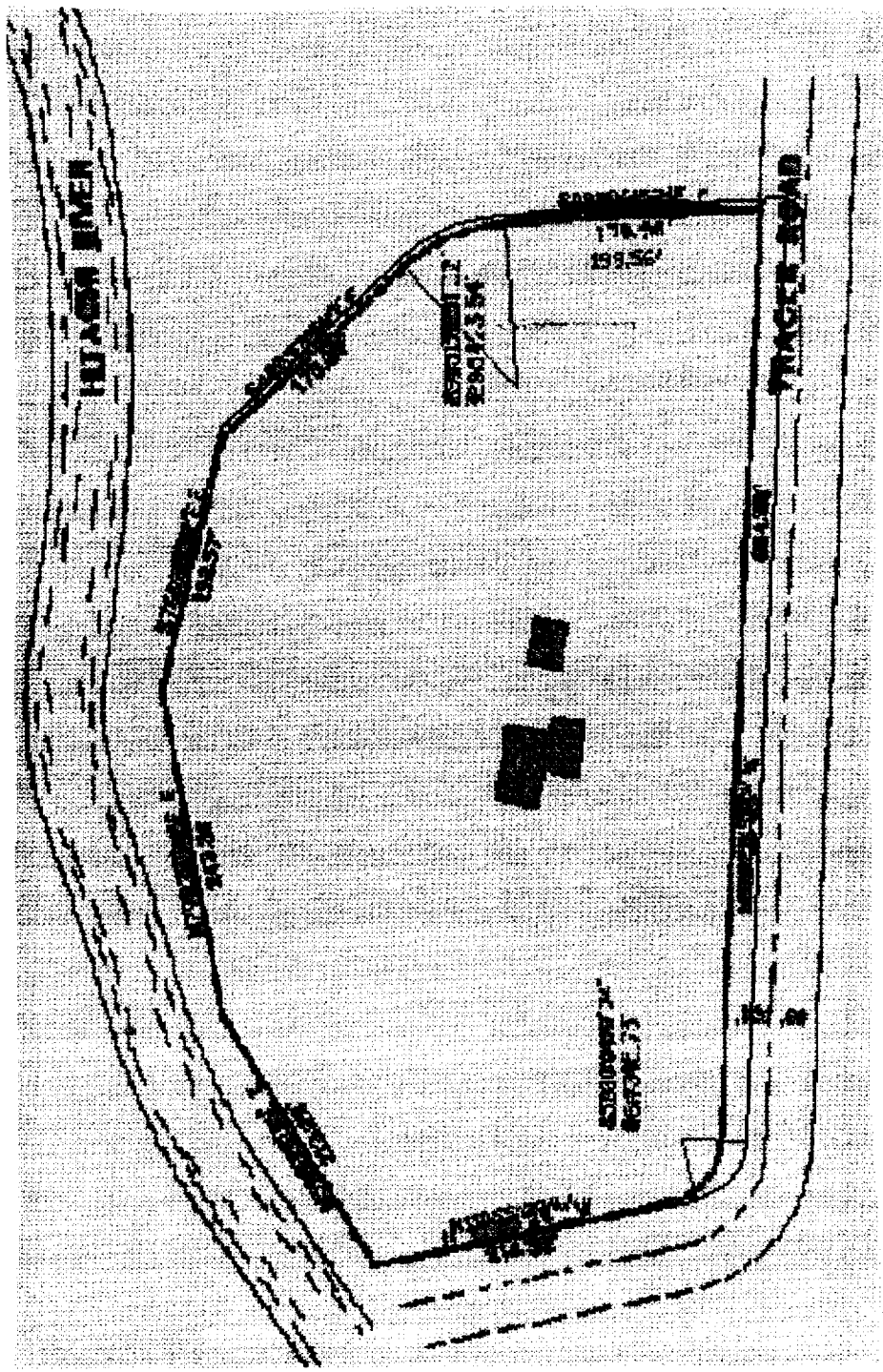
FIG. 25 is a cropped screen dump illustrating the failure of a map to close when an incorrect distance 199.56' is used but the correct bearing S03°06'52"E is provided; the vector drawing file is displayed
Figure 26:
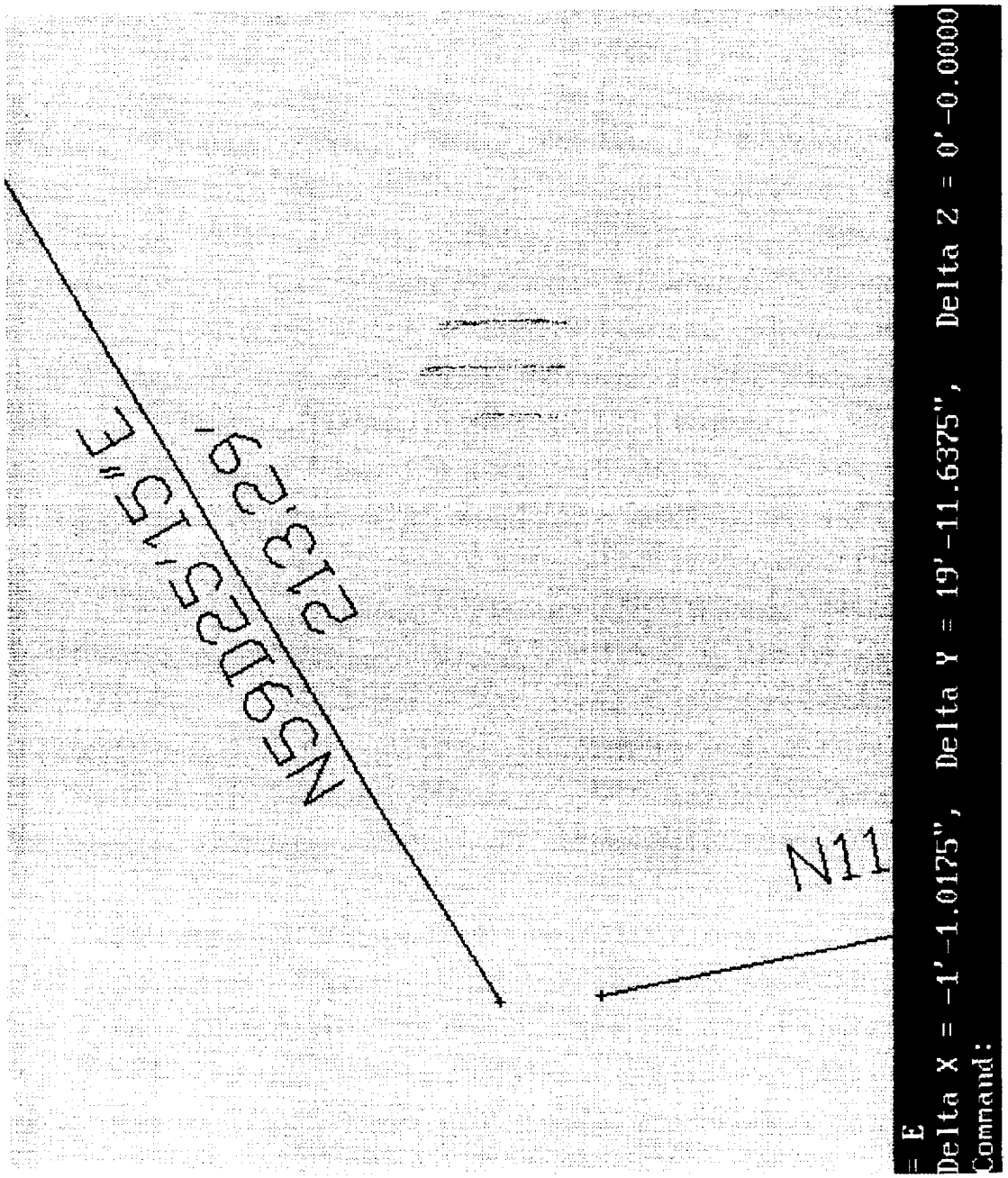
FIG. 26 is a cropped screen dump showing the gap and Delta X and Delta Y values for FIG. 25.

FIG. 25 illustrates the failure of a map to close when an incorrect distance 199.56' (instead of 179.56') is used but the correct bearing S03°06'52"E is provided. Here the incorrect distance was deliberately entered to illustrate the "closure" failure. There is also misalignment of the COGO produced vector drawing with the raster drawing. FIG. 26 shows the Delta X, Delta Y distances computed for the gap of FIG. 25. The raster file drawing has been removed. ΔX in this case was 1 foot and 1.0175 inches; ΔY was 19 feet and 11.6375 inches.

Figure 27:
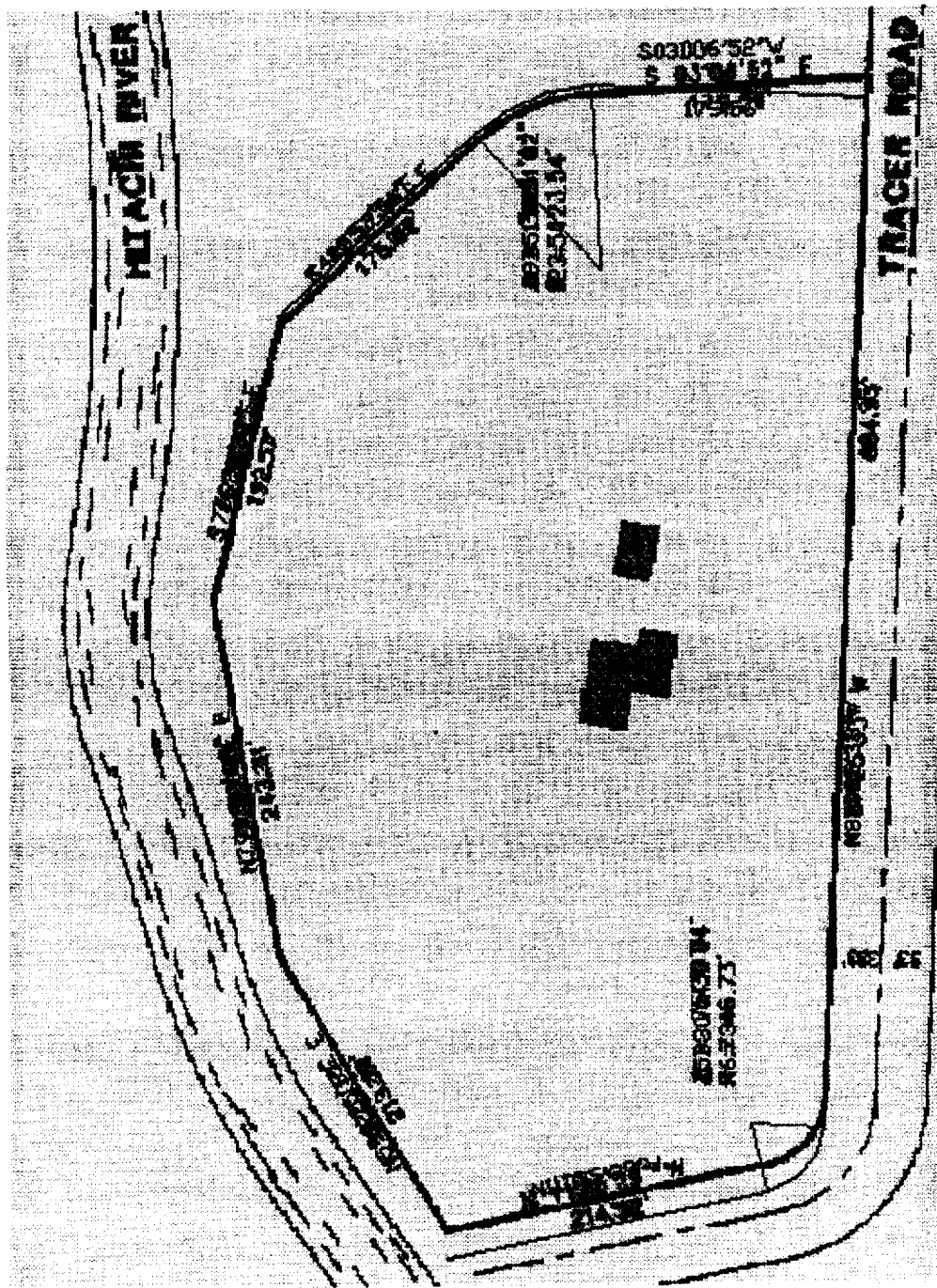
FIG. 27 is a cropped screen dump illustrating the failure of a map to close when an incorrect bearing is used but the correct distance is used.

FIG. 27 illustrates the failure of a map to close when an incorrect bearing S03°06'52"W (instead of S03°06'52"E) was used but the correct distance was used. Here the incorrect bearing was entered to illustrate the "closure" failure.

Figure 28:
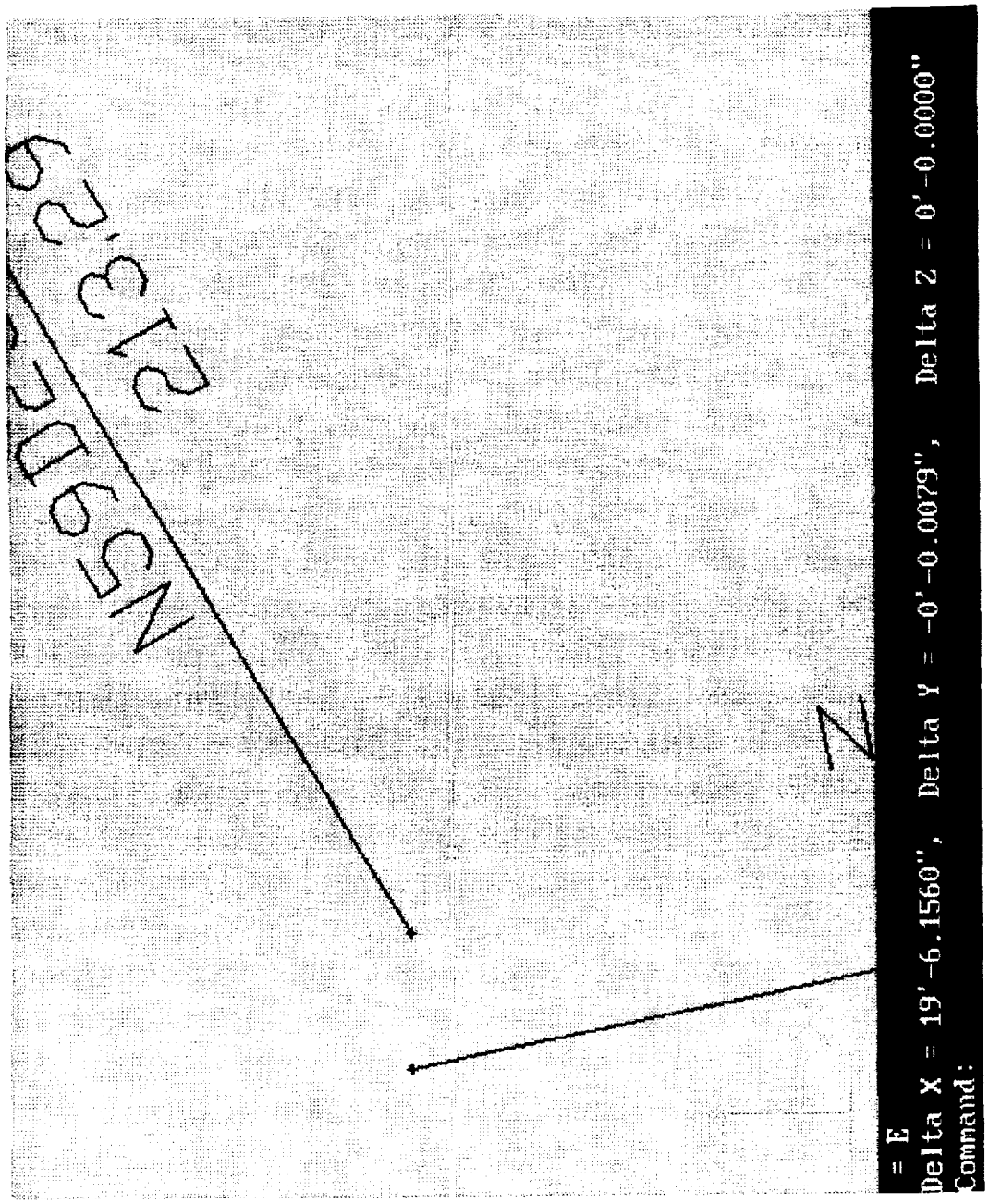
FIG. 28 is a cropped display screen dump illustrating "windowing" to enlarge the view of the intersection of the endpoint of the last bounding vector line and the beginning point of the first vector line where the raster image layer has been turned off, showing the gap and Delta X and Delta Y values for FIG. 27.

FIG. 28 shows the Delta X, Delta Y for the gap of FIG. 27, using AutoCAD's™ distance command. The gap amounts to over 19 feet for ΔX in this instance.

EXAMPLE 3

METHOD OF CONVERSION OF A LEGAL DESCRIPTION

A legal description is a description of real property by government survey, metes and bounds or lot numbers of a recorded plat. Legal descriptions are textual documents which contain all of the mathematical information necessary to describe the boundaries of a parcel of land. A legal description relates the property to the original federal government survey of the land. The known government survey point is called "point of commencement" or is sometimes written "commencing at . . . " The point at which the actual description of the real estate begins is called "the point of beginning." Sometimes the point of commencement and the point of beginning are identical. Each boundary of the land parcel, e.g. bounding line, is described in sequence using bearings, distances, azimuth and other dimensional data as previously discussed.

In current automated conversion strategies when the user is presented with a block of text known as a legal description, the scanner software produces either a block of ASCII text or block of vectors that looks like text or simply a raster images which would be a block of dots arranged to look like letters. Under current art, the only way of computerized converting of a legal description into a drawing is to manually enter the dimensions through the keyboard. This is time consuming and error prone. Since a large number of parcels, the majority in many communities, are recorded as legal descriptions and not as maps. Therefore a large percentage of the information necessary to put together a complete Geographic Information System is outside the reach of current automated technology.

In the preferred embodiment, the legal description as shown in FIG. 29 was converted using the hardware and software as previously for the conversion of the cartographic survey map document of Example 1. The alphanumeric text relating to the bounding lines of the area surveyed in this legal description are: S44°13'22"W 452.66'; S37°10'00"E 123.49'; S33°31'00"E 204.85; N44°24'04"E 248.09'; N45°37'20"W 360.00'; S33°03'00"W 190.69'.

The computer and the scanner were turned on. The document was inserted into the scanner. The scanning program VIDAR 500 was opened in the computer. A scanning resolution 300 dpi was selected. The legal description shown in FIG. 29 was scanned and converted to a digitized raster text file which was inputted into the computer. Illustrating the present method are FIGS. 30-36 which are cropped screen dumps from the video display monitor. A background is used in FIGS. 31-36, since the "windowing" feature shows up as a white line against the background and does not interfere with the vector being created. As best shown in FIG. 30, the image of the digitized scanned document appeared on the video display monitor screen. The file may be edited at this time to remove artifact. The file was saved in VIDAR. The user exited from the VIDAR scanning program and entered AutoCAD TRACER™ software. The image was stored as an *.HRF file. The raster file *HRF was inputted into the AutoCAD™ environment using the TRACER™ Software HRF Hitachi Raster Format as in Example 1 and opened in the AutoCAD™ environment as previously discussed in Example 1. The text recognition parameters of the RECOGNIZER™ (OCR) were set according to the orientation of the text. The optical character recognition program was set to maximize recognition of the numbers 0, 1, 2, 3, 4, 5, 6, 7, 8, 9 and the letters N, S, E, W and the symbols °, ', ". The CAD usable raster file was exported to the RECOGNIZER™ optical character recognition software program using the commands discussed in Example 1. The optical character recognition (OCR) program recognized the text and converted the text into ASCII text as shown in FIG. 31. The user visually reviewed the OCR converted text and corrected the text where necessary using an OCR text corrector such as (FRED) as previously discussed in Example 1. The OCR recognized text was converted into COGO useable text by the methods previously discussed in Example 1. FIG. 31 illustrates the OCR recognized text. Note that the "°" was not recognized. The user used the FORMAT TEXT command to formate the text to insert "D" in the degree sign position, as shown in FIG. 32. The bearing was converted to an AutoCAD™ angular format using the Automatic PLACE command as previously explained in Example 1.

Figure 33:
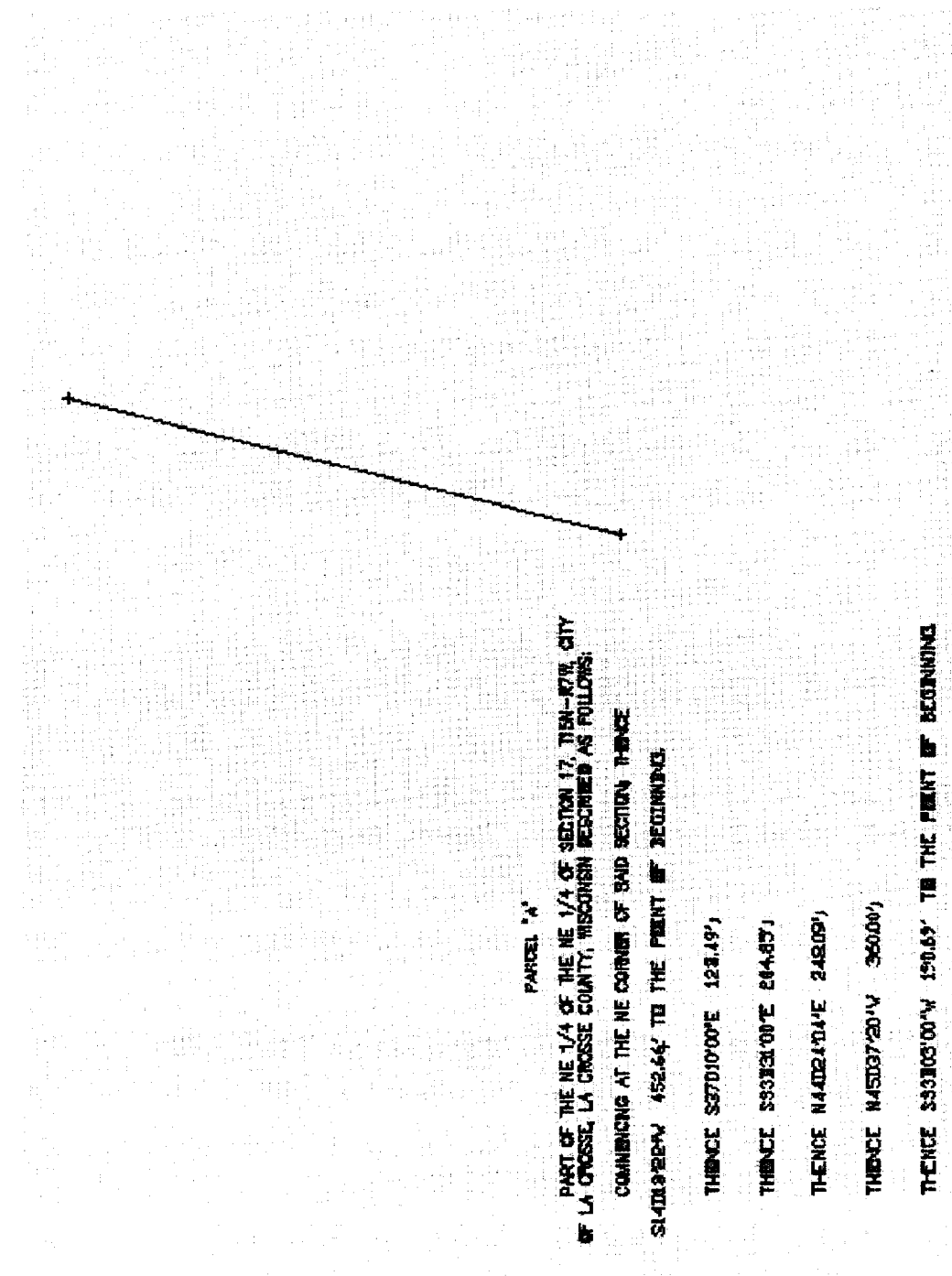
FIG. 33 is a cropped screen dump of FIG. 31 illustrating the creation of the first vector line, the endpoint of which is the "point of beginning" for the creation of the subsequent vectors creating the drawing of the map of the legal description.
Figure 34:
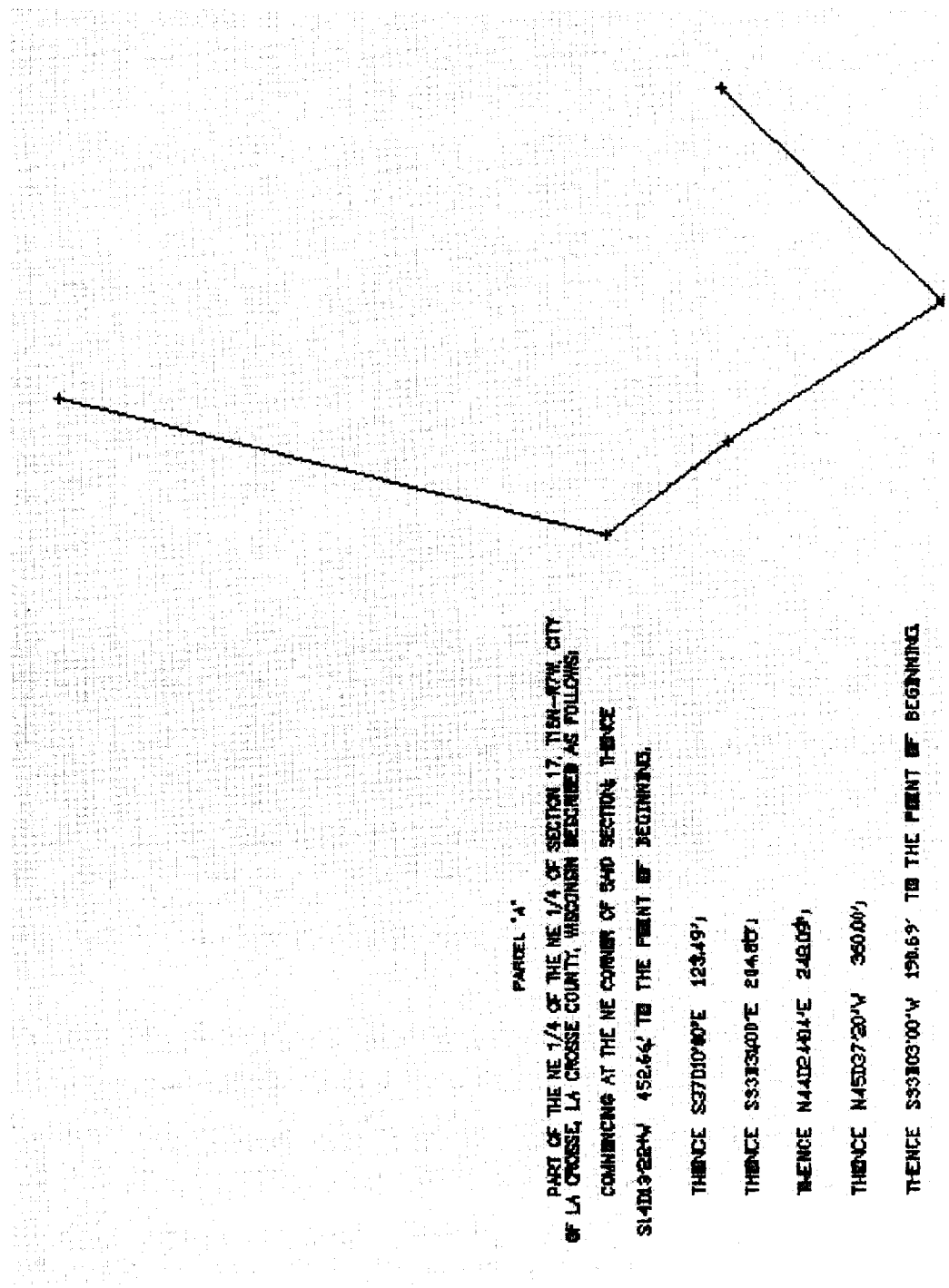
FIG. 34 is a cropped screen dump illustrating the construction of the vector lines according to the sequence of the bounding lines of the area surveyed.
Figure 35:
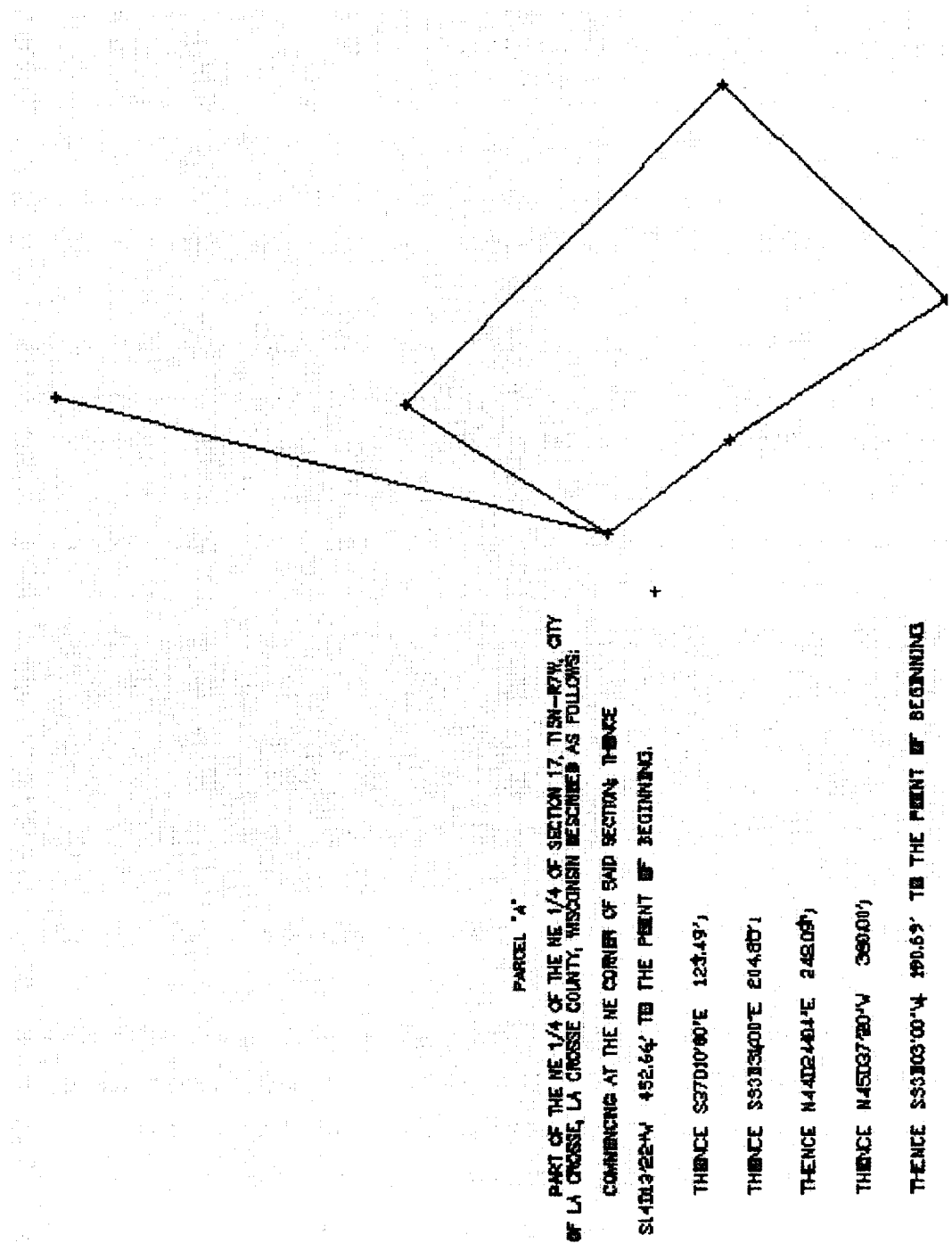
FIG. 35 is a cropped screen dump illustrating the legal description of FIG. 29 converted according to the present method of invention.

The alphanumeric text pertaining to mathematical properties of lines and arcs elements of the parcel being described were chosen by the user in response to prompts in exactly the same manner as was used in Example 1 using the DRAW LINE, DRAW ARC subroutines. The position of the first vector was selected by the user; alternatively it may be selected by the computer. An drawing starting point was selected as shown in FIG. 32 by the "+" and the first distance text was selected. The alphanumeric text was exported to a standard COGO program. Within the coordinate geometry program the text file was converted to mathematically accurate vectors, i.e., straight lines and arcs. As shown in FIG. 33, this first line was constructed. The endpoint of the first vector established the point of beginning (POB) of the parcel. The parcel construction proceeded as in Example 1; as distance and directions were selected. (Unlike Example 1, there is no graphics raster file for the vectors to overlay.) This was done on a vector by vector basis as was previously described for Example 1. At this point the vector data was saved. The vector data was used to construct the lines/or arcs of the parcel in the order set forth in the source document and placed into a vector drawing file. FIG. 34 shows the vectors as the drawing was partially created. The vectorized elements were placed on a separate layer, the cadastral layer in the CAD software. FIG. 35 shows the vector layer drawing created according to the present method of conversion. New alphanumeric labels for vectorized graphic elements (not shown) were generated as an attribute of the vectors in the same manner as set forth in Example 1. The alphanumeric labels were placed on the cadastral layer.

EXAMPLE 4

THE QUALITY CONTROL SYSTEM FOR LEGAL DESCRIPTIONS

This legal description quality control method utilized the hardware and software of Example 3 and utilized the vectors created according to the conversion of the legal description of Example 3. The invention of Example 3 automatically produced a computerized drawing from a legal description and provided the user with a quality control method.

Figure 36:
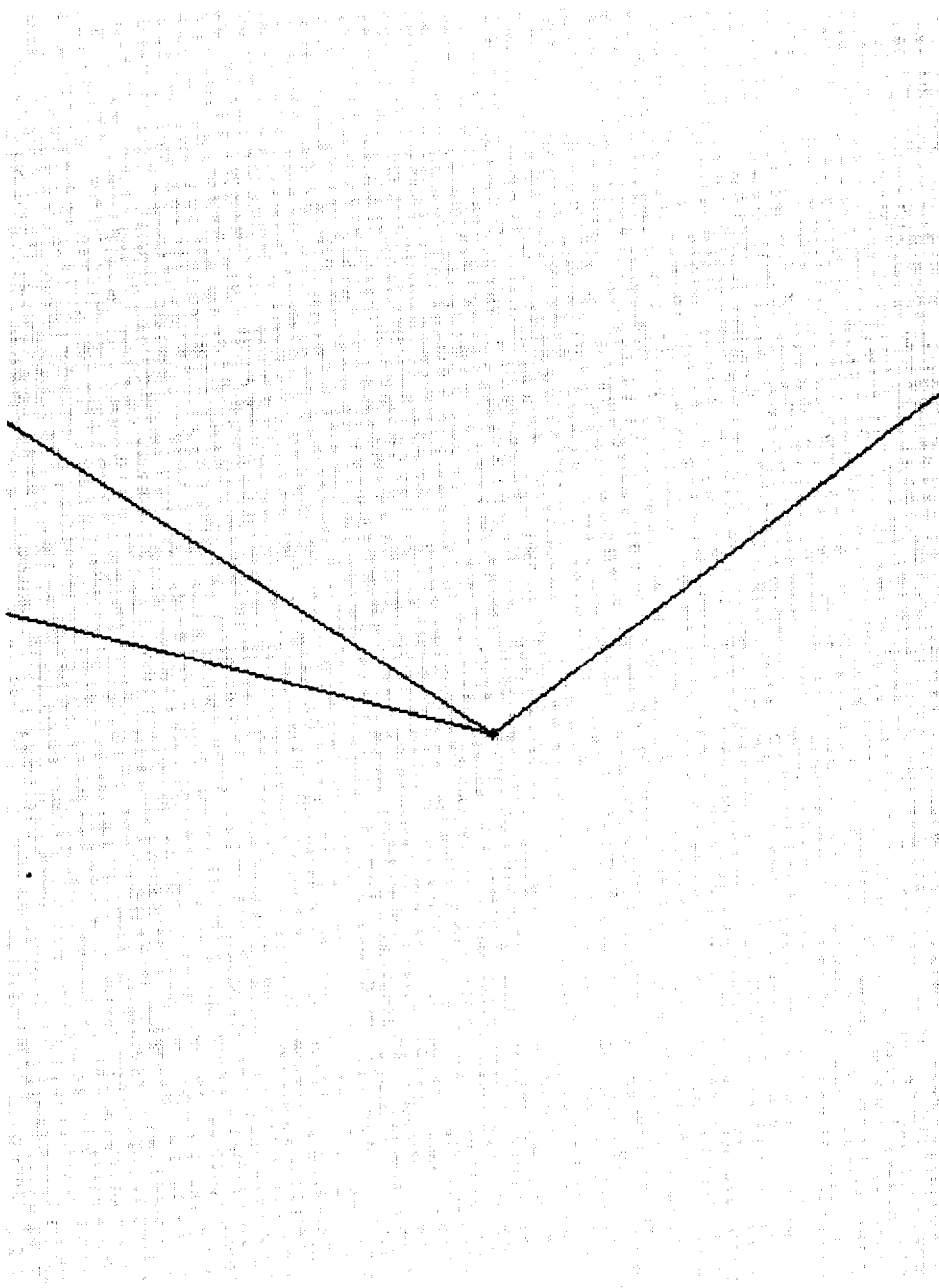
FIG. 36 is a cropped screen dump which is windowed to the intersection of the Point of Beginning of the legal description which is the beginning point of the first vector and the endpoint of the last vector of the parcel; Delta X and Delta Y are also displayed.

The vector drawing file of Example 3 of the legal description was displayed as shown in FIG. 35. Alternatively, the drawing may be plotted or printed. The user viewed the drawing to see if the drawing lines formed a closed polygon. The quality control method to determine the mathematical accuracy of a legal description produced by the conversion method as set forth in Example 3 also may use a standard COGO routine to compute whether endpoint $(X_e, Y_e)$ of the vector corresponding the last bounding line the description matches the beginning point $(X_b, Y_b)$ of the vector line corresponding to the "point of beginning" (POB) of the legal description. The difference in the x coordinates is expressed as a Delta X ($\Delta$X) where $\Delta X = X_e - X_b$, and the difference in the y coordinate is expressed as a Delta Y ($\Delta$Y) where $\Delta Y = Y_e - Y_b$. The Delta X and Delta Y are "closure" distances which are a measure of the accuracy of the mathematics. FIG. 36 shows the windowed area of FIG. 35 centered at the POB and endpoint of last vector. The endpoint of the last vector matched perfectly with the point of beginning as shown by the Delta X=0' 0.0000" and Delta Y=0' 0.0000" [0 feet, 0 inches means there is no gap and the points are coincident] displayed on the screen print of FIG. 36 and the absence of a "visually" perceivable gap.

The parcel described in the legal description of FIG. 29 was created as a CAD drawing file and FIG. 35 closure was exactly disclosed in FIG. 36.

Other mathematical operations may be performed on the vector drawing file of the legal description as is known in the CAD art. For example, but not limited to, mathematical operations such as converting feet to meters and/or converting bearings to azimuths may be performed.

EXAMPLE 5

REFINEMENT OF OCR SELECTION

This example utilizes the hardware and software of Example 1 and the methods of converting hard copy source documents as described in Examples 1–4.

The performance of the OCR is improved by automatically setting up the text recognition parameters to limit the amount of choices an OCR needs to make according to the alphanumeric text position in the character string. The user indicates whether the source data is expressed in azimuth or bearing.

If the user chooses "Azimuth", the user selects the recognition parameters to optimize recognition of the numerals 0, 1, 2, 3, 4, 5, 6, 7, 8, 9, and programs the RECOGNIZER™ to automatically default to the recognition of numeric characters since there is no case in which an alphabet character would be a part of a character string expressing azimuth (DDD.MMSS). This eliminates any errors resulting from the similarity of certain alphabet (alpha) characters with certain numeric characters, such as 0 and 0 (zero), I and 1, B and 3, 5 and S, 6 and b, 7 and T, and 8 and B.

If the user chooses "Bearing", recognition parameters are set up such that the first and last characters in the string are alpha and all the characters in between are numeric. This is done by selecting recognition of the alphabet N,S,E,W and the numeral 0, 1, 2, 3, 4, 5, 6, 7, 8, 9. Furthermore the only significant alpha characters are N,S,E and W and their places in the character string are set. The first character in a bearing string could only be N or S and the last character could only be an E or W. This eliminates two types of recognition errors. The error resulting from the difficulty in distinguishing between certain alpha characters and certain numeric characters; and the error resulting from the difficulty in distinguishing between the four alpha characters in a bearing string and other alpha characters, for example, N and M, E and B or W and V. In addition to error reduction, this OCR parameter selection also maximizes the speed of the operation since the field which the OCR must search is significantly smaller.

In the "bearing mode" there are four exceptions to the (N or S)DD.MMSS(E or W) format. These occur when the lines are heading in cardinal directions and are expressed as North, South, East or West or simply as N, S, E or W. Occasionally the cardinal directions are expressed in the more typical format such as N90°00'00"W (West) or S00°00'00"E (South). When Cardinal directions are expressed as alpha strings, recognition parameters are set up such that North is always recognized as N00D0000 and South is always recognized as S00D0000, regardless of the trailing alpha characters E and W in the recognition, since the 0° implies that the bearing leans neither to the East nor the West. East is always recognized as 90D0000W and West is always recognized as 90D0000E. The leading alpha characters N and S do not come into play because the 90° implies that the bearing leans neither to the North nor to the South.

A difficulty for present OCR is distinguishing between certain alpha characters and numeric characters such as 0 and 0 (zero), I and 1, B and 3, 5 and S, 6 and b, 7 and T, 8 and B. This invention improves the performance of the OCR by automatically setting up the text recognition parameters by limiting the amount of choices the OCR needs to make according to its position in the character string using a suitable subroutine.

In recognizing distances, this invention automatically sets up the recognition parameters such that they automatically default to the numeric character.

The invention is suitable practiced according to the methods described in Examples 1–4 utilizing the setting of the optical character recognition parameters as discussed in this Example.

EXAMPLE 6

METHOD OF CONVERSION OF LEGAL DESCRIPTION

This example utilizes the hardware and software of Example 1 and the methods of Examples 3 and 4.

Legal descriptions are a literal way of conveying all the information necessary to construct a drawing. The vectors and arcs are constructed in the sequence, in which the alphanumeric text relating to bearings and distances occur in the legal description.

If, for example, the legal description expresses the direction and distances using the bearing and distance conversion (N or S)DD°MM'SS"(E or W) xx.xx feet, where xx.xx is the number of feet. The OCR textual recognition parameters are set as described previously in Example 5. The OCR parameter are also set to recognize key terms such as, but not limited to "Commencing", "Point of beginning" and "thence". The software program searches for the distance and direction in whatever format it has been preset to recognize. After recognizing one or more of the terms "Commencing", "Point of beginning" and "thence", the program defaults to an arbitrary preset coordinate 10,000 NORTH, 10,000 EAST and automatically creates the starting point for the first line. For legal descriptions, a starting point isn't necessarily the "point of beginning of a parcel. Descriptions often start at a known geographic point such as a U.S. Government Survey Section corner or the corner of a subdivision and then follows with one or more courses leading to the point of beginning of a given parcel. After this, the legal description follows with three or more courses of the actual bounding lines of the parcel such that the endpoint of the last course is also the point of beginning. It coincides with point of beginning. The amount that the last point deviates from the point of beginning is the closure of a parcel. Thus this program not only draws the description following the method of Example 3 but it also checks accuracy of the legal description as in Example 4 using the methods described in Example 4.

The finished drawing is totally accomplished automatically. If there were mistakes either in the original document or in the conversion process, the mistakes show up as a lack of closure. The user is able to view the drawing to analyze and determine the probable error. Also, Delta X and Delta Y are suitable provided according to the method of Example 4.

This invention is preferably linked with existing COGO software which has closure and balancing subroutines, such as, Softdesk for Surveyors, by Softdesk, Inc., of Henniker, N.H. If there are substantial errors, these same routines can alert the user to probable causes such as a bearing recorded as N85°12'33"E instead of N85°12'33"W.

This conversion system also provides a quality control check on the character recognition.

EXAMPLE 7

SOURCE DOCUMENT CONVERSION QUALITY CONTROL METHOD

The system of the present invention provides a method of quality control in the OCR of the conversion system. Where correct dimensions and distances are recorded on a document, and a closed map is known to be produced, then, if there is an error in optical character recognition of the text, the drawing will show failure of closure. Not only does the present invention produce a more reliable finished product, but it allows the user to set reasonable time limits on how the computer makes certain determinations, i.e., how it recognizes certain alphanumeric text. Thus this invention not only provides an accurate drawing file, it can help to produce a better ASCII text file.

The OCR textual parameter recognition is set as described Examples 1 or 5. The first quality control check is in the OCR program. The significant text is read objectively by the computer. If the alphanumeric characters are unambiguous, the OCR simply assigns the appropriate ASCII character. If there is any doubt, the user is shown the questionable text string and given the opportunity to edit, i.e., make corrections or to add text. The user can set the amount (levels) of recognition parameters of the OCR before hand as has been described previously in Examples 1, 3, 5 and 6.

The interface between human and OCR is the "Find rejects and edit" (FRED) feature present in RECOG-NIZER™ for AutoCAD™. Before the vectors and arc are drawn, the user can edit the text to correspond to the recorded alphanumeric text. The prior art conversion systems simply convert the text without regard to the mathematical consequences.

The second method of quality control is comparing the vector drawing produced by the methods of this invention with the raster image scanned from the source document where the source document has a graphical component. This immediately shows any gross deviations from the apparent shape of the parcel or of the lengths and directions of the constituent vector lines and/or arcs. Theoretically, the vector lines or arcs should overlay the raster lines or arcs perfectly if both the raster graphical drawing and the alphanumeric text are correct. Moreover, certain sets of data such as curve data are checked against other elements of the drawing. For example, it is easy to tell if the delta angle data is at variance with the tangent bearing data simply by comparing the difference in the two bearings with the delta angle. However, if there is any problem with the mathematics of a particular vector, whether as a result of the source data or the conversion process as has been shown in Example 3, the vector will have a different direction as shown in FIG. 25 or will extend past the end of the raster line as shown in FIG. 27 or there will be a visually perceivable failure of closure as shown in FIGS. 25 and 27. This will alert the user that there is a problem which requires investigation. Perhaps it is simply a drafting error in the graphic drawing of source document or maybe it is a scribing error with respect to the text describing the bounding lines. In the prior art, vectorized lines produced by the graphics are forced to overlay raster lines without regard to their accuracy.

The third method of quality control is the mathematical calculation of closure by use of the Delta X and Delta Y expression previously discussed in Examples 2 and 4. This can be used to check the overall closure of a given map.

EXAMPLE 8

CONVERSION OF A HARD COPY SOURCE DOCUMENT

Where the hard copy source document has alphanumeric text recorded on it in an angular format using DD°MM'SS". The document is scanned as in Example 1 using the OCR parameters set as in Examples 1–6. Where the OCR recognizes degrees ° and seconds " symbols, and the COGO geometry accepts the converted ASCII text having the degree ° symbol and the angular format, it is not necessary to insert the "D" after the minutes symbol ('). The exact recognized OCR text is in COGO useable form and is transported directly into the COGO subroutine. The document is scanned, transported into the CAD environment as previously described in Example 1.

The optical character recognition proceeds as previously discussed in Example 1 except that when a character string is reviewed; it is placed directly beneath the appropriate raster text. Once the text is recognized and converted into ASCII text, it is in a form which enables the user to simply choose the appropriate text in response to computer prompts such as "DISTANCE?" and "BEARING?".

The converted ASCII text is placed on a separate CAD drawing layer such as RAW DATA. The function of the RAW DATA file is to produce vector lines and arcs. This converted ASCII text is not used in the labelling. As is previously discussed in Examples 1–4 the labelling text is always produced by the vectors.

While the present invention has now been described and exemplified with some specificity, those skilled in the art will appreciate the various modifications, including variations, additions, and omissions, that may be made in what has been described. Accordingly, it is intended that these modifications also be encompassed by the present invention and that the scope of the present invention be limited solely by the broadest interpretation that lawfully can be accorded the appended claims.

We claim:

1. A computer method of converting an alphanumeric text relating to a length and a direction of a bounding line of an area surveyed from a hard copy source document into a mathematically accurate vector, said method comprising the steps of:
   (a) receiving digitized output from an automated digitizing unit into a CAD applications program in a computer, said output comprising alphanumeric text relating to a length and a direction of a bounding line of an area surveyed, and in a format usable by said CAD applications program, said CAD applications program including a coordinate geometry subroutine, said alphanumeric text having been scanned from said hard copy source document;
   (b) recognizing said alphanumerical text in an optical character recognition subroutine operating in said CAD applications program;
   (c) transporting said alphanumeric text from step (b) in a format usable by said coordinate geometry subroutine into said coordinate geometry subroutine; and
   (d) converting said alphanumeric text from step (c) into a mathematically accurate vector, said vector having an orientation and a distance corresponding to the length and the direction of said bounding line of the area surveyed, said vector also having a beginning point coordinate and an endpoint coordinate.

2. The method of claim 1 wherein step (b) includes:
   (i) setting an optical character recognition parameter in said optical character recognition subroutine to recognize numerals from the group consisting of 0, 1, 2, 3, 4, 5, 6, 7, 8, and 9; and
   (ii) recognizing said numerals.

3. The method of claim 1 wherein step (b) includes:
   (i) setting an optical character recognition parameter in said optical character recognition subroutine to recognize numerals from the group consisting of 0, 1, 2, 3, 4, 5, 6, 7, 8, and 9, and alphabet characters from the group consisting of N, S, E, and W; and
   (ii) recognizing said numerals and said alphabet characters.

4. The method of claim 1 wherein step (b) includes:
   (i) setting an optical character recognition parameter in said optical character recognition subroutine to recognize numerals from the group consisting of 0, 1, 2, 3, 4, 5, 6, 7, 8, and 9, and alphabet characters from the group consisting of N, S, E, and W, and symbols from the group consisting of °, ', and "; and
   (ii) recognizing said numerals, said alphabet characters and said symbols.

5. The method of claim 4 wherein step (b) further includes:
   (iii) setting said optical character recognition to search for said alphanumeric text consisting of a bearing and a distance associated with said bearing, said bearing having an alphanumeric character string from the group consisting of:
   NDD°MM'SS",
   NDD°MM'SS"E,
   NDD°MM'SS"W,
   SDD°MM'SS",
   SDD°MM'SS"E,
   SDD°MM'SS"W,
   DD°MM'SS"E, or
   DD°MM'SS"W
   wherein DD° represents degrees, MM' represents minutes and SS" represents seconds of said bearing and
   DD is a numeric character ranging from 00 to 90,
   MM is a numeric character ranging from 00 to 59 and
   SS is a numeric character ranging from 00 to 59 and such that a character string portion DD'MM'SS" ranges from 00°00'00" to 90°00'00".

6. The method of claim 4 wherein step (b) further includes:
   (iii) setting said optical character recognition to search for said alphanumeric text consisting of an alphanumeric text string consisting of an angular indicia and a radius distance, said angular indicia having a character string DDD°MM'SS" wherein DDD° represents degrees, MM' represents minutes and SS" represents seconds and wherein
   DDD is a numeric character ranging from 000 to 359;
   MM is a numeric character ranging from 00 to 59; and
   SS is a numeric character ranging from 00 to 59 such that the numeric character string DDD°MM'SS" ranges between 000°00'00" and 359°59'59".

7. The method of claim 4 wherein step (b) further includes:
   setting said optical character recognition to search for said alphanumeric text consisting of a azimuth and a distance associated with said azimuth, said azimuth having a character string DDD°MM'SS" wherein DDD° represents degrees, MM' represents minutes and SS" represents seconds and wherein
   DDD is a numeric character ranging from 000 to 359;
   MM is a numeric character ranging from 00 to 59; and
   SS is a numeric character ranging from 00 to 59 such that the character string DDD°MM'SS" ranges between 000°00'00" and 359°59'59".

8. The method of claim 1, wherein step (a) comprises receiving said output in a digitized raster file directly from said automated digitizing unit to said computer directly after scanning said hard copy source document.

9. The method of claim 1, wherein step (a) comprises receiving said output by loading a saved file of said output representing said alphanumeric text into said computer and opening said saved file in said CAD applications program.

10. The method of claim 1, wherein said area surveyed is characterized by a plurality of said bounding lines, each said bounding line having associated with it corresponding alphanumeric text relating to said length and said direction of each said bounding line, said method further comprising the steps of:

(i) repeating the steps of (b)–(d) for each said bounding line thereby creating a corresponding vector for each said bounding line; and (ii) arranging sequentially each said corresponding vector as it is created so that said corresponding vectors form a graphical representation of said area surveyed.

11. The method of said claim 10, further comprising the step of saving said corresponding vectors in a vector drawing file in said computer.

12. The method of claim 10, further comprising the step of printing said graphical representation.

13. The method claim 10, wherein said method further includes the step of computing a closure distance between a pair of said corresponding vectors.

14. The method of claim 10, wherein said CAD applications program further includes a vector labeling subroutine, said method further comprising the step of labeling each corresponding vector with a label by utilizing said CAD applications program's labeling subroutine; said label reciting a direction and a length corresponding to said orientation and said distance of each said corresponding vector.

15. The method of claim 10, further comprising the step of converting said distance of each said corresponding vector from English units to metric units and vice versa.

16. The method of claim 15, further comprising the step of displaying said converted distances along with said corresponding vectors.

17. An automated conversion system for converting alphanumeric text relating to lengths and directions of bounding lines of an area surveyed from a hard copy source document into mathematically accurate vectors, said system comprising in combination an automatic digitizing unit for document scanning and a computer having a CAD applications program, said computer including receiving means and recognition means, said program including conversion means, transport means and vectorization means;

said automatic digitizing unit (i) scanning a hard copy document having alphanumeric text relating to lengths and directions of bounding lines of an area surveyed, (ii) creating a digitized raster file corresponding to said alphanumeric text, and (iii) outputting said digitized raster file;

said receiving means operatively associated with said automated digitizing unit, for receiving said digitized raster file into said CAD applications program;

said recognition means for recognizing said file and creating an ASCII text file and comprising an optical character recognition subroutine operating in said CAD applications program;

said conversion means, operatively associated with said recognition means, for converting said ASCII text file into a converted file useable in said coordinate geometry subroutine;

said transport means, responsive to said converted file, for transporting said converted file into said coordinate geometry subroutine; and said vectorization means, operatively associated with said transport means, for converting said converted file into mathematically accurate vectors representing said lengths and said directions of said surveyed area and comprising a coordinate geometry subroutine.

18. The system of claim 17, wherein said hard copy source document is a cartographic document.

19. The system of claim 18, wherein said hard copy source document is a survey map.

20. The system of claim 17, wherein said hard copy source document is a legal description of a land parcel.

21. The system of claim 17, said vectorization means further including means for arranging sequentially said vectors according to a sequence of said bounding lines wherein said arranged vectors form a graphical representation of said area surveyed.

22. The system of said claim 21, further including prompting means for prompting a user to arrange said vectors into said graphical representation.

23. The system of claim 21, further comprising means for saving said arranged vectors to a file in said computer.

24. The system of claim 21, further comprising outputting means for creating output of said arrangement.

25. A computer method of converting alphanumeric text relating to lengths and directions of bounding lines of a land parcel from a legal description hard copy source document into mathematically accurate vectors, said method comprising the steps of:

(a) receiving digitized output from an automated digitizing unit into a CAD applications program, said output representing alphanumeric text relating to lengths and directions of bounding lines of an area surveyed, said CAD applications program having a coordinate geometry subroutine, said alphanumeric text having been scanned from a legal description hard copy source document;

(b) recognizing said alphanumerical text using a textual optical character recognition subroutine operating in said CAD applications program;

(c) transporting said alphanumeric text into said coordinate geometry subroutine; and (d) converting said alphanumeric text in said coordinate geometry subroutine into mathematically accurate vectors representing said lengths and said directions of said bounding lines of said land parcel.

26. The method of claim 25, further comprising step (e) of arranging sequentially said vectors according to a sequence of said bounding lines to form a graphical representation of said land parcel.

27. The method of claim 25, wherein step (c) includes abstracting said alphanumeric text.

28. The method of claim 25, wherein step (c) includes formatting said alphanumeric text into a format useable in said coordinate geometry subroutine.

29. A computer quality control method for a legal description, the method comprising the steps of:

(a) scanning a legal description hard copy source document using an automated digitizing unit, said document having alphanumeric text relating to lengths and directions of bounding lines of a land parcel, (b) receiving digitized output, said output representing said alphanumeric text, from said automated digitizing unit into a CAD applications program, said CAD applications program having a coordinate geometry subroutine;

(c) recognizing said alphanumerical text using a textual optical character recognition subroutine operating in said CAD applications program;

(d) transporting said alphanumeric text into said coordinate geometry subroutine;

(e) converting said alphanumeric text in said coordinate geometry subroutine into mathematically accurate vectors representing said lengths and said directions of said bounding lines of said land parcel; and (f) arranging sequentially said vectors according to a sequence of said bounding lines to form a representation of said land parcel.

30. The method of claim 29 further comprising the step of (g) computing a closure distance between a pair of adjacent said vectors, said closure distance expressed as a distance Delta X and a distance Delta Y, where said distance Delta X is the difference between an X coordinate of the endpoint of one of said adjacent said vectors and the X coordinate of the beginning point of the said adjacent vector and said distance Delta Y is the difference between a Y coordinate of the same said endpoint of said one said adjacent said vector and the Y coordinate of the same said beginning point of the said adjacent vector.

31. The quality control method of claim 30, further comprising the step of displaying said representation of said land parcel and said closure distance.

32. A computer method of converting alphanumeric text relating to lengths and directions of bounding lines of an area surveyed from a cartographic hard copy source document into mathematically accurate vectors, said method comprising the steps of:

(a) receiving digitized output from an automated digitizing unit into a CAD applications program, said output representing alphanumeric text relating to lengths and directions of bounding lines of an area surveyed, said CAD applications program having a coordinate geometry subroutine, said alphanumeric text having been scanned from a cartographic hard copy source document;

(b) recognizing said alphanumerical text using a textual optical character recognition subroutine operating in said CAD applications program;

(c) transporting said alphanumeric text into said coordinate geometry subroutine; and (d) converting said alphanumeric text in said coordinate geometry subroutine into mathematically accurate vectors representing said lengths and said directions of said bounding lines of said area surveyed.

33. The method of claim 32, further comprising the step of arranging sequentially said vectors according to a sequence of said bounding lines to form a representation of said area surveyed.

34. The method of claim 32, step (c) further comprising abstracting said alphanumeric text.

35. The method of claim 32, step (c) including converting said alphanumeric text into a format useable in said coordinate geometry subroutine.

36. The method of claim 32 further comprising the steps of displaying said digitized output; overlaying said vectors on said digitized output; and displaying same.

37. The method of claim 32 wherein said cartographic hard copy source document, has a drawing thereon and wherein a graphics recognition subroutine with a graphics drawing vectorizer subroutine is also operating with said CAD applications program, step (b) of said method further comprising recognizing said drawing using said graphics recognition and creating a graphics vectorized drawing.

38. The method of claim 37, further comprising the steps of displaying said digitizing output; overlying said graphics vectorized drawing thereupon; and displaying same.

39. A computer quality control method for a cartographic document, the method comprising the steps of:

(a) scanning a cartographic hard copy source document using an automated digitizing unit, said document having a drawing thereon and alphanumeric text relating to lengths and directions of bounding lines of an area surveyed recorded thereon;

(b) receiving digitized output, said output including said alphanumeric text relating to lengths and directions of bounding lines of an area surveyed and a digitized drawing from an automated digitizing unit into a CAD applications program, said CAD applications program having a coordinate geometry subroutine, said alphanumeric text and said drawing having been scanned from said cartographic hard copy source document;

(c) displaying said digitized drawing;

(d) recognizing said alphanumeric text using a conversion system operating in said CAD applications program, said conversion system having a graphics and textual optical character recognition subroutine and having a graphics drawing vectorizer subroutine, and recognizing said alphanumeric text using said textual optical character recognition subroutine;

(e) transporting said alphanumeric text into said coordinate geometry subroutine;

(f) converting said alphanumeric text in said coordinate geometry subroutine into mathematically accurate vectors representing said lengths and said directions of said bounding lines of said area surveyed; and (g) arranging sequentially said vectors according to a sequence of said bounding lines to form a representation of said area surveyed and overlaying said vectors on said digitized drawing.

40. The method of claim 39 further comprising the steps of computing a closure distance between a pair of adjacent said vectors, said closure distance expressed as a distance Delta X and a distance Delta Y, where said distance Delta X is the difference between an X coordinate of the endpoint of one of said adjacent said vectors and the X coordinate of the beginning point of the said adjacent vector and said distance Delta Y is the difference between a Y coordinate of the same said endpoint of said one said adjacent said vector and the Y coordinate of the same said beginning point of the said adjacent vector; and (ii) displaying said representation of said vectors overlaid on said digitized drawing file and displaying said closure distance.

41. A computer quality control method for a textual optical character recognition subroutine program, the method comprising the steps of:

(a) scanning a hard copy source document using an automated digitizing unit, said document having a drawing thereon and alphanumeric text relating to lengths and directions of bounding lines of an area surveyed recorded thereon, said alphanumeric text having been accurately recorded; said drawing having been accurately scaled to said alphanumeric text;

(b) receiving digitized output, said output including said alphanumeric text relating to lengths and directions of bounding lines of an area surveyed and a digitized drawing from an automated digitizing unit into a CAD applications program, said CAD applications program having a coordinate geometry subroutine, said alphanumeric text and said drawing having been scanned from said hard copy source document;

(c) recognizing said alphanumerical text using said textual optical character recognition subroutine program operating in said CAD applications program;

(d) transporting said alphanumeric text into said coordinate geometry subroutine;

(e) converting said alphanumeric text in said coordinate geometry subroutine into mathematically accurate vectors representing said lengths and said directions of said bounding lines of said area surveyed; and (f) arranging sequentially said vectors according to a sequence of said bounding lines to form a representation of said area surveyed and displaying said representation.

42. The method of claim 41 further comprising the steps of computing a closure distance between a pair of adjacent said vectors, said closure distance expressed as a distance Delta X and a distance Delta Y, where said distance Delta X is the difference between an X coordinate of the endpoint of one of said adjacent said vectors and the X coordinate of the beginning point of the said adjacent vector and said distance Delta Y is the difference between a Y coordinate of the same said endpoint of said one said adjacent said vector and the Y coordinate of the same said beginning point of the said adjacent vector; and displaying said closure distance.

43. The method of claim 41 further comprising the steps of:

(i) displaying said digitized drawing between steps (b) and (c) and (ii) displaying said representation as overlaid on said digitized drawing.

* * * * *